(12) United States Patent
Saunders

(10) Patent No.: US 8,538,863 B1
(45) Date of Patent: Sep. 17, 2013

(54) SYSTEM AND METHOD FOR FACILITATING A TRANSACTION USING A REVOLVING USE ACCOUNT ASSOCIATED WITH A PRIMARY ACCOUNT

(75) Inventor: Peter D Saunders, Salt Lake City, UT (US)

(73) Assignee: American Express Travel Related Services Company, Inc., New York, NY (US)

( * ) Notice: Subject to any disclaimer, the term of this patent is extended or adjusted under 35 U.S.C. 154(b) by 1464 days.

(21) Appl. No.: 10/711,963

(22) Filed: Oct. 15, 2004

Related U.S. Application Data

(63) Continuation-in-part of application No. 10/340,352, filed on Jan. 10, 2003, now Pat. No. 7,889,052, and a continuation-in-part of application No. 10/192,488, filed on Jul. 9, 2002, now Pat. No. 7,239,226, and a continuation-in-part of application No. 10/318,432, filed on Dec. 13, 2002, and a continuation-in-part of application No. 10/318,480, filed on Dec. 13, 2002, now Pat. No. 7,249,112.

(60) Provisional application No. 60/512,297, filed on Oct. 17, 2003, provisional application No. 60/396,577, filed on Jul. 16, 2002, provisional application No. 60/304,216, filed on Jul. 10, 2001.

(51) Int. Cl.
*G06Q 40/00* (2012.01)

(52) U.S. Cl.
USPC .......................................................... 705/38

(58) Field of Classification Search
USPC .......................................................... 705/35
See application file for complete search history.

(56) References Cited

U.S. PATENT DOCUMENTS

| | | |
|---|---|---|
| 4,303,904 A | 12/1981 | Chasek |
| 4,475,308 A | 10/1984 | Heise et al. |

(Continued)

FOREIGN PATENT DOCUMENTS

| | | |
|---|---|---|
| CH | 689070 | 8/1988 |
| CH | 689070 | 8/1998 |

(Continued)

OTHER PUBLICATIONS

"Physical Reality: A Second Look", Ken Sharp, Senior Technical Editor, http://www.idsystems.com/reader/1999_03/phys0399_pt2/phys0399_pt2.htm (6 pages).

(Continued)

*Primary Examiner* — Rajesh Khattar
(74) *Attorney, Agent, or Firm* — Snell & Wilmer L.L.P.

(57) ABSTRACT

The present invention facilitates transactions by providing a revolving use account that is associated with a primary account number, wherein the revolving use account is presented to the merchant to initiate a transaction. More particularly, the system involves the process of registering a user's primary account (if not already pre-registered) to use in a transaction system; generating a revolving use account and issuing this number one or more separate users and/or transaction devices, where the user presents this revolving use account to a merchant to complete a transaction. Additionally, the revolving use account may also carry with it certain limitations-on-use conditions, where a transaction is not authorized unless these conditions are met. In generating a revolving use account, the issuer generates a random number and associates this number with the user's primary charge account.

17 Claims, 26 Drawing Sheets

(56) References Cited

U.S. PATENT DOCUMENTS

| | | |
|---|---|---|
| 4,583,766 A | 4/1986 | Wessel |
| 4,639,765 A | 1/1987 | dHont |
| 4,672,021 A | 6/1987 | Blumel et al. |
| 4,739,328 A | 4/1988 | Koelle et al. |
| 4,961,142 A | 10/1990 | Elliott et al. |
| 5,023,782 A | 6/1991 | Lutz et al. |
| 5,053,774 A | 10/1991 | Schuermann et al. |
| 5,099,226 A | 3/1992 | Andrews |
| 5,101,200 A | 3/1992 | Swett |
| 5,197,140 A | 3/1993 | Balmer |
| 5,212,777 A | 5/1993 | Gove et al. |
| 5,221,838 A | 6/1993 | Gutman et al. |
| 5,222,282 A | 6/1993 | Sukonnik et al. |
| 5,226,989 A | 7/1993 | Sukonnik |
| 5,239,654 A | 8/1993 | IngSimmons et al. |
| 5,247,304 A | 9/1993 | dHont |
| 5,274,392 A | 12/1993 | dHont et al. |
| 5,285,100 A | 2/1994 | Byatt |
| 5,305,002 A | 4/1994 | Holodak et al. |
| 5,329,617 A | 7/1994 | Asal |
| 5,331,138 A | 7/1994 | Saroya |
| 5,334,823 A * | 8/1994 | Noblett et al. ............... 235/380 |
| 5,339,447 A | 8/1994 | Balmer |
| 5,349,357 A | 9/1994 | Schurmann et al. |
| 5,351,052 A | 9/1994 | dHont et al. |
| 5,371,896 A | 12/1994 | Gove et al. |
| 5,373,303 A | 12/1994 | dHont |
| 5,407,893 A | 4/1995 | Koshizuka et al. |
| 5,408,243 A | 4/1995 | dHont |
| 5,410,649 A | 4/1995 | Gove |
| 5,428,363 A | 6/1995 | dHont |
| 5,438,186 A * | 8/1995 | Nair et al. .................. 235/449 |
| 5,453,747 A | 9/1995 | dHont et al. |
| 5,471,592 A | 11/1995 | Gove et al. |
| 5,485,510 A | 1/1996 | Colbert |
| 5,488,376 A | 1/1996 | Hurta et al. |
| 5,489,411 A | 2/1996 | Jha et al. |
| 5,489,908 A | 2/1996 | Orthmann et al. |
| 5,490,079 A | 2/1996 | Sharpe et al. |
| 5,491,483 A | 2/1996 | dHont |
| 5,491,484 A | 2/1996 | Schuermann |
| 5,491,715 A | 2/1996 | Flaxl |
| 5,493,312 A | 2/1996 | Knebelkamp |
| 5,497,121 A | 3/1996 | dHont |
| 5,500,651 A | 3/1996 | Schuermann |
| 5,513,525 A | 5/1996 | Schurmann |
| 5,519,381 A | 5/1996 | Marsh et al. |
| 5,522,083 A | 5/1996 | Gove et al. |
| 5,525,992 A | 6/1996 | Froschermeier |
| 5,525,994 A | 6/1996 | Hurta et al. |
| 5,530,232 A | 6/1996 | Taylor |
| 5,541,604 A | 7/1996 | Meier |
| 5,543,798 A | 8/1996 | Schuermann |
| 5,544,246 A | 8/1996 | Mandelbaum et al. |
| 5,548,291 A | 8/1996 | Meier et al. |
| 5,550,536 A | 8/1996 | Flaxl |
| 5,550,548 A | 8/1996 | Schuermann |
| 5,552,789 A | 9/1996 | Schuermann |
| 5,557,279 A | 9/1996 | dHont |
| 5,557,516 A | 9/1996 | Hogan |
| 5,561,430 A | 10/1996 | Knebelkamp |
| 5,563,582 A | 10/1996 | dHont |
| 5,569,187 A | 10/1996 | Kaiser |
| 5,572,226 A | 11/1996 | Tuttle |
| 5,577,109 A | 11/1996 | Stimson et al. |
| 5,581,630 A | 12/1996 | Bonneau, Jr. |
| 5,592,150 A | 1/1997 | dHont |
| 5,592,405 A | 1/1997 | Gove et al. |
| 5,594,233 A | 1/1997 | Kenneth et al. |
| 5,594,448 A | 1/1997 | dHont |
| 5,597,534 A | 1/1997 | Kaiser |
| 5,600,175 A | 2/1997 | Orthmann |
| 5,602,538 A | 2/1997 | Orthmann et al. |
| 5,602,919 A | 2/1997 | Hurta et al. |
| 5,604,342 A | 2/1997 | Fujioka |
| 5,606,520 A | 2/1997 | Gove et al. |
| 5,606,594 A | 2/1997 | Register et al. |
| 5,607,522 A | 3/1997 | McDonnell |
| 5,608,406 A | 3/1997 | Eberth et al. |
| 5,608,778 A | 3/1997 | Partridge, III |
| 5,613,146 A | 3/1997 | Gove et al. |
| 5,619,207 A | 4/1997 | dHont |
| 5,621,396 A | 4/1997 | Flaxl |
| 5,621,411 A | 4/1997 | Hagl et al. |
| 5,621,412 A | 4/1997 | Sharpe et al. |
| 5,625,366 A | 4/1997 | dHont |
| 5,625,370 A | 4/1997 | dHont |
| 5,625,695 A | 4/1997 | MRaihi et al. |
| 5,629,981 A | 5/1997 | Nerlikar |
| 5,638,080 A | 6/1997 | Orthmann et al. |
| 5,640,002 A | 6/1997 | Ruppert et al. |
| 5,646,607 A | 7/1997 | Schurmann et al. |
| 5,657,388 A | 8/1997 | Weiss |
| 5,660,319 A | 8/1997 | Falcone et al. |
| 5,673,106 A | 9/1997 | Thompson |
| 5,675,342 A | 10/1997 | Sharpe |
| 5,686,920 A | 11/1997 | Hurta et al. |
| 5,691,731 A | 11/1997 | vanErven |
| 5,692,132 A | 11/1997 | Hogan |
| 5,696,913 A | 12/1997 | Gove et al. |
| 5,698,837 A | 12/1997 | Furuta |
| 5,699,528 A | 12/1997 | Hogan |
| 5,701,127 A | 12/1997 | Sharpe |
| 5,704,046 A | 12/1997 | Hogan |
| 5,705,798 A | 1/1998 | Tarbox |
| 5,721,781 A | 2/1998 | Deo et al. |
| 5,729,053 A | 3/1998 | Orthmann |
| 5,729,236 A | 3/1998 | Flaxl |
| 5,731,957 A | 3/1998 | Brennan |
| 5,732,579 A | 3/1998 | dhont et al. |
| 5,748,137 A | 5/1998 | dHont |
| 5,748,737 A | 5/1998 | Daggar |
| 5,758,195 A | 5/1998 | Balmer |
| 5,761,306 A | 6/1998 | Lewis |
| 5,761,493 A | 6/1998 | Blakeley et al. |
| 5,768,609 A | 6/1998 | Gove et al. |
| 5,774,882 A | 6/1998 | Keen et al. |
| 5,777,903 A | 7/1998 | Piosenka et al. |
| 5,778,067 A | 7/1998 | Jones et al. |
| 5,785,680 A | 7/1998 | Niezink et al. |
| 5,792,337 A | 8/1998 | Padovani et al. |
| 5,793,324 A | 8/1998 | Aslanidis et al. |
| 5,794,095 A | 8/1998 | Thompson |
| 5,797,060 A | 8/1998 | Thompson |
| 5,797,085 A | 8/1998 | Beuk et al. |
| 5,797,133 A | 8/1998 | Jones et al. |
| 5,798,709 A | 8/1998 | Flaxl |
| 5,809,142 A | 9/1998 | Hurta et al. |
| 5,809,288 A | 9/1998 | Balmer |
| 5,809,633 A | 9/1998 | Mundigl et al. |
| 5,825,007 A | 10/1998 | Jesadanont |
| 5,825,302 A | 10/1998 | Stafford |
| 5,826,077 A | 10/1998 | Blakeley et al. |
| 5,828,044 A | 10/1998 | Jun et al. |
| 5,834,756 A | 11/1998 | Gutman et al. |
| 5,841,364 A | 11/1998 | Hagl et al. |
| 5,842,088 A | 11/1998 | Thompson |
| 5,844,218 A | 12/1998 | Kawan et al. |
| 5,844,230 A | 12/1998 | Lalonde |
| 5,845,267 A | 12/1998 | Ronen |
| 5,851,149 A | 12/1998 | Xidos et al. |
| 5,854,891 A | 12/1998 | Postlewaite et al. |
| 5,858,006 A | 1/1999 | Van der AA et al. |
| 5,859,779 A | 1/1999 | Giordano et al. |
| 5,864,323 A | 1/1999 | Berthon |
| 5,864,830 A * | 1/1999 | Armetta et al. ................. 705/41 |
| 5,867,100 A | 2/1999 | dHont |
| 5,870,031 A | 2/1999 | Kaiser et al. |
| 5,870,915 A | 2/1999 | dHont |
| 5,878,215 A | 3/1999 | Kling et al. |
| 5,878,403 A | 3/1999 | DeFrancesco et al. |
| 5,880,675 A | 3/1999 | Trautner |
| 5,881,272 A | 3/1999 | Balmer |
| 5,887,266 A | 3/1999 | Heinonen et al. |

| | | | | | | |
|---|---|---|---|---|---|---|
| 5,890,137 | A | 3/1999 | Koreeda | 6,206,293 B1 | 3/2001 | Gutman et al. |
| 5,898,783 | A | 4/1999 | Rohrbach | 6,215,437 B1 | 4/2001 | Schurmann et al. |
| 5,903,830 | A | 5/1999 | Joao et al. | 6,216,219 B1 | 4/2001 | Cai et al. |
| 5,905,798 | A | 5/1999 | Nerlikar et al. | 6,219,439 B1 | 4/2001 | Burger |
| 5,912,678 | A | 6/1999 | Saxena et al. | D442,627 S | 5/2001 | Webb et al. |
| 5,920,628 | A | 7/1999 | Indeck et al. | D442,629 S | 5/2001 | Webb et al. |
| 5,929,801 | A | 7/1999 | Aslanidis et al. | 6,223,984 B1 | 5/2001 | Renner et al. |
| 5,931,917 | A | 8/1999 | Nguyen et al. | 6,226,382 B1 | 5/2001 | MRaihi et al. |
| 5,933,624 | A | 8/1999 | Balmer | 6,230,270 B1 | 5/2001 | Laczko, Sr. |
| 5,943,624 | A | 8/1999 | Fox et al. | 6,232,917 B1 | 5/2001 | Baumer et al. |
| 5,948,116 | A | 9/1999 | Aslanidis et al. | 6,233,683 B1 | 5/2001 | Chan et al. |
| 5,953,512 | A | 9/1999 | Cai et al. | 6,237,848 B1 | 5/2001 | Everett |
| 5,953,710 | A * | 9/1999 | Fleming .................. 705/38 | 6,239,675 B1 | 5/2001 | Flaxl |
| 5,955,717 | A | 9/1999 | Vanstone | 6,240,187 B1 | 5/2001 | Lewis |
| 5,955,969 | A | 9/1999 | dHont | 6,257,486 B1 | 7/2001 | Teicher et al. |
| 5,956,024 | A | 9/1999 | Strickland et al. | 6,259,769 B1 | 7/2001 | Page |
| 5,963,924 | A | 10/1999 | Williams et al. | 6,260,026 B1 | 7/2001 | Tomida et al. |
| 5,970,148 | A | 10/1999 | Meier | 6,260,088 B1 | 7/2001 | Gove et al. |
| RE36,365 | E | 11/1999 | Levine et al. | 6,264,106 B1 | 7/2001 | Bridgelall |
| 5,978,840 | A | 11/1999 | Nguyen et al. | 6,266,754 B1 | 7/2001 | Laczko, Sr. et al. |
| 5,983,208 | A | 11/1999 | Haller | 6,273,335 B1 | 8/2001 | Sloan |
| 5,984,180 | A * | 11/1999 | Albrecht .................. 235/380 | 6,282,522 B1 | 8/2001 | Davis et al. |
| 5,987,140 | A | 11/1999 | Rowney et al. | D447,515 S | 9/2001 | Faenza, Jr. et al. |
| 5,987,155 | A | 11/1999 | Dunn et al. | 6,286,763 B1 | 9/2001 | Reynolds et al. |
| 5,987,498 | A | 11/1999 | Athing et al. | 6,289,324 B1 | 9/2001 | Kawan |
| 5,989,950 | A | 11/1999 | Wu | 6,315,193 B1 | 11/2001 | Hogan |
| 5,991,608 | A | 11/1999 | Leyten | 6,317,721 B1 | 11/2001 | Hurta et al. |
| 5,991,750 | A | 11/1999 | Watson | 6,318,636 B1 | 11/2001 | Reynolds et al. |
| 5,996,076 | A | 11/1999 | Rowney et al. | 6,323,566 B1 | 11/2001 | Meier |
| 6,002,438 | A | 12/1999 | Hocevar et al. | 6,325,285 B1 | 12/2001 | Baratelli |
| 6,002,767 | A | 12/1999 | Kramer | 6,326,934 B1 | 12/2001 | Kinzie |
| 6,003,014 | A | 12/1999 | Lee et al. | 6,342,844 B1 | 1/2002 | Rozin |
| 6,005,942 | A | 12/1999 | Chan et al. | 6,364,208 B1 | 4/2002 | Stanford et al. |
| 6,006,216 | A | 12/1999 | Griffin et al. | 6,367,011 B1 | 4/2002 | Lee et al. |
| 6,012,049 | A | 1/2000 | Kawan | 6,374,245 B1 | 4/2002 | Park |
| 6,014,645 | A | 1/2000 | Cunningham | 6,377,034 B1 | 4/2002 | Ivanov |
| 6,018,717 | A | 1/2000 | Lee et al. | 6,388,533 B2 | 5/2002 | Swoboda |
| 6,023,682 | A * | 2/2000 | Checchio .................. 705/18 | 6,390,375 B2 | 5/2002 | Kayanakis |
| 6,024,286 | A | 2/2000 | Bradley et al. | 6,400,272 B1 | 6/2002 | Holtzman et al. |
| 6,029,149 | A | 2/2000 | Dykstra et al. | 6,402,028 B1 | 6/2002 | Graham, Jr. et al. |
| 6,038,584 | A | 3/2000 | Balmer | 6,411,611 B1 | 6/2002 | Van der Tuijn |
| 6,047,888 | A | 4/2000 | Dethloff | 6,415,978 B1 | 7/2002 | McAllister |
| 6,052,675 | A | 4/2000 | Checchio | 6,422,464 B1 | 7/2002 | Terranova |
| 6,064,320 | A | 5/2000 | dHont et al. | 6,422,532 B1 | 7/2002 | Garner |
| 6,070,003 | A | 5/2000 | Gove et al. | 6,424,029 B1 | 7/2002 | Giesler |
| 6,072,870 | A | 6/2000 | Nguyen et al. | 6,457,996 B1 | 10/2002 | Shih |
| 6,073,840 | A | 6/2000 | Marion | 6,466,804 B1 | 10/2002 | Pecen et al. |
| 6,078,888 | A | 6/2000 | Johnson, Jr. | 6,473,500 B1 | 10/2002 | Risafi et al. |
| RE36,788 | E | 7/2000 | Mansvelt et al. | 6,480,100 B1 | 11/2002 | Frieden et al. |
| 6,088,686 | A | 7/2000 | Walker et al. | 6,480,101 B1 | 11/2002 | Kelly et al. |
| 6,092,057 | A | 7/2000 | Zimmerman et al. | 6,481,621 B1 | 11/2002 | Herrendoerfer et al. |
| 6,101,174 | A | 8/2000 | Langston | 6,481,632 B2 | 11/2002 | Wentker et al. |
| 6,102,162 | A | 8/2000 | Teicher | 6,484,937 B1 | 11/2002 | Devaux et al. |
| 6,102,672 | A | 8/2000 | Woollenweber | 6,490,443 B1 | 12/2002 | Freeny, Jr. |
| 6,105,008 | A | 8/2000 | Davis et al. | 6,491,229 B1 | 12/2002 | Berney |
| 6,105,013 | A | 8/2000 | Curry et al. | 6,494,380 B2 | 12/2002 | Jarosz |
| 6,105,865 | A | 8/2000 | Hardesty | 6,507,762 B1 | 1/2003 | Amro et al. |
| 6,109,525 | A | 8/2000 | Blomqvist et al. | 6,510,983 B2 | 1/2003 | Horowitz et al. |
| 6,111,522 | A * | 8/2000 | Hiltz et al. ................ 340/932.2 | 6,510,998 B1 | 1/2003 | Stanford et al. |
| 6,112,152 | A | 8/2000 | Tuttle | 6,513,015 B2 | 1/2003 | Ogasawara |
| 6,115,360 | A | 9/2000 | Quay et al. | 6,529,880 B1 | 3/2003 | McKeen et al. |
| 6,116,423 | A | 9/2000 | Troxtell, Jr. et al. | 6,535,726 B1 | 3/2003 | Johnson |
| 6,116,505 | A | 9/2000 | Withrow | 6,546,373 B1 | 4/2003 | Cerra |
| 6,118,189 | A | 9/2000 | Flaxl | 6,547,133 B1 | 4/2003 | DeVries, Jr. et al. |
| 6,121,544 | A | 9/2000 | Petsinger | 6,549,912 B1 | 4/2003 | Chen |
| 6,123,223 | A | 9/2000 | Watkins | 6,560,581 B1 | 5/2003 | Fox et al. |
| 6,129,274 | A | 10/2000 | Suzuki | 6,577,229 B1 | 6/2003 | Bonneau et al. |
| 6,133,834 | A | 10/2000 | Eberth et al. | 6,578,768 B1 | 6/2003 | Binder et al. |
| 6,141,651 | A | 10/2000 | Riley et al. | 6,581,839 B1 | 6/2003 | Lasch et al. |
| 6,167,236 | A | 12/2000 | Kaiser et al. | 6,588,660 B1 | 7/2003 | Buescher et al. |
| 6,177,860 | B1 | 1/2001 | Cromer et al. | 6,589,119 B1 | 7/2003 | Orus et al. |
| 6,179,205 | B1 | 1/2001 | Sloan | 6,608,995 B1 | 8/2003 | Kawasaki et al. |
| 6,179,206 | B1 | 1/2001 | Matsumori | 6,609,655 B1 | 8/2003 | Harrell |
| 6,188,994 | B1 | 2/2001 | Egendorf | 6,626,356 B2 | 9/2003 | Davenport et al. |
| 6,192,255 | B1 | 2/2001 | Lewis et al. | 6,628,961 B1 | 9/2003 | Ho et al. |
| 6,198,728 | B1 | 3/2001 | Hulyalkar et al. | 6,650,887 B2 | 11/2003 | McGregor et al. |
| 6,198,875 | B1 | 3/2001 | Edenson et al. | 6,665,405 B1 | 12/2003 | Lenstra |
| 6,202,927 | B1 | 3/2001 | Bashan et al. | 6,674,786 B1 | 1/2004 | Nakamura et al. |
| 6,205,151 | B1 | 3/2001 | Quay et al. | 6,679,427 B1 | 1/2004 | Kuroiwa |

| | | |
|---|---|---|
| 6,684,269 B2 | 1/2004 | Wagner |
| 6,687,714 B1 | 2/2004 | Kogen et al. |
| 6,690,930 B1 | 2/2004 | Dupre |
| 6,693,513 B2 | 2/2004 | Tuttle |
| 6,705,530 B2 | 3/2004 | Kiekhaefer |
| 6,711,262 B1 | 3/2004 | Watanen |
| 6,732,936 B1 | 5/2004 | Kiekhaefer |
| 6,742,120 B1 | 5/2004 | Markakis et al. |
| 6,760,581 B2 | 7/2004 | Dutta |
| 6,771,981 B1 | 8/2004 | Zalewski et al. |
| 7,441,706 B1 * | 10/2008 | Schuessler et al. ...... 235/462.15 |
| 2001/0013542 A1 | 8/2001 | Horowitz et al. |
| 2001/0024157 A1 | 9/2001 | Hansmann et al. |
| 2001/0034565 A1 | 10/2001 | Leatherman |
| 2001/0034720 A1 * | 10/2001 | Armes ..................... 705/65 |
| 2001/0039617 A1 | 11/2001 | Buhrlen et al. |
| 2002/0011519 A1 | 1/2002 | Shults, III |
| 2002/0028704 A1 | 3/2002 | Bloomfield et al. |
| 2002/0035548 A1 | 3/2002 | Hogan et al. |
| 2002/0052839 A1 | 5/2002 | Takatori |
| 2002/0062284 A1 | 5/2002 | Kawan |
| 2002/0074398 A1 | 6/2002 | Lancos et al. |
| 2002/0077837 A1 | 6/2002 | Krueger et al. |
| 2002/0077895 A1 | 6/2002 | Howell |
| 2002/0077992 A1 | 6/2002 | Tobin |
| 2002/0079367 A1 | 6/2002 | Montani |
| 2002/0092914 A1 | 7/2002 | Pentz et al. |
| 2002/0095343 A1 | 7/2002 | Barton et al. |
| 2002/0095389 A1 | 7/2002 | Gaines |
| 2002/0095587 A1 | 7/2002 | Doyle et al. |
| 2002/0097144 A1 | 7/2002 | Collins et al. |
| 2002/0107007 A1 | 8/2002 | Gerson |
| 2002/0107742 A1 | 8/2002 | Magill |
| 2002/0109580 A1 | 8/2002 | Shreve et al. |
| 2002/0111210 A1 | 8/2002 | Luciano, Jr. et al. |
| 2002/0113082 A1 | 8/2002 | Leatherman et al. |
| 2002/0116274 A1 | 8/2002 | Hind et al. |
| 2002/0120584 A1 | 8/2002 | Hogan et al. |
| 2002/0126010 A1 | 9/2002 | Trimble et al. |
| 2002/0131567 A1 | 9/2002 | Maginas |
| 2002/0138438 A1 | 9/2002 | Bardwell |
| 2002/0140542 A1 | 10/2002 | Prokoski et al. |
| 2002/0145043 A1 | 10/2002 | Challa et al. |
| 2002/0147913 A1 | 10/2002 | Lun Yip |
| 2002/0148892 A1 | 10/2002 | Bardwell |
| 2002/0152123 A1 | 10/2002 | Giordano et al. |
| 2002/0166891 A1 | 11/2002 | Stoutenburg et al. |
| 2002/0176522 A1 | 11/2002 | Fan |
| 2002/0178063 A1 | 11/2002 | Gravelle et al. |
| 2002/0178369 A1 | 11/2002 | Black |
| 2002/0185543 A1 | 12/2002 | Pentz et al. |
| 2002/0188501 A1 | 12/2002 | Lefkowith |
| 2002/0190125 A1 | 12/2002 | Stockhammer |
| 2002/0194303 A1 | 12/2002 | Suila et al. |
| 2002/0194503 A1 | 12/2002 | Faith et al. |
| 2002/0196963 A1 | 12/2002 | Bardwell |
| 2003/0009382 A1 | 1/2003 | DArbelott et al. |
| 2003/0014307 A1 | 1/2003 | Heng |
| 2003/0014357 A1 | 1/2003 | Chrisekos et al. |
| 2003/0014891 A1 | 1/2003 | Nelms et al. |
| 2003/0018532 A1 | 1/2003 | Dudek et al. |
| 2003/0025600 A1 | 2/2003 | Blanchard |
| 2003/0046228 A1 | 3/2003 | Berney |
| 2003/0057226 A1 | 3/2003 | Long |
| 2003/0057278 A1 | 3/2003 | Wong |
| 2003/0069828 A1 | 4/2003 | Blazey et al. |
| 2003/0069846 A1 | 4/2003 | Marcon |
| 2003/0085272 A1 * | 5/2003 | Andrews et al. ............. 235/380 |
| 2003/0112972 A1 | 6/2003 | Hattick et al. |
| 2003/0120554 A1 | 6/2003 | Hogan et al. |
| 2003/0121969 A1 | 7/2003 | Wankmueller |
| 2003/0132284 A1 | 7/2003 | Reynolds et al. |
| 2003/0140228 A1 | 7/2003 | Binder |
| 2003/0163699 A1 | 8/2003 | Pailles et al. |
| 2003/0167207 A1 | 9/2003 | Berardi et al. |
| 2003/0177347 A1 | 9/2003 | Schneier et al. |
| 2003/0183689 A1 | 10/2003 | Swift et al. |
| 2003/0183699 A1 | 10/2003 | Masui |
| 2003/0187786 A1 | 10/2003 | Swift et al. |
| 2003/0187787 A1 | 10/2003 | Freund |
| 2003/0187790 A1 | 10/2003 | Swift et al. |
| 2003/0187796 A1 | 10/2003 | Swift et al. |
| 2003/0195842 A1 | 10/2003 | Reece |
| 2003/0195843 A1 | 10/2003 | Matsuda et al. |
| 2003/0200184 A1 | 10/2003 | Dominguez et al. |
| 2003/0218066 A1 | 11/2003 | Fernandes et al. |
| 2003/0220876 A1 | 11/2003 | Burger et al. |
| 2003/0222153 A1 | 12/2003 | Pentz et al. |
| 2003/0225623 A1 | 12/2003 | Wankmueller |
| 2003/0225713 A1 | 12/2003 | Atkinson et al. |
| 2003/0227550 A1 | 12/2003 | Manico et al. |
| 2003/0233334 A1 | 12/2003 | Smith |
| 2004/0010462 A1 | 1/2004 | Moon et al. |
| 2004/0015451 A1 | 1/2004 | Sahota et al. |
| 2004/0029569 A1 | 2/2004 | Khan et al. |
| 2004/0030601 A1 | 2/2004 | Pond et al. |
| 2004/0039860 A1 | 2/2004 | Mills et al. |
| 2004/0139021 A1 | 7/2004 | Reed et al. |
| 2005/0017068 A1 | 1/2005 | Zalewski et al. |

FOREIGN PATENT DOCUMENTS

| | | |
|---|---|---|
| EP | 0 358 525 A2 | 3/1990 |
| EP | 0 424 726 A1 | 10/1990 |
| EP | 0 933 717 A2 | 8/1999 |
| EP | 0 956 818 A1 | 11/1999 |
| EP | 0 959 440 A2 | 11/1999 |
| EP | 0 984 404 | 3/2000 |
| EP | 0 984 404 A2 | 3/2000 |
| EP | 1 016 947 | 7/2000 |
| EP | 1 016 947 A2 | 7/2000 |
| EP | 1 039 403 A2 | 9/2000 |
| EP | 1 104 909 A2 | 6/2001 |
| EP | 1 113 387 A2 | 7/2001 |
| EP | 1 199 684 A2 | 4/2002 |
| EP | 1 251 450 A1 | 10/2002 |
| GB | 2 347 537 A | 9/2000 |
| JP | 2000-1109 A | 1/2000 |
| JP | 2000-011109 A | 1/2000 |
| JP | 2000-015288 A | 1/2000 |
| JP | 2000015288 A | 1/2000 |
| JP | 2000-40181 A | 2/2000 |
| JP | 2000-040181 A | 2/2000 |
| JP | 2000-67312 A | 3/2000 |
| JP | 2000067312 A | 3/2000 |
| JP | 2000-207641 A | 7/2000 |
| JP | 2000207641 A | 7/2000 |
| JP | 2001-5931 A | 1/2001 |
| JP | 2001-005931 A | 1/2001 |
| JP | 2001-283122 A | 10/2001 |
| JP | 2001283122 A | 10/2001 |
| WO | 95/32919 | 12/1995 |
| WO | 99/03057 A1 | 1/1999 |
| WO | WO 99/03057 A1 | 1/1999 |
| WO | 00/10144 A1 | 2/2000 |
| WO | WO 00/10144 A1 | 2/2000 |
| WO | 00/38088 A1 | 6/2000 |
| WO | WO 00/38088 A1 | 6/2000 |
| WO | 01/04825 A1 | 1/2001 |
| WO | WO 01/04825 A1 | 1/2001 |
| WO | 01/15098 A1 | 3/2001 |
| WO | WO 01/15098 A1 | 3/2001 |
| WO | 01/43095 A2 | 6/2001 |
| WO | WO 01/43095 A2 | 6/2001 |
| WO | 01/72224 A1 | 10/2001 |
| WO | 01/77856 A1 | 10/2001 |
| WO | 01/80473 A2 | 10/2001 |
| WO | WO 01/72224 A1 | 10/2001 |
| WO | WO 01/77856 A1 | 10/2001 |
| WO | WO 01/80473 A2 | 10/2001 |
| WO | 01/86535 A1 | 11/2001 |
| WO | 01/90962 A1 | 11/2001 |
| WO | WO 01/86535 A1 | 11/2001 |
| WO | WO 01/90962 A1 | 11/2001 |
| WO | 01/95243 A2 | 12/2001 |
| WO | WO 01/95243 A2 | 12/2001 |
| WO | 02/01485 A1 | 1/2002 |
| WO | WO 02/01485 A1 | 1/2002 |
| WO | 02/13134 A2 | 2/2002 |

| | | | |
|---|---|---|---|
| WO | WO 02/13134 A2 | 2/2002 |
| WO | WO 02/21903 A1 | 3/2002 |
| WO | 02/063545 A2 | 8/2002 |
| WO | 02/065246 A2 | 8/2002 |
| WO | 02/065404 A2 | 8/2002 |
| WO | WO 02/063545 A2 | 8/2002 |
| WO | WO 02/065246 A2 | 8/2002 |
| WO | WO 02/065404 A2 | 8/2002 |
| WO | 02/069221 A1 | 9/2002 |
| WO | 02/073512 A1 | 9/2002 |
| WO | WO 02/069221 A1 | 9/2002 |
| WO | WO 02/073512 A1 | 9/2002 |
| WO | 02/086665 A2 | 10/2002 |
| WO | WO 02/086665 A2 | 10/2002 |
| WO | 02/091281 A2 | 11/2002 |
| WO | WO 02/091281 A2 | 11/2002 |
| WO | 02/097575 A2 | 12/2002 |
| WO | 02/101670 A2 | 12/2002 |
| WO | WO 02/097575 A2 | 12/2002 |
| WO | WO 02/101670 A2 | 12/2002 |
| WO | 03/007623 A3 | 3/2003 |

OTHER PUBLICATIONS

"'Magic Wands' to Speed Mobile Sales", BobBrewin, Jan. 15, 2001, http://www.computerworld.com/mobiletopics/mobile/story/1,10801,563300.html (4 pages).

Prophecy Central Update #9, Oct. 10, 1997, http://www.bible-prophecy.com/pcu9.htm (5 pages).

"Microsoft: See SPOT Run on Your Wrist", by. Richard Shim, Jun. 5, 2003, http://news.com.com/2100-1041_3-1013442.html?tag=fd_top (1 page).

"Japan Gets Digital Ticket System: A national ticket seller and phone company are teaming up to create an electronic ticket", RFID Journal, Aug. 31, 2002.

"Security for Wireless Java: NTRU, a startup that offers security software, has relased of Java version of its NTRU encryption algorithm", RFID Journal, Jun. 27, 2002.

"Making RFID Payments Ubiquitous: Philips and Visa want people to be able to pay for goods and services anywhere by using RFID chips embedded in the phones and other devices", RFID Journal; Jun. 2, 2003.

"TI Embarces Prox Card,Standard: Texas Instruments ISO 14443 payment platform promises faster data transfer rates and more security", RFID Journal, Mar. 6, 2003.

Functional Specification, Standard Card IC MFI IC S50, Philips Semiconductors, Product Specification Rev. 5.1 May 2001.

International Search Report and Written Opinion of the International Searching Authority, PCT/US05/26067, May 23, 2007.

"What's New: Timex Watch Features Speedpass System", http://www.speedpass.com/news/article.jsp?id=51 (1 page).

"Physical Reality: A Second Look", Ken Sharp, Senior Technical Editor, http://www.idsystems.com/reader/1999_03/phys0399_pt2/phys0399_pt2.htm.

"'Magic Wands' to Speed Mobile Sales", Bob Brewin,. Jan. 15, 2001, http://www.computerworld.com/mobiletopics/mobile/story/1,10801,563300.html.

"Mobile Speedpass Goes Global as Mobil Singapore Rolls Out Asia's First RFID-Based Pay-At-The-Pump System", Press Release, Apr. 5, 1999, http://www.ti.com/tiris/docs/news_releases/rel12.htm (3 pages).

"Speedpass Unleashed", Jun. 4, 2002 http://www.cardweb.com/cardtrak/news/cf2_20a_97.html (2 pages).

Phophecy Central Update #9, Oct. 10, 1997, http://www.bible.-prophecy.com/pcu9.htm (5 pages).

International Newsletter of the TI RFID Group, Issue 20, 2000 (12 pages).

"CES: Microsoft's SPOT Technology has Humble Origins", by James Niccolai, Jan. 10, 2003, http://archive.inforworld.com/articles/hn/xml/03/01/10/030110hnspot.xml?s=IDGNS (3 pages).

"Microsoft See SPOT Run on Your Wrist", by Richard Shlm, Jun. 5, 2003, http://news.com.com/2100-1041_3-1013442.html?tag=fd_top (1 page).

"Networking: Microsoft SPOT", by Jeremy A. Kaplan, Jul. 1, 2003, http://www.pcmag.com/print_article/0,3048,a=43561,00.asp (2 pages).

"Microsoft Launches Smart Personal Object Technology Initiative", Press Release from COMDEX Fall 2002, Nov. 17, 2002, http://www.Microsoft.com/presspass/features/2002/nov02/11-17SPOT.asp (4 pages).

"Bank Extends RFID Payment Pilot: Bank of America will continue to test its QuickWave RFID payment card for another three months", RFID Journal, Jan. 23, 2003.

"MasterCard to Test RFID Card: Pilot will test whether consumers, merchants and credit card Issuers value "contactless" payments", RFID Journal, Dec. 20, 2002.

"Vendors Target Amusement Parks: Protecting children and enabling cashless payments make RFID an appealing option for the entertainment industry", RFID Journal, Nov. 27, 2002.

"Inside's Next-Gen Smart Card: The French company plans to introduce an RFID card that uses a 16-bit microprocessor and new encryption technology", RFID Journal, Oct. 29, 2002.

"Sony, Philips Creating RFID Link: Consumer electronics giants are jointly developing a new RFID standard for payments and for communication between devices", RFID Journal, Sep. 17, 2002.

"Japan Gets Digital Ticket System: A national ticket seller and phone company are teaming up to create an electronic-ticket network", RFID Journal, Aug. 21, 2002.

"Security for Wireless Java: NTRU, a startup that offers security software, has released a Java version of its NTRU encryption algorithm", RFID Journal, Jun. 27, 2002.

"Making RFID Payments Ubiquitous: Philips and Visa want people to be able to pay for goods and services anywhere by using RFID chips embedded in phones and other devices", RFID Journal, Jun. 2, 2003.

"RFID Smart Cards Gain Ground: The convenience of contactless transactions is driving widespread adoption of contactless smart cards", RFID Journal, Apr. 9, 2003.

"TI Embraces Prox Card Standard: Texas Instrument's ISO 14443 payment platform promises faster data transfer rates and more security", RFID Journal, Mar. 6, 2003.

"Multiple Frequency Transponders: Volume production of dual-band RFID chips begins", Frontline Solutions, Jul. 16, 2003.

Functional Specification, Standard Card IC MF1 1C S. 50, Philips Semiconductors, Product Specification Rev. 5.1 May 2001.

* cited by examiner

```
ARZPP   REVOLVING USE ACCOUNT INQUIRY              S-TSC6-03  09/26/00
ACCT:   0000 000000 00000   AMT:         MONTH:       YEAR:
                                              PLASTIC NO:

REVOLVING USE ACCOUNT    EXP DT       CHG DT        CHARGE AMT   MAG SEQ NO CTR
        1234 5678 9000           2000-09-30   09/09/2000         48.59
        MERCHANT A
        9876 5432 1000           2000-09-30   09/09/2000         59.00

END OF DETAIL
```

FIG. 21

SYSTEM AND METHOD FOR FACILITATING A TRANSACTION USING A REVOLVING USE ACCOUNT ASSOCIATED WITH A PRIMARY ACCOUNT

CROSS-REFERENCE TO RELATED APPLICATIONS

This invention claims priority to U.S. Provisional Patent Application No. 60/512,297, filed Oct. 17, 2003. This invention is also a continuation-in-part of U.S. Ser. No. 10/340, 352, filed on Jan. 10, 2003, and entitled "SYSTEM AND METHOD FOR INCENTING PAYMENT USING RADIO FREQUENCY IDENTIFICATION IN CONTACT AND CONTACTLESS TRANSACTIONS." The '352 application itself claims priority to U.S. Provisional Patent Application No. 60/396,577, filed Jul. 16, 2002, and to U.S. patent application Ser. No. 10/192,488, entitled "SYSTEM AND METHOD FOR PAYMENT USING RADIO FREQUENCY IDENTIFICATION IN CONTACT AND CONTACTLESS TRANSACTIONS," filed on Jul. 9, 2002 (which itself claims priority to U.S. Provisional No. 60/304,216, filed on Jul. 10, 2001); U.S. patent application Ser. No. 10/318,432, entitled "SYSTEM AND METHOD FOR SELECTING LOAD OPTIONS FOR USE IN RADIO FREQUENCY IDENTIFICATION IN CONTACT AND CONTACTLESS TRANSACTIONS," filed Dec. 13, 2002; and U.S. patent application Ser. No. 10/318,480, entitled "SYSTEM AND METHOD FOR PAYMENT USING RADIO FREQUENCY IDENTIFICATION IN CONTACT AND CONTACTLESS TRANSACTIONS," filed Dec. 13, 2002. All of the above applications are hereby incorporated by reference.

FIELD OF INVENTION

This application generally relates to a system for facilitating transactions utilizing a revolving use account that is associated with a primary account. More particularly, the system allows an accountholder to create one or more revolving use accounts that can be stored on one or more transaction devices associated with the primary account.

BACKGROUND OF INVENTION

Like barcode and voice data entry, RFID is a contactless information acquisition technology. RFID systems are wireless, and are usually extremely effective in hostile environments where conventional acquisition methods fail. RFID has established itself in a wide range of markets, such as, for example, the high-speed reading of railway containers, tracking moving objects such as livestock or automobiles, and retail inventory applications. As such, RFID technology has become a primary focus in automated data collection, identification and analysis systems worldwide.

Of late, companies are increasingly embodying RFID data acquisition technology in a fob or tag for use in completing financial transactions. A typical fob includes a transponder and is ordinarily a self-contained device which may be contained on any portable form factor. In some instances, a battery may be included with the fob to power the transponder. In which case the internal circuitry of the fob (including the transponder) may draw its operating power from the battery power source. Alternatively, the fob may exist independent of an internal power source. In this instance the internal circuitry of the fob (including the transponder) may gain its operating power directly from an RF interrogation signal. U.S. Pat. No. 5,053,774, issued to Schuermann, describes a typical transponder RF interrogation system which may be found in the prior art. The Schuermann patent describes in general the powering technology surrounding conventional transponder structures. U.S. Pat. No. 4,739,328 discusses a method by which a conventional transponder may respond to a RF interrogation signal. Other typical modulation techniques which may be used include, for example, ISO/IEC 14443 and the like.

In the conventional fob powering technologies used, the fob is typically activated upon presenting the fob in an interrogation signal. In this regard, the fob may be activated irrespective of whether the user desires such activation. Inadvertent presentation of the fob may result in initiation and completion of an unwanted transaction. Thus, a fob system is needed which allows the fob user to control activation of the fob to limit transactions being undesirably completed.

One of the more visible uses of the RFID technology is found in the introduction of Exxon/Mobil's Speedpass® and Shell's EasyPay® products. These products use transponders placed in a fob or tag which enables automatic identification of the user when the fob is presented at a Point-of-Sale (POS) device. Fob identification data is typically passed to a third-party server database, where the identification data is referenced to a customer (e.g., user) credit or debit account. In an exemplary processing method, the server seeks authorization for the transaction by passing the transaction and account data to an authorizing entity. Once authorization is received by the server, clearance is sent to the point-of-sale device for completion of the transaction. In this way, the conventional transaction processing method involves an indirect path which causes undue overhead due to the use of the third-party server.

SUMMARY OF INVENTION

The present invention involves a method and system for facilitating a transactions by providing a revolving use account that is associated with a primary account number, wherein the revolving use account has conditions-of-use placed on it that limit how the account may be used. The revolving use account may be used by a user who is not the primary account holder. The present invention may include the steps of further issuing said revolving use account to a first party to facilitate a transaction with a second party. The revolving use account may also be refilled if needed.

These features and other advantages of the system and method, as well as the structure and operation of various exemplary embodiments of the system and method, are described below.

BRIEF DESCRIPTION OF THE DRAWINGS

The accompanying drawings, wherein like numerals depict like elements, illustrate exemplary embodiments of the present invention, and together with the description, serve to explain the principles of the invention. In the drawings:

FIG. 17 is a web page screen shot of a issuer's exemplary online registration page for a transaction system;

FIG. 18 is a web page screen shot of a issuer's exemplary online log-in page for a transaction system;

FIG. 21 is an screen shot of an exemplary transaction history report of the present invention;

DETAILED DESCRIPTION

Figure 1A:
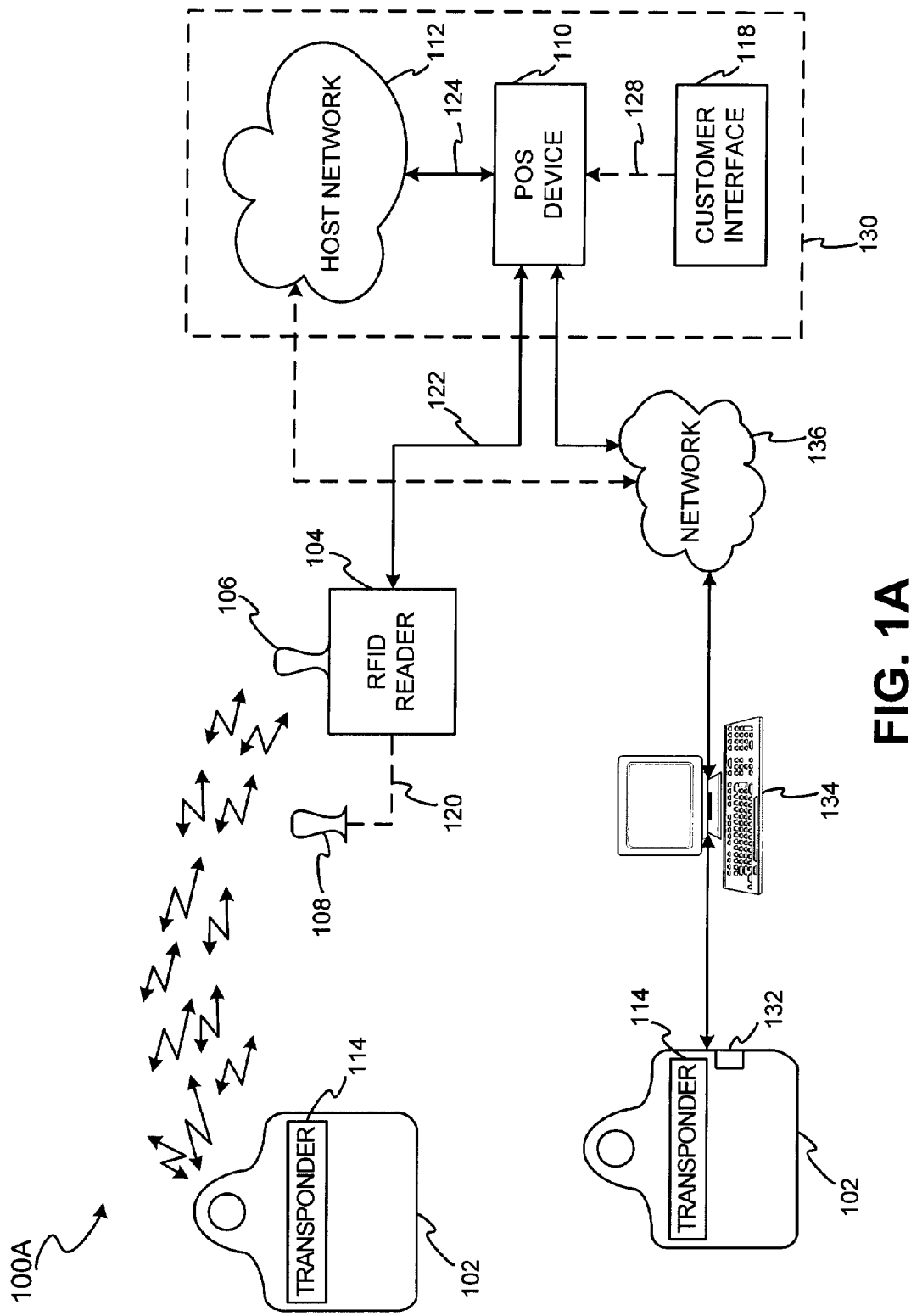
FIG. 1A illustrates an exemplary RFID-based system in accordance with the present invention.

The present invention may be described herein in terms of functional block components, screen shots, optional selections and various processing steps. Such functional blocks may be realized by any number of hardware and/or software components configured to perform to specified functions. For example, the present invention may employ various integrated circuit components (e.g., memory elements, processing elements, logic elements, look-up tables, and the like), which may carry out a variety of functions under the control of one or more mircroprocessors or other control devices. Similarly, the software elements of the present invention may be implemented with any programming or scripting language such as C, C++, Java, COBOL, assembler, PERL, extensible markup language (XML), javaCard and MULTOS with the various algorithms being implemented with any combination of data structures, objects, processes, routines or other programming elements. Further, it should be noted that the present invention may employ any number of conventional techniques for data transmission, signaling, data processing, network control, and the like. For a basic introduction on cryptography, review a text written by Bruce Schneier entitled "Applied Cryptography: Protocols, Algorithms, and Source Code in C," published by John Wiley & Sons (second edition, 1996), herein incorporated by reference.

The computing units may be connected with each other via a data communication network. The network may be a public network and assumed to be insecure and open to eavesdroppers. In the illustrated implementation, the network may be embodied as the Internet. In this context, the computers may or may not be connected to the Internet at all times. For instance, the customer computer may employ a modem to occasionally connect to the Internet, whereas the bank computing center might maintain a permanent connection to the Internet. Specific information related to the protocols, standards, and application software utilized in connection with the Internet may not be discussed herein. For further information regarding such details, see, for example, Dilip Naik, "Internet Standards and Protocols" (1998); "Java 2 Complete," various authors (Sybex 1999); Deborah Ray and Eric Ray, "Mastering HTML 4.0" (1997); Loshin, "TCP/IP Clearly Explained" (1997). All of these texts are hereby incorporated by reference.

It may be appreciated that many applications of the present invention could be formulated. One skilled in the art may appreciate that a network may include any system for exchanging data or transacting business, such as the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris or the like. Moreover, although the invention is frequently described herein as being implemented with TCP/IP communications protocols, it may be readily understood that the invention could also be implemented using IPX, Appletalk, IP-6, NetBIOS, OSI or any number of existing or future protocols. Moreover, the present invention contemplates the use, sale or distribution of any goods, services or information over any network having similar functionality described herein.

In accordance with various embodiments of the invention, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access or SQL Server, Oracle, Sybase, Informix MySQL, Interbase, etc., may be used to provide an ADO-compliant database management system. The term "webpage" as it is used herein is not meant to limit the type of documents and applications that might be used to interact with the user. For example, a typical website might include, in addition to standard HTML documents, various forms, Java applets, javascript, active server pages (ASP), common gateway interface scripts (CGI), extensible markup language (XML), dynamic HTML, cascading style sheets (CSS), helper applications, plug-ins, and/or the like.

Where required, the system user may interact with the system via any input device such as, a keypad, keyboard, mouse, kiosk, personal digital assistant, handheld computer (e.g., Palm Pilot®, Blackberry®), cellular phone and/or the like. Similarly, the invention could be used in conjunction with any type of personal computer, network computer, work station, minicomputer, mainframe, or the like running any operating system such as any version of Windows, Windows XP, Windows NT, Windows 2000, Windows 98, Windows 95, MacOS, OS/2, BeOS, Linux, UNIX, Solaris, MVS or the like. Moreover, although the invention may frequently be described as being implemented with TCP/IP communications protocol, it should be understood that the invention could also be implemented using SNA, IPX, Appletalk, IPte, NetBIOS, OSI or any number of communications protocols. Moreover, the system contemplates the use, sale, or distribution of any goods, services or information over any network having similar functionality described herein.

FIG. 1A illustrates an exemplary RFID transaction system 100A in accordance with the present invention, wherein exemplary components for use in completing a fob transaction are depicted. In general, the operation of system 100A may begin when fob 102 is presented for payment, and is interrogated by RFID reader 104 or, alternatively, interface 134. Fob 102 and RFID reader 104 may then engage in mutual authentication after which the transponder 102 may provide the transponder identification and/or account identifier to the RFID reader 104 which may further provide the information to the merchant system 130 POS device 110.

System 100A may include fob 102 having a transponder 114 and RFID reader 104 in RF communication with fob 102. Although the present invention is described with respect to a fob 102, the invention is not to be so limited. Indeed, system 100 may include any device having a transponder which is configured to communicate with RFID reader 104 via RF communication. Typical devices may include, for example, a key ring, tag, card, cell phone, wristwatch or any such form capable of being presented for interrogation.

RFID reader 104 may be configured to communicate using a RFID internal antenna 106. Alternatively, RFID reader 104 may include an external antenna 108 for communications with fob 102, where the external antenna may be made remote to RFID reader 104 using a suitable cable and/or data link 120. RFID reader 104 may be further in communication with merchant system 130 via a data link 122. System 100A may include a transaction completion system including a point-of-interaction device such as, for example, a merchant point-of-sale (POS) device 110 or a computer interface (e.g., user interface) 134. In one exemplary embodiment the transaction completion system may include merchant system 130 including POS device 110 in communication with RFID reader 104 (via data link 122). As described more fully below, the transaction completion system may include the user interface 134 connected to a network 136 and to the transponder via a USB connector 132.

Although the point-of-interaction device is described herein with respect to a merchant point-of-sale (POS) device, the invention is not to be so limited. Indeed, a merchant POS device is used herein by way of example, and the point-of-interaction device may be any device capable of receiving fob account data. In this regard, the POS may be any point-of-interaction device enabling the user to complete a transaction using fob 102. POS device 110 may be in further communication with a customer interface 118 (via data link 128) for entering at least a customer identity verification information. In addition, POS device 110 may be in communication with a merchant host network 112 (via data link 124) for processing any transaction request. In this arrangement, information provided by RFID reader 104 is provided to POS device 110 of merchant system 130 via data link 122. POS device 110 may receive the information (and alternatively may receive any identity verifying information from customer interface 118 via data link 128) and provide the information to host system 112 for processing.

A variety of conventional communications media and protocols may be used for data links 120, 122, 124, and 128. For example, data links 120, 122, 124, and 128 may be an Internet Service Provider (ISP) configured to facilitate communications over a local loop as is typically used in connection with standard modem communication, cable modem, dish networks, ISDN, Digital Subscriber Lines (DSL), or any wireless communication media. In addition, the merchant system 130 including POS device 110 and host network 112 may reside on a local area network which interfaces to a remote network (not shown) for remote authorization of an intended transaction. The merchant system 130 may communicate with the remote network via a leased line, such as a T1, D3 line, or the like. Such communications lines are described in a variety of texts, such as, "Understanding Data Communications," by Gilbert Held, which is incorporated herein by reference.

An account number, as used herein, may include any identifier for an account (e.g., credit, charge debit, checking, savings, reward, loyalty, or the like) which may be maintained by a transaction account provider (e.g., payment authorization center) and which may be used to complete a financial transaction. A typical account number (e.g., account data) may be correlated to a credit or debit account, loyalty account, or rewards account maintained and serviced by such entities as American Express®, Visa® and/or MasterCard® or the like. For ease in understanding, the present invention may be described with respect to a credit account. However, it should be noted that the invention is not so limited and other accounts permitting an exchange of goods and services for an account data value is contemplated to be within the scope of the present invention.

In addition, the account number (e.g., account data) may be associated with any device, code, or other identifier/indicia suitably configured to allow the consumer to interact or communicate with the system, such as, for example, authorization/access code, personal identification number (PIN), Internet code, digital certificate, biometric data, and/or other identification indicia. The account number may be optionally located on a rewards card, charge card, credit card, debit card, prepaid card, telephone card, smart card, magnetic stripe card, bar code card, and/or the like. The account number may be distributed and stored in any form of plastic, electronic, magnetic, and/or optical device capable of transmitting or downloading data to a second device. A customer account number may be, for example, a sixteen-digit credit card number, although each credit provider has its own numbering system, such as the fifteen-digit numbering system used by American Express®. Each company's credit card numbers comply with that company's standardized format such that the company using a sixteen-digit format will generally use four spaced sets of numbers, as represented by the number "0000 0000 0000 0000". In a typical example, the first five to seven digits are reserved for processing purposes and identify the issuing bank, card type and, etc. In this example, the last sixteenth digit is used as a sum check for the sixteen-digit number. The intermediary eight-to-ten digits are used to uniquely identify the customer. The account number stored as Track 1 and Track 2 data as defined in ISO/IEC 7813, and further may be made unique to fob 102. In one exemplary embodiment, the account number may include a unique fob serial number and user identification number, as well as specific application applets. The account number may be stored in fob 102 inside a database 214, as described more fully below. Database 214 may be configured to store multiple account numbers issued to fob 102 user by the same or different account providing institutions. Where the account data corresponds to a loyalty or rewards account, database 214 may be configured to store the attendant loyalty or rewards points data.

A "transaction," as defined herein, includes, inter alia, any exchange and/or delivery of value, exchange and/or delivery of data, gifting of value and/or data, etc. The term "transaction" not only contemplates an exchange of goods and/or services for value from one party to another, but also the gifting of something from one party to another.

Figure 2:
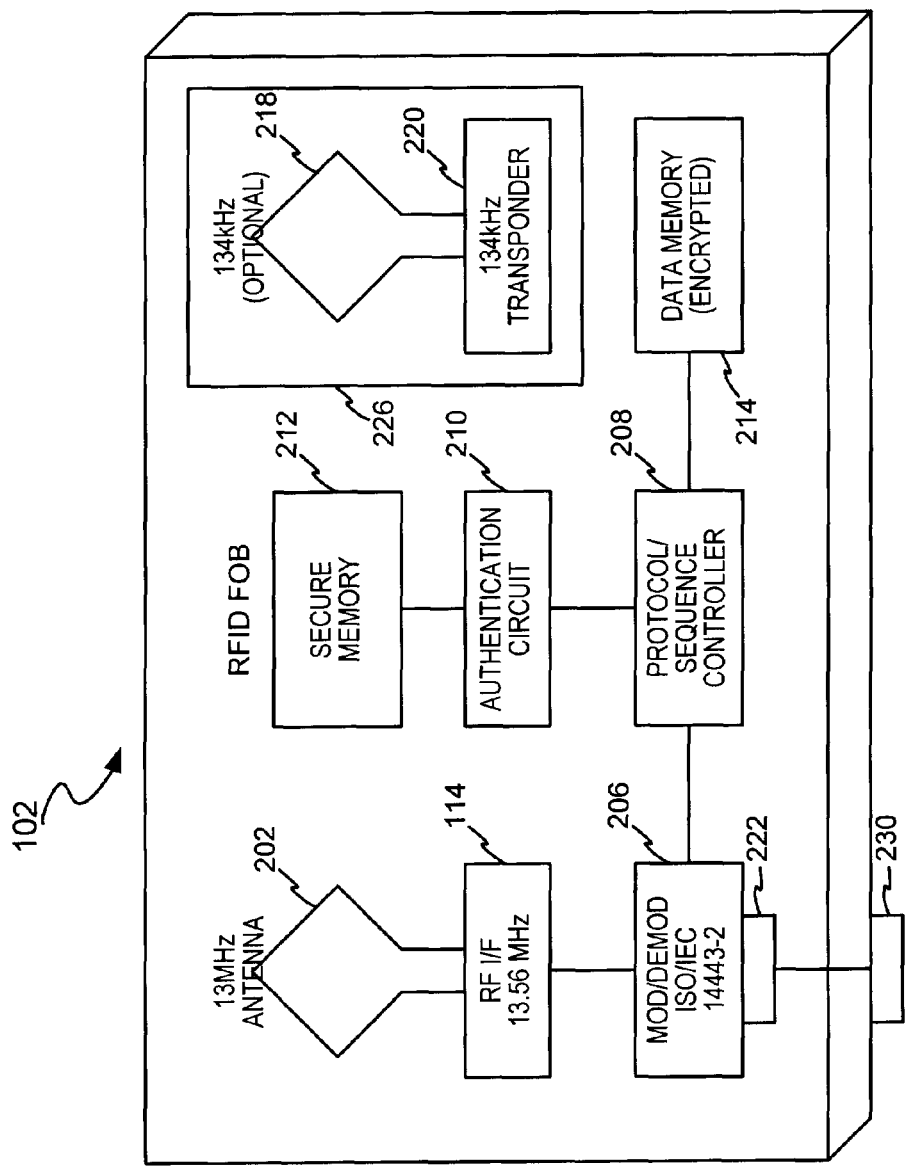
FIG. 2 is a schematic illustration of an exemplary fob in accordance with the present invention.

FIG. 2 illustrates a block diagram of the many functional blocks of an exemplary fob 102 in accordance with the present invention. Fob 102 may be a RFID fob 102 which may be presented by the user to facilitate an exchange of funds or points, etc., for receipt of goods or services. As described herein, by way of example, fob 102 may be a RFID fob which may be presented for facilitating payment for goods and/or services.

Fob 102 may include an antenna 202 for receiving an interrogation signal from RFID reader 104 via antenna 106 (or alternatively, via external antenna 108). Fob antenna 202 may be in communication with a transponder 114. In one exemplary embodiment, transponder 114 may be a 13.56 MHz transponder compliant with the ISO/IEC 14443 standard, and antenna 202 may be of the 13 MHz variety. Transponder 114 may be in communication with a transponder compatible modulator/demodulator 206 configured to receive the signal from transponder 114 and configured to modulate the signal into a format readable by any later connected circuitry. Further, modulator/demodulator 206 may be configured to format (e.g., demodulate) a signal received from the later connected circuitry in a format compatible with transponder 114 for transmitting to RFID reader 104 via antenna 202. For example, where transponder 114 is of the 13.56 MHz variety, modulator/demodulator 206 may be ISO/IEC 14443-2 compliant. Fob 102 may also be configured for near field communication. See, for example, Sony's "Near Field Communication" ("NFC") emerging standard which is touted as operating on 13.56 MHz and allowing the transfer of any kind of data between NFC enabled devices and across a distance of up to twenty centimeters. See also, Bluetooth chaotic network configurations; described in more detail at http://www.palowireless.com/infotooth/whatis.asp, which is incorporated herein by reference. Furthermore, data on a first fob 102 may be transmitted directly or indirectly to another fob 102 to create a copy of all or part of the original device.

Modulator/demodulator 206 may be coupled to a protocol/sequence controller 208 for facilitating control of the authentication of the signal provided by RFID reader 104, and for facilitating control of the sending of fob 102 account number. In this regard, protocol/sequence controller 208 may be any suitable digital or logic driven circuitry capable of facilitating determination of the sequence of operation for fob 102 inner-circuitry. For example, protocol/sequence controller 208 may be configured to determine whether the signal provided by RFID reader 104 is authenticated, and thereby providing to RFID reader 104 the account number stored on fob 102.

Protocol/sequence controller 208 may be further in communication with authentication circuitry 210 for facilitating authentication of the signal provided by RFID reader 104. Authentication circuitry may be further in communication with a non-volatile secure memory database 212. Secure memory database 212 may be any suitable elementary file system such as that defined by ISO/IEC 7816-4 or any other elementary file system allowing a lookup of data to be interpreted by the application on the chip. Database 212 may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. Database 212 may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables.

More particularly, a "key field" partitions the database according to the high-level class of objects defined by the key field. For example, certain types of data may be designated as a key field in a plurality of related data tables and the data tables may then be linked on the basis of the type of data in the key field. In this regard, the data corresponding to the key field in each of the linked data tables may be preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, for example, storing individual files using an ISO/IEC 7816-4 file structure; implementing a domain whereby a dedicated file may be selected that exposes one or more elementary files containing one or more data sets; using data sets stored in individual files using a hierarchical filing system; data sets stored as records in a single file (for example, compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats may be facilitated by storing the information as a Block of Binary (BLOB). Thus, any binary information may be stored in a storage space associated with a data set. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with a wide variety of system components by multiple and unrelated owners of the data sets. For example, a first data set which may be stored may be provided by a first issuer, a second data set which may be stored may be provided by an unrelated second issuer, and yet a third data set which may be stored, may be provided by a third issuer unrelated to the first and second issuer. Each of these three exemplary data sets may contain different information that may be stored using different data storage formats and/or techniques. Further, each data set may contain subsets of data which also may be distinct from other subsets.

As stated above, in various embodiments of the present invention, the data may be stored without regard to a common format. However, in one exemplary embodiment of the present invention, the data set (e.g., BLOB) may be annotated in a standard manner when provided for manipulating the data onto the network. The annotation may comprise a short header, trailer, or other appropriate indicator related to each data set that may be configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set (e.g., LOADED, INITIALIZED, READY, BLOCKED, REMOVABLE, or DELETED). Subsequent bytes of data may be used to indicate for example, the identity of the resource, user, account identifier or the like. Each of these condition annotations are further discussed herein.

The data may be used by protocol/sequence controller 208 for data analysis and used for management and control purposes, as well as security purposes. Authentication circuitry may authenticate the signal provided by RFID reader 104 by association of the RFID signal to authentication keys stored on database 212. Encryption circuitry may use keys stored on database 212 to perform encryption and/or decryption of signals sent to or from RFID reader 104.

In addition, protocol/sequence controller 208 may be in communication with a database 214 for storing at least fob 102 account data, and a unique fob 102 identification code. Protocol/sequence controller 208 may be configured to retrieve the account number from database 214 as desired. Database 214 may be of the same configuration as database 212 described above. The fob account data and/or unique fob identification code stored on database 214 may be encrypted prior to storage. Thus, where protocol/sequence controller 208 retrieves the account data, and or unique fob identification code from database 214, the account number may be encrypted when being provided to RFID reader 104. Further, the data stored on database 214 may include, for example, an unencrypted unique fob 102 identification code, a user identification, Track 1 and 2 data, as well as specific application applets.

Fob 102 may be configured to respond to multiple interrogation frequency transmissions provided by RFID reader 104. That is, as described more fully below, RFID reader 104 may provide more than one RF interrogation signal. In this case, fob 102 may be configured to respond to the multiple frequencies by including in fob 102 one or more additional RF signal receiving/transmitting units 226. RF signal receiving/transmitting unit 226 may include an antenna 218 and transponder 220 where the antenna 218 and transponder 220 are compatible with at least one of the additional RF signals provided by RFID reader 104. For example, in one exemplary embodiment, fob 102 may include a 134 KHz antenna 218 configured to communicate with a 134 KHz transponder 220. In this exemplary configuration, an ISO/IEC 14443-2 compliant modulator/demodulator may not be required. Instead, the 134 KHz transponder may be configured to communicate directly with the protocol/sequence controller 208 for transmission and receipt of authentication and account number signals as described above.

In another embodiment, fob 102 may further include a universal serial bus (USB) connector 132 for interfacing fob 102 to a user interface 134. User interface 134 may be further in communication with a POS device 110 via a network 136. Network 136 may be the Internet, an intranet, or the like as is described above with respect to network 112. Further, the user interface 134 may be similar in construction to any conventional input devices and/or computing systems aforementioned for permitting the system user to interact with the system. In one exemplary embodiment, fob 102 may be configured to facilitate online Internet payments. A USB converter 222 may be in communication with a USB connector 232 for facilitating the transfer of information between the modulator/demodulator 206 and USB connector 132. Alternatively, USB converter 222 may be in communication with protocol/sequence controller 208 to facilitate the transfer of information between protocol/sequence controller 208 and USB connector 132.

Where fob 102 includes a USB connector 132, fob 102 may be in communication with, for example, a USB port on user interface 134. The information retrieved from fob 102 may be compatible with credit card and/or smart card technology enabling usage of interactive applications on the Internet. No RFID reader may be required in this embodiment since the connection to POS device 110 may be made using a USB port on user interface 134 and a network 136.

Fob 102 may include means for enabling activation of the fob by the user. In one exemplary embodiment, a switch 230 which may be operated by the user of fob 102. The switch 230 on fob 102 may be used to selectively or inclusively activate fob 102 for particular uses. In this context, the term "selectively" may mean that the switch 230 enables the user to place fob 102 in a particular operational mode. For example, the user may place fob 102 in a mode for enabling purchase of a good or of a service using a selected account number. Alternatively, the fob may be placed in a mode as such that the fob account number is provided by USB port 132 (or serial port) only and fob transponder 114 is disabled. In addition, the term "inclusively" may mean that fob 102 is placed in an operational mode permitting fob 102 to be responsive to the RF interrogation and interrogation via the USB connector 132. In one particular embodiment, the switch 230 may remain in an OFF position ensuring that one or more applications or accounts associated with fob 102 are non-reactive to any commands issued by RFID reader 104. As used herein, the OFF position may be termed the "normal" position of the activation switch 230, although other normal positions are contemplated.

In another exemplary embodiment, when switch 230 is moved from the OFF position, fob 102 may be deemed activated by the user. That is, switch 230 may activate internal circuitry in fob 102 for permitting the fob to be responsive to RF signals (e.g., commands from RFID reader 104). In this way, switch 230 may facilitate control of the active and inactive states of fob 102. Such control increases the system security by preventing inadvertent or illegal use of fob 102.

In one exemplary embodiment, switch 230 may be a simple mechanical device in communication with circuitry which may electrically prevent the fob from being powered by a RFID reader. That is, when switch 230 is in its normal position, switch 230 may provide a short to fob 102 internal circuitry, preventing fob 102 from being responsive to interrogation by RF or via the USB connector 232. In this arrangement, switch 230 may be, for example, a "normally closed" (NC) configured switch, which may be electrically connected to the antenna 202 at the interface of the antenna 202 and transponder 114. Switch 230 may be depressed, which may open switch 230 fully activating the antenna 202.

In yet another exemplary embodiment, fob 102 may include a biometric sensor and biometric membrane configured to operate as switch 230 and activate fob 102 when provided biometric signal from fob 102 user. Such biometric signal may be the digital reading of a fingerprint, thumbprint, or the like. Typically, where biometric circuitry is used, the biometric circuitry may be powered by an internal voltage source (e.g., battery). In this case, the switch may not be a simple mechanical device, but a switch which is powered. In yet another exemplary embodiment, switch 230 may be battery powered though no biometric circuitry is present in fob 102.

In yet another embodiment, switch 230 may be a logic switch. Where switch 230 is a logic switch, switch 230 control software may be read from the sequence controller 208 to selectively control the activation of the various fob 102 components.

Figure 3:
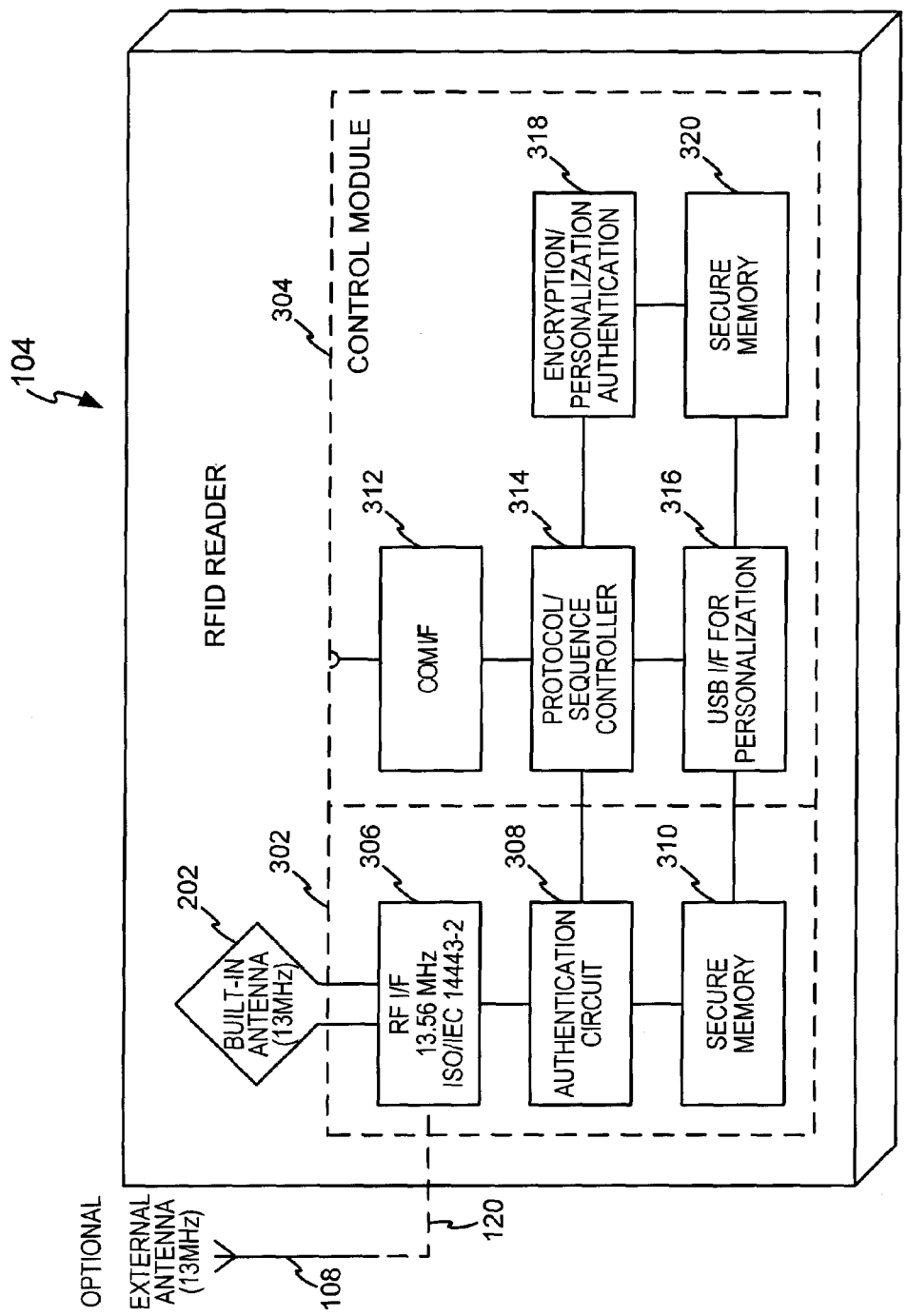
FIG. 3 is a schematic illustration of an exemplary RFID reader in accordance with the present invention.

FIG. 3 illustrates an exemplary block diagram of RFID reader 104 in accordance with an exemplary embodiment of the present invention. RFID reader 104 includes, for example, an antenna 106 coupled to a RF module 302, which is further coupled to a control module 304. In addition, RFID reader 104 may include an antenna 108 positioned remotely from RFID reader 104 and coupled to RFID reader 104 via a suitable cable 120, or other wire or wireless connection.

RF module 302 and antenna 106 may be suitably configured to facilitate communication with fob 102. Where fob 102 is formatted to receive a signal at a particular RF frequency, RF module 302 may be configured to provide an interrogation signal at that same frequency. For example, in one exemplary embodiment, fob 102 may be configured to respond to an interrogation signal of about 13.56 MHz. In this case, RFID antenna 106 may be 13 MHz and may be configured to transmit an interrogation signal of about 13.56 MHz. That is, fob 102 may be configured to include a first and second RF module (e.g., transponder) where the first module may operate using a 134 kHz frequency and the second RF module may operate using a 13.56 MHz frequency. RFID reader 104 may include two receivers which may operate using the 134 kHz frequency, the 13.56 MHz frequency or both. When the reader 104 is operating at 134 kHz frequency, only operation with the 134 kHz module on fob 102 may be possible. When the reader 104 is operating at the 13.56 MHz frequency, only operation with the 13.56 MHz module on fob 102 may be possible. Where the reader 104 supports both a 134 kHz frequency and a 13.56 MHz RF module, fob 102 may receive both signals from the reader 104. In this case, fob 102 may be configured to prioritize selection of the one or the other frequency and reject the remaining frequency. Alternatively, the reader 104 may receive signals at both frequencies from the fob upon interrogation. In this case, the reader 104 may be configured to prioritize selection of one or the other frequency and reject the remaining frequency.

Further, protocol/sequence controller 314 may include an optional feedback function for notifying the user of the status of a particular transaction. For example, the optional feedback may be in the form of an LED, LED screen and/or other visual display which is configured to light up or display a static, scrolling, flashing and/or other message and/or signal to inform fob 102 user that the transaction is initiated (e.g., fob is being interrogated), the fob is valid (e.g., fob is authenticated), transaction is being processed, (e.g., fob account number is being read by RFID reader) and/or the transaction is accepted or denied (e.g., transaction approved or disapproved). Such an optional feedback may or may not be accompanied by an audible indicator (or may present the audible indicator singly) for informing fob 102 user of the transaction status. The audible feedback may be a simple tone, multiple tones, musical indicator, and/or voice indicator configured to signify when fob 102 is being interrogated, the transaction status, or the like.

RFID antenna 106 may be in communication with a transponder 306 for transmitting an interrogation signal and receiving at least one of an authentication request signal and/or an account data from fob 102. Transponder 306 may be of similar description as transponder 114 of FIG. 2. In particular, transponder 306 may be configured to send and/or receive RF signals in a format compatible with antenna 202 in similar manner as was described with respect to fob transponder 114. For example, where transponder 306 is 13.56 MHz RF rated antenna 202 may be 13.56 MHz compatible. Similarly, where transponder 306 is ISO/IEC 14443 rated, antenna 106 may be ISO/IEC 14443 compatible.

RF module 302 may include, for example, transponder 306 in communication with authentication circuitry 308 which may be in communication with a secure database 310. Authentication circuitry 308 and database 310 may be of similar description and operation as described with respect to authentication circuitry 210 and secure memory database 212 of FIG. 2. For example, database 310 may store data corresponding to fob 102 which are authorized to transact business over system 100. Database 310 may additionally store RFID reader 104 identifying information for providing to fob 102 for use in authenticating whether RFID reader 104 is authorized to be provided the fob account number stored on fob database 214.

Authentication circuitry 308 may be of similar description and operation as authentication circuitry 210. That is, authentication circuitry 308 may be configured to authenticate the signal provided by fob 102 in similar manner that authentication circuitry 210 may be configured to authenticate the signal provided by RFID reader 104. As is described more fully below, fob 102 and RFID reader 104 engage in mutual authentication. In this context, "mutual authentication" may mean that operation of system 100 may not take place until fob 102 authenticates the signal from RFID reader 104, and RFID reader 104 authenticates the signal from fob 102.

Figure 4:
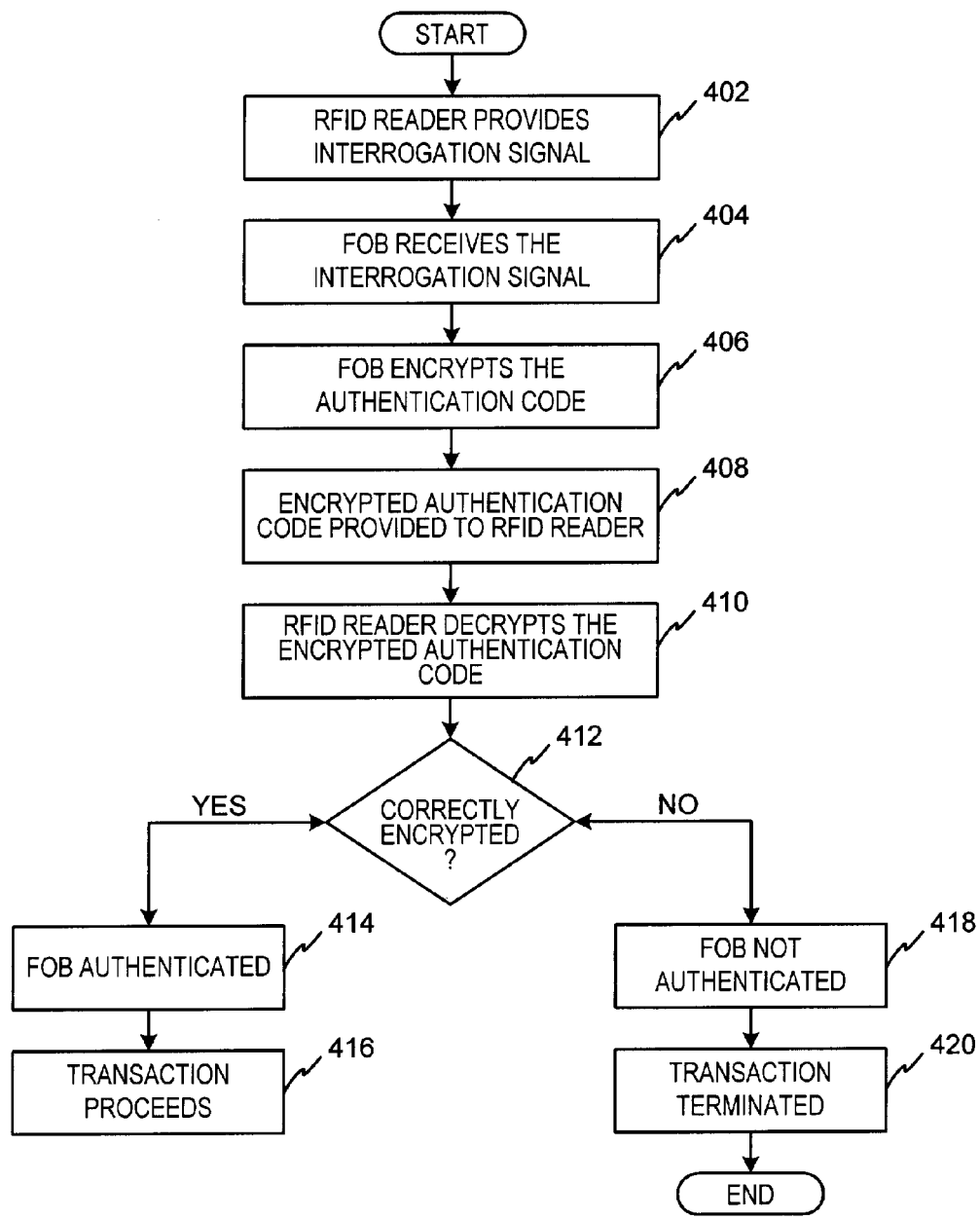
FIG. 4 is an exemplary flow diagram of an exemplary authentication process in accordance with the present invention.

FIG. 4 is a flowchart of an exemplary authentication process in accordance with the present invention. The authentication process is depicted as one-sided. That is, the flowchart depicts the process of RFID reader 104 authenticating fob 102, although similar steps may be followed in the instance that fob 102 authenticates RFID reader 104.

As noted, database 212 may store security keys for encrypting or decrypting signals received from RFID reader 104. In an exemplary authentication process, where RFID reader 104 is authenticating fob 102, RFID reader 104 may provide an interrogation signal to fob 102 (step 402). The interrogation signal may include a random code generated by the RFID reader authentication circuit 210, which is provided to fob 102 and which is encrypted using an unique encryption key corresponding to fob 102 unique identification code. For example, the protocol/sequence controller 314 may provide a command to activate the authentication circuitry 308. Authentication circuitry 308 may provide from database 310 a fob interrogation signal including a random number as a part of the authentication code generated for each authentication signal. The authentication code may be an alphanumeric code which is recognizable (e.g., readable) by RFID reader 104 and fob 102. The authentication code may be provided to fob 102 via the RFID RF interface 306 and antenna 106 (or alternatively antenna 108).

Fob 102 receives the interrogation signal (step 404). The interrogation signal including the authorization code may be received at RF interface 114 via antenna 202. Once fob 102 is activated, the interrogation signal including the authorization code may be provided to the modulator/demodulator circuit 206 where the signal may be demodulated prior to providing the signal to protocol/sequence controller 208. Protocol/sequence controller 208 may recognize the interrogation signal as a request for authentication of fob 102, and provide the authentication code to authentication circuit 210. Fob 102 may then encrypt the authentication code (step 406). In particular, encryption may be done by authentication circuit 210, which may receive the authentication code and encrypt the code prior to providing the encrypted authentication code to protocol/sequence controller 208. Fob 102 may then provide the encrypted authentication code to RFID reader 104 (step 408). That is, the encrypted authentication code may be provided to RFID reader 104 via modulator/demodulator circuit 206, RF interface 114 (e.g., transponder 114) and antenna 202.

RFID reader 104 may then receive the encrypted authentication code and decrypt it (step 410). That is, the encrypted authentication code may be received at antenna 106 and RF interface 306 and may be provided to authentication circuit 308. Authentication circuit 308 may be provided a security authentication key (e.g., transponder system decryption key) from database 310. The authentication circuit may use the authentication key to decrypt (e.g., unlock) the encrypted authorization code. The authentication key may be provided to the authentication circuit based on fob 102 unique identification code. For example, the encrypted authentication code may be provided along with the unique fob 102 identification code. The authentication circuit 308 may receive fob 102 unique identification code and retrieve from the database 310 a transponder system decryption key correlative to the unique fob 102 identification code for use in decrypting the encrypted authentication code.

Once the authentication code is decrypted, the decrypted authentication code is compared to the authentication code provided by RFID reader 104 at step 402 (step 412) to verify its authenticity. If the decrypted authorization code is not readable (e.g., recognizable) by the authentication circuit 308, fob 102 is deemed to be unauthorized (e.g., unverified) (step 416) and the operation of system 100 is terminated (step 418). Contrarily, if the decrypted authorization code is recognizable (e.g., verified) by fob 102, the decrypted authorization code is deemed to be authenticated (step 412), and the transaction is allowed to proceed (step 414). In one particular embodiment, the proceeding transaction may mean that fob 102 may authenticate RFID reader 104 prior to RFID reader 104 authenticating fob 102, although, it should be apparent that RFID reader 104 may authenticate fob 102 prior to fob 102 authenticating RFID reader 104.

It should be noted that in an exemplary verification process, the authorization circuit 308 may determine whether the unlocked authorization code is identical to the authorization code provided in step 402. If the codes are not identical then fob 102 is not authorized to access system 100. Although, the verification process is described with respect to identicality, identicality is not required. For example, authentication circuit 308 may verify the decrypted code through any protocol, steps, or process for determining whether the decrypted code corresponds to an authorized fob 102.

Figure 5:
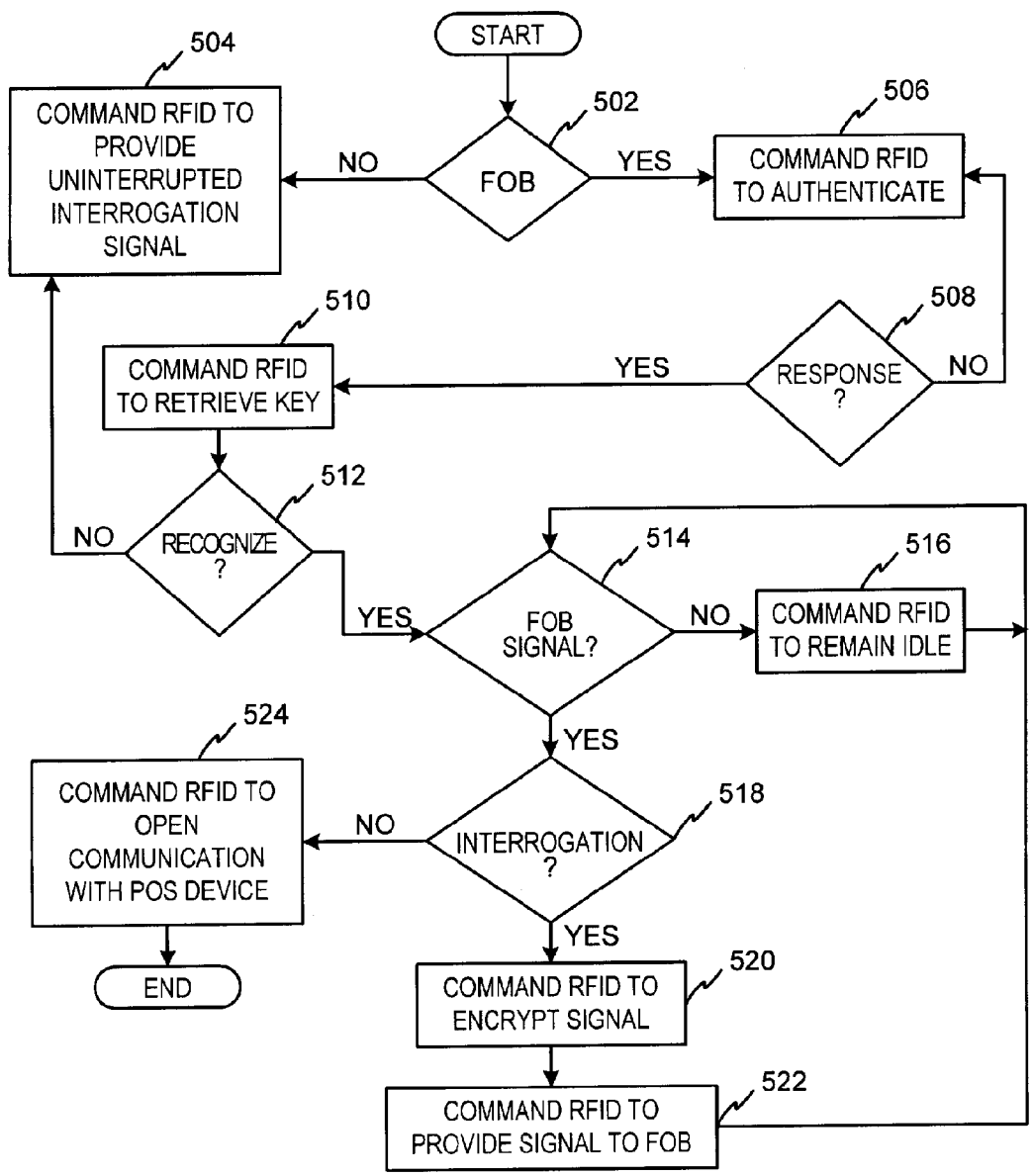
FIG. 5 is an exemplary flow diagram of an exemplary decision process for a protocol/sequence controller in accordance with the present invention.

Authentication circuitry 308 may additionally be in communication with a protocol/sequence controller 314 of similar operation and description as protocol/sequence controller 208 of FIG. 2. That is, protocol/sequence device controller 314 may be configured to determine the order of operation of RFID reader 104 components. For example, FIG. 5 illustrates an exemplary decision process under which protocol/sequence controller 314 may operate. Protocol/sequence controller 314 may command the different components of RFID reader 104 based on whether fob 102 is present (step 502). For example, if fob 102 is not present, then protocol/sequence controller 314 may command RFID reader 104 to provide an uninterrupted interrogation signal (step 504). That is, the protocol/sequence controller may command the authentication circuit 308 to provide an uninterrupted interrogation signal until the presence of fob 102 is realized. If fob 102 is present, protocol/sequence controller 314 may command RFID reader 104 to authenticate fob 102 (step 506).

As noted above, authentication may mean that protocol/sequence controller 314 may command authentication circuit 308 to provide fob 102 with an authorization code. If a response is received from fob 102, protocol/sequence controller may determine if the response is a response to RFID reader 104 provided authentication code, or if the response is a signal requiring authentication (step 508). If the signal requires authentication, then protocol/sequence controller 314 may activate the authentication circuit as described above (step 506). On the other hand, if fob 102 signal is a response to the provided authentication code, then protocol/sequence controller 314 may command RFID reader 104 to retrieve the appropriate security key for enabling recognition of the signal (step 510). That is, protocol/sequence controller 314 may command authentication circuit 308 to retrieve from database 310 a security key (e.g., transponder system decryption key), unlock the signal, and compare the signal to the signal provided by RFID reader 104 in the authentication process (e.g., step 506). If the signal is recognized, protocol/sequence controller 314 may determine that fob 102 is authorized to access system 100. If the signal is not recognized, then fob 102 is considered not authorized. In which case, protocol/sequence controller 314 may command the RFID controller to interrogate for authorized fobs (step 504).

Once the protocol/sequence controller determines that fob 102 is authorized, protocol/sequence controller 314 may seek to determine if additional signals are being sent by fob 102 (step 514). If no additional signal is provided by fob 102, then protocol/sequence controller 314 may provide all the components of RFID reader 104 to remain idle until such time as a signal is provided (step 516). Contrarily, where an additional fob 102 signal is provided, protocol/sequence controller 314 may determine if fob 102 is requesting access to merchant point-of-sale terminal 110 (e.g., POS device) or if fob 102 is attempting to interrogate RFID reader 104 for return (e.g., mutual) authorization (step 518). Where fob 102 is requesting access to merchant point-of-sale terminal 110, protocol/sequence controller 314 may command RFID reader 104 to open communications with point-of-sale terminal 110 (step 524). In particular, protocol/sequence controller 314 may command the point-of-sale terminal communications interface 312 to become active, permitting transfer of data between RFID reader 104 and the merchant point-of-sale terminal 110.

On the other hand, if the protocol/sequence controller determines that fob 102 signal is a mutual interrogation signal, then the protocol/sequence controller may command RFID reader 104 to encrypt the signal (step 520). Protocol/sequence controller 314 may command the encryption authentication circuit 318 to retrieve from database 320 the appropriate encryption key in response to fob 102 mutual interrogation signal. Protocol/sequence controller 314 may then command RFID reader 104 to provide the encrypted mutual interrogation signal to fob 102. Protocol/sequence controller 314 may command the authentication circuit 318 to provide an encrypted mutual interrogation signal for fob 102 to mutually authenticate. Fob 102 may then receive the encrypted mutual interrogation signal and retrieve from authentication circuitry 212 a RFID reader decryption key.

Although an exemplary decision process of protocol/sequence controller 314 is described, it should be understood that a similar decision process may be undertaken by protocol/sequence controller 208 in controlling the components of fob 102. Indeed, as described above, protocol/sequence controller 314 may have similar operation and design as protocol/sequence controller 208. In addition, to the above, protocol/sequence controllers 208 and 314 may incorporate in the decision process appropriate commands for enabling USB interfaces 222 and 316, when the corresponding device is so connected.

Encryption/decryption component 318 may be further in communication with a secure account number database 320 which stores the security keys necessary for decrypting the encrypted fob account number. Upon appropriate request from protocol/sequence controller 314, encryption/decryption component (e.g., circuitry 318) may retrieve the appropriate security key, decrypt the fob account number and forward the decrypted account number to protocol sequence controller 314 in any format readable by any later connected POS device 110. In one exemplary embodiment, the account number may be forwarded in a conventional magnetic stripe format compatible with the ISO/IEC 7813 standard. That is, in accordance with the invention, there is no need to translate or correlate the account number to traditional magnetic stripe format as is done with the prior art. The invention processes the transaction request directly, as if the card associated with the account has been presented for payment.

Upon receiving the account number in magnetic stripe format, protocol/sequence controller 314 may forward the account number to POS device 110 via a communications interface 312 and data link 122, as best shown in FIG. 1. POS device 110 may receive the decrypted account number and forward the magnetic stripe formatted account number to a merchant network 112 for processing under the merchant's business as usual standard. In this way, the present invention eliminates the need of a third-party server. Further, where POS device 110 receives a response from network 112 (e.g., transaction authorized or denied), protocol/sequence controller 314 may provide the network response to the RF module 302 for optically and/or audibly communicating the response to fob 102 user.

RFID reader 104 may additionally include a USB interface 316, in communication with protocol/sequence controller 314. In one embodiment, the USB interface may be a RS22 serial data interface. Alternatively, RFID reader 104 may include a serial interface such as, for example, a RS232 interface in communication with protocol/sequence controller 314. The USB connector 316 may be in communication with a personalization system 116 (shown in FIG. 1B) for initializing RFID reader 104 to system 100 application parameters. That is, prior to operation of system 100, RFID reader 104 may be in communication with personalization system 116 for populating database 310 with a listing of security keys belonging to authorized fobs 102, and for populating database 320 with the security keys to decrypt fob 102 account numbers placing the account numbers in ISO/IEC 7813 format. In this way, RFID reader 104 may be populated with a unique identifier (e.g., serial number) which may be used by fob authentication circuitry 210 to determine if RFID reader 104 is authorized to receive fob 102 encrypted account number.

Figure 1B:
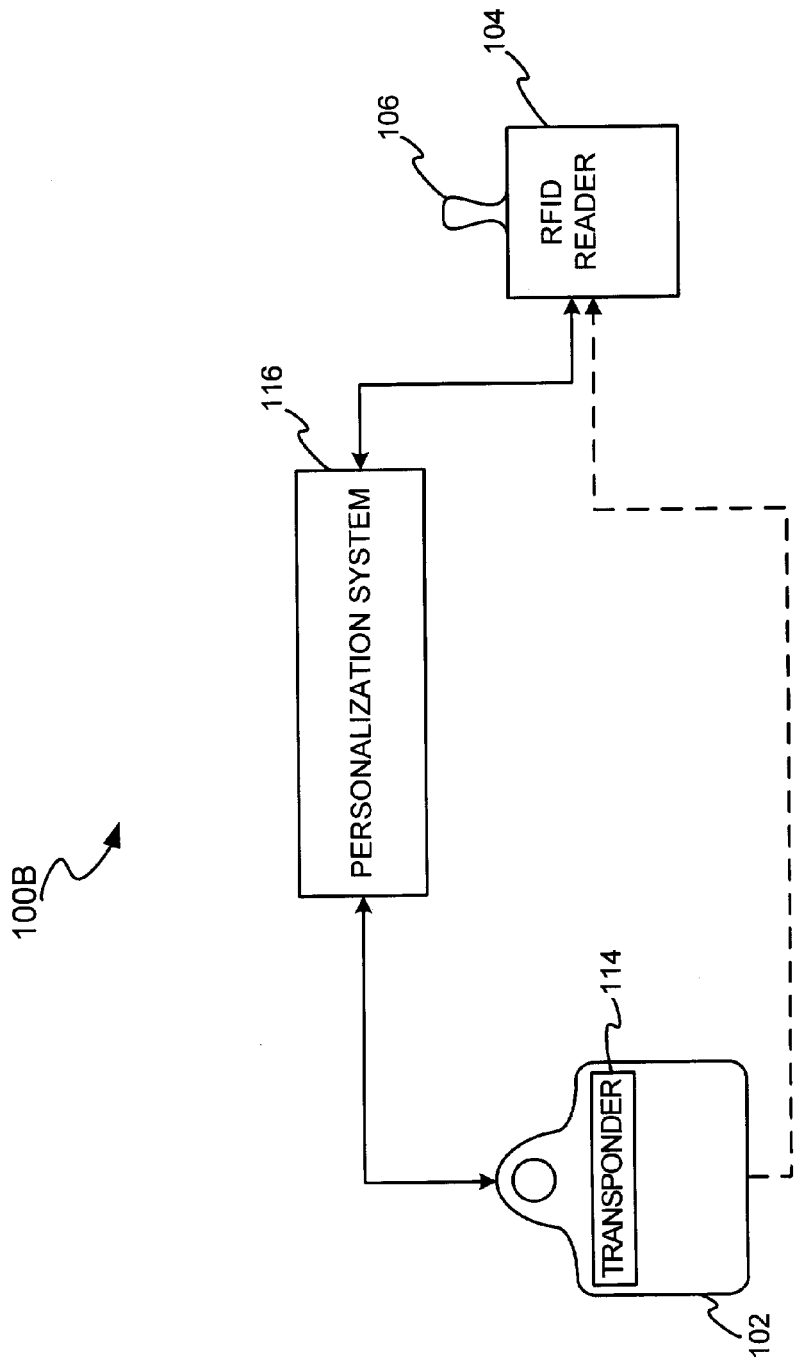
FIG. 1B illustrates an exemplary personalization system in accordance with the present invention.

FIG. 1B illustrates an exemplary personalization system 100B, in accordance with the present invention. In general, typical personalization system 100B may be any system for initializing RFID reader 104 and fob 102 for use in system 100A. With reference to FIG. 1B, the similar personalization process for fob 102 may be illustrated. For example, personalization system 116 may be in communication with fob 102 via RF ISO 14443 interface 114 for populating fob database 212 with the security keys for facilitating authentication of the unique RFID reader 104 identifier. In addition, personalization system 116 may populate on database 212 a unique fob 102 identifier for use by RFID reader 104 in determining whether fob 102 is authorized to access system 100. Personalization system 116 may populate (e.g., inject) the encrypted fob 102 account number into fob database 214 for later providing to an authenticated RFID reader 104.

In one exemplary embodiment, personalization system 116 may include any standard computing system as described above. For example, personalization system 116 may include a standard personal computer containing a hardware security module operable using any conventional graphic user interface. Prior to populating the security key information account number and unique identifying information into fob 102 or RFID reader 104, the hardware security module may authenticate fob 102 and RFID reader 104 to verify that the components are authorized to receive the secure information.

Figure 6A:
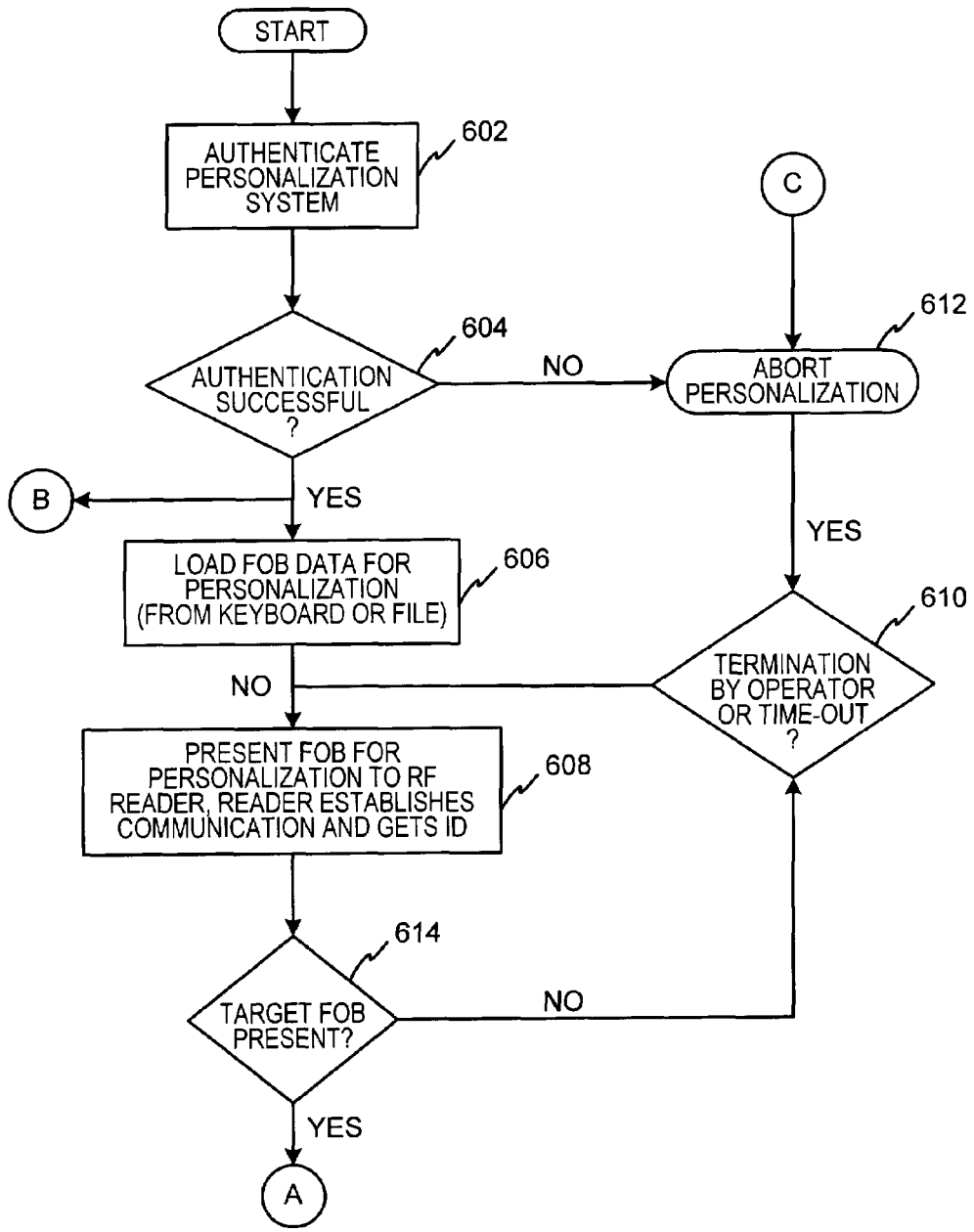
FIGS. 6A-B are an exemplary flow diagram of a fob personalization process in accordance with the present invention.
Figure 6B:
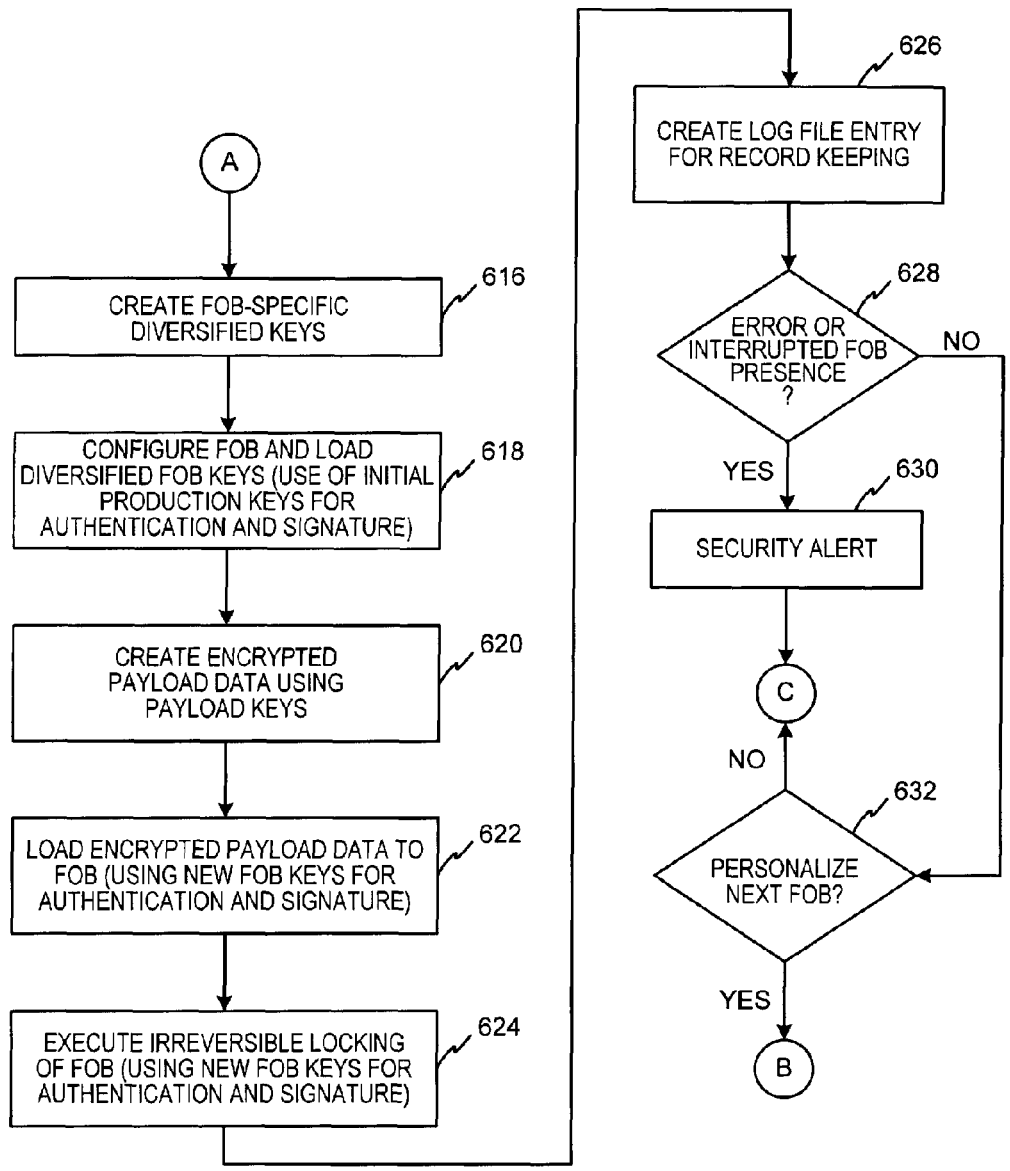

FIGS. 6A-B illustrate an exemplary flowchart of a personalization procedure which may be used to personalize fob 102 and/or RFID reader 104. Although the following description discusses mainly personalization of fob 102, RFID reader 104 may be personalized using a similar process. The personalization process, which occurs between personalization system 116 and the device to be personalized (e.g., fob 102 or RFID reader 104), may begin, for example at step 602. Mutual authentication may occur between personalization system 116 and the device to be authenticated in much the same manner as was described above with regard to fob 102 mutually authenticating with RFID reader 104. That is, personalization system 116 may transmit a personalization system 116 identifier to the device to be authenticated which is compared by device authentication circuitry 210, 308 against personalization system identifiers stored in the device database 212, 310. Where a match does not occur (step 604), the personalization process may be aborted (step 612). Where a match occurs (step 604), the personalization system may prepare a personalization file to be provided to the device to be personalized (step 606). If the personalization system is operated manually, the personalization file may be entered into personalization system 116 using any suitable system interface such as, for example, a keyboard (step 606). Where personalization system 116 operator elects to delay the preparation of the personalization files, the system 116 may abort the personalization process (step 610). In this context, the personalization file may include the unique fob 102 or RFID reader 104 identifier, security key for loading into database 212 and 310, and/or security keys for decrypting a fob account number which may be loaded in database 320.

Fob 102 may be personalized by direct connection to personalization system 116 via RF ISO/IEC 14443 interface 114, or fob 102 may be personalized using RFID reader 104. Personalization system 116 and RFID reader 104 may engage in mutual authentication and RFID reader 104 may be configured to transmit the fob personalization file to fob 102 via RF. Once fob 102 is presented to RFID reader 104 (steps 608, 614) for personalization, fob 102 and RFID reader 104 may engage in mutual authentication (step 614). Where fob 102 is not presented to RFID reader 104 for personalization, the personalization process may be aborted (step 610).

If fob 102 is detected, personalization system 116 may create as a part of the personalization file, a unique identifier for providing to fob 102 (step 616). The identifier is unique in that one identifier may be given only to a single fob. That is, no other fob may have that same identifier. The fob may then be configured and loaded with that identifier (step 618).

The encrypted fob 102 account number may be populated into fob 102 in the same manner as is described with respect to fob 102 unique identifier. That is, personalization system 116 may pre-encrypt the account data (step 640) and inject the encrypted account into fob database 214 (step 622). The encrypted account data may be loaded (e.g., injected) into fob 102 using RFID reader 104 as discussed above.

Once the personalization file is populated into fob 102, the populated information is irreversibly locked to prevent alteration, unauthorized reading and/or unauthorized access (step 624). Personalization system 116 may then create a log of the personalization file information for later access and analysis by personalization system 116 user (step 626).

It should be noted that in the event the personalization process is compromised or interrupted (step 628), personalization system 116 may send a security alert to the user (step 630) and the personalization process may be aborted (step 612). On the other hand, where no such compromising or interruption exists, personalization system 116 may be prepared to begin initialization on a second device to be personalized (step 632).

Figure 7A:
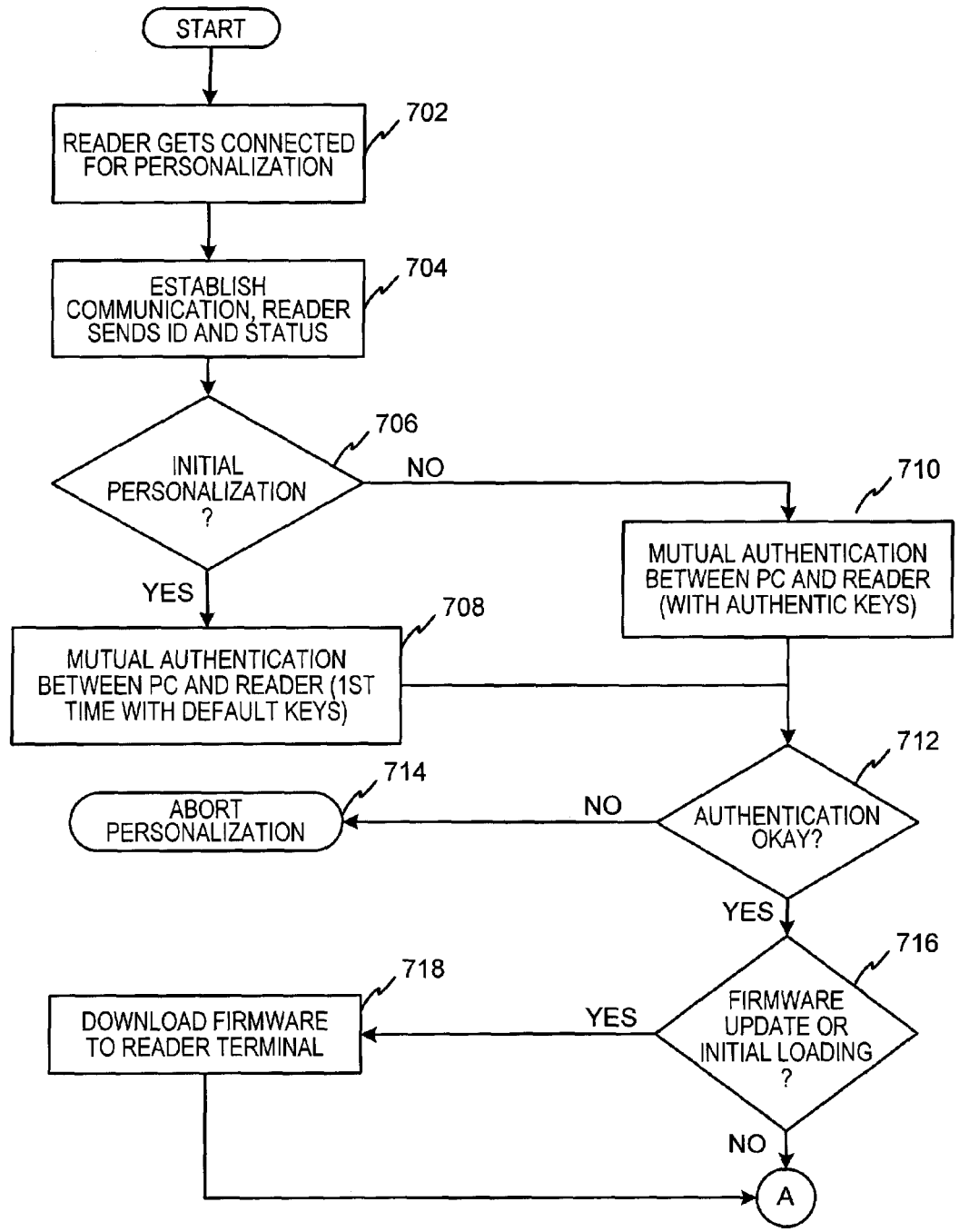
FIGS. 7A-B are an exemplary flow diagram of a RFID reader personalization process in accordance with the present invention.
Figure 7B:
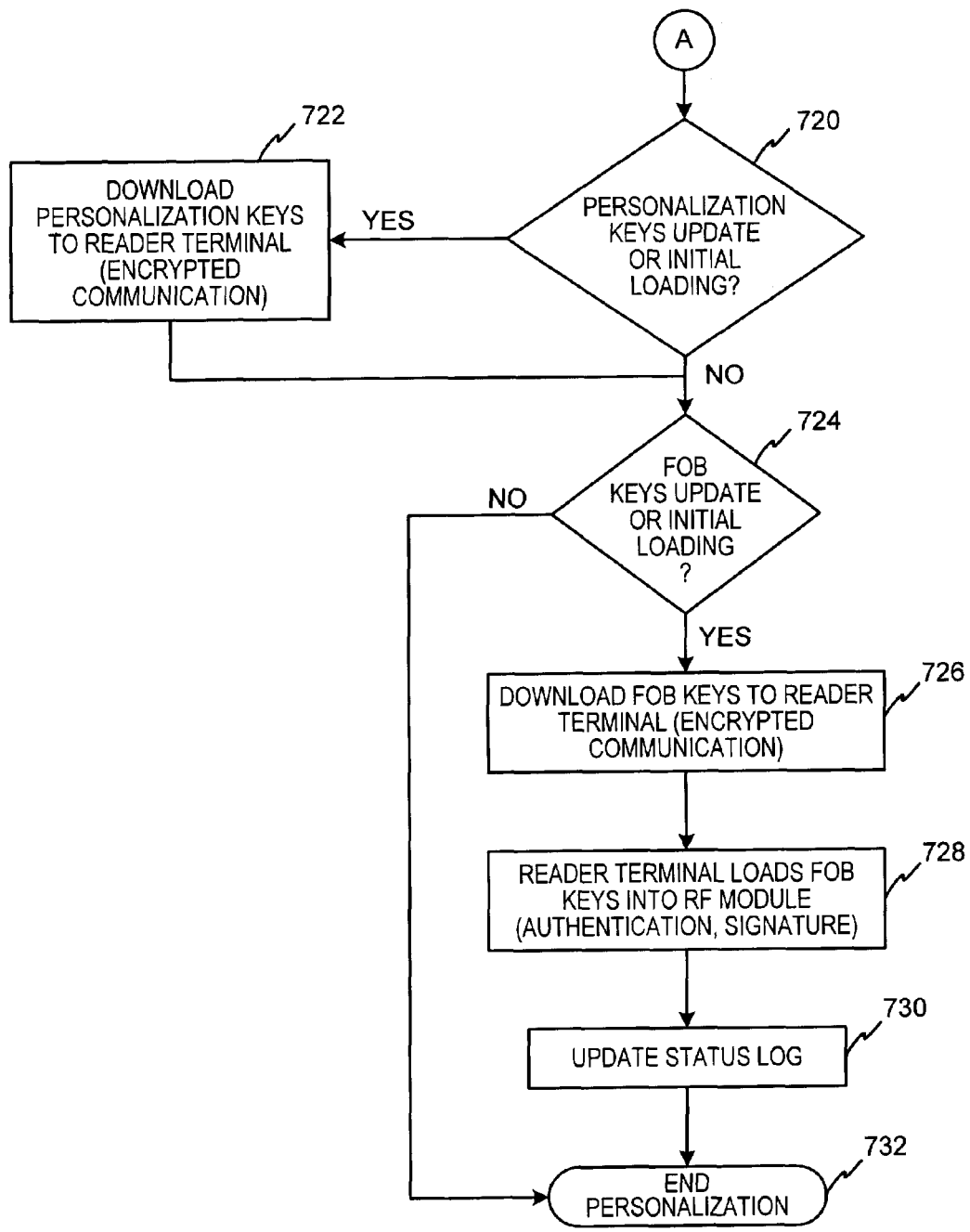

FIGS. 7A-B illustrate another exemplary embodiment of a personalization process which may be used to personalize RFID reader 104. RFID reader 104 may be in communication with a personalization system 116 via RFID reader USB connection 316 (step 702). Once connected, personalization system 116 may establish communications with RFID reader 104 and RFID reader 104 may provide personalization system 116 any RFID reader 104 identification data presently stored on RFID reader 104 (step 704). In accordance with step 708, where RFID reader 104 is being personalized for the first time (step 706), RFID reader 104 and personalization system 116 may engage in mutual authentication as described above with respect to FIGS. 6A-B. After the mutual authentication is complete, personalization system 116 may verify that RFID reader 104 is properly manufactured or configured to operate within system 100. The verification may include evaluating the operation of RFID reader 104 by determining if the RFID reader will accept predetermined default settings. That is, personalization system 116 may then provide RFID reader 104 a set of default settings (step 708) and determine if RFID reader 104 accepts those settings (step 712). If RFID reader 104 does not accept the default settings, personalization system 116 may abort the personalization process (step 714).

If personalization system 116 determines that the personalization process is not the first personalization process undertaken by RFID reader 104 (step 706), personalization system 116 and RFID reader 104 may engage in a mutual authentication process using the existing security keys already stored on RFID reader 104 (step 710). If authentication is unsuccessful (step 712), personalization system 116 may abort the personalization process (step 714).

Where personalization system 116 and RFID reader 104 successfully mutually authenticate, personalization system 116 may update RFID reader 104 security keys (step 716). Updating the security keys may take place at any time as determined by a system 100 manager. The updating may take place as part of a routine maintenance or merely to install current security key data. The updating may be performed by downloading firmware into RFID reader 104 (step 718). In the event that personalization system 116 determines in step 706 that RFID reader 104 is undergoing an initial personalization, the firmware may be loaded into RFID reader 104 for the first time. In this context, "firmware" may include any file which enables the RFID reader 102 to operate under system 100 guidelines. For example, such guidelines may be directed toward the operation of RFID reader protocol/sequence controller 314.

Personalization system 116 may then determine if the personalization keys (e.g., security keys, decryption keys, RFID identifier) need to be updated or if RFID reader 104 needs to have an initial installation of the personalization keys (step 720). If so, then personalization system 116 may download the personalization keys as appropriate (step 722).

Personalization system 116 may then check RFID reader 104 to determine if fob 102 identifiers and corresponding security keys should be updated or initially loaded (step 724). If no updating is necessary personalization system 116 may end the personalization procedure (step 732). Contrarily, if personalization system 116 determines that fob 102 identifiers and corresponding keys need to be updated or installed, personalization system 116 may download the information onto RFID reader 104 (step 726). The information (e.g., fob security keys and identifiers) may be downloaded in an encrypted format and RFID reader 104 may store the information in the RFID reader database 310 as appropriate (step 728). Personalization system 116 may then create or update a status log cataloging for later use and analysis by personalization system 116 user (step 730). Upon updating the status log, the personalization process may be terminated (step 732).

It should be noted that, in some instances it may be necessary to repersonalize the RFID reader in similar manner as described above. In that instance, the personalization process described in FIGS. 7A and 7B may be repeated.

Figure 8:
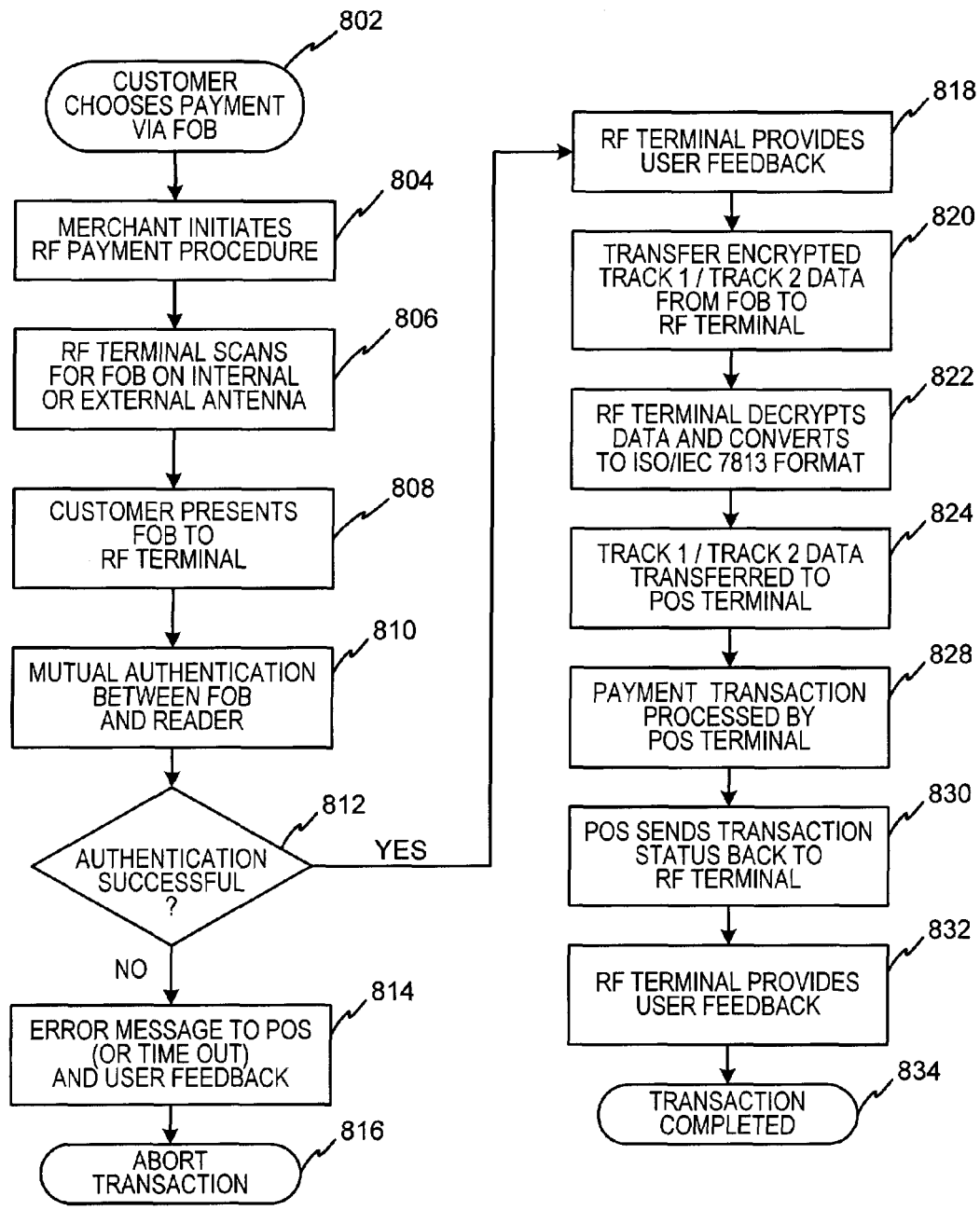
FIG. 8 is a flow diagram of an exemplary payment/transaction process in accordance with the present invention.

FIG. 8 illustrates an exemplary flow diagram for the operation of system 100A. The operation may be understood with reference to FIG. 1A, which depicts the elements of system 100A which may be used in an exemplary transaction. The process is initiated when a customer desires to present fob 102 for payment (step 802). Upon presentation of fob 102, the merchant initiates the RF payment procedure via an RFID reader 104 (step 804). In particular, the RFID reader sends out an interrogation signal to scan for the presence of fob 102 (step 806). The RF signal may be provided via the RFID reader antenna 106 or optionally via an external antenna 108. The customer then may present fob 102 for payment (step 808) and fob 102 is activated by the RF interrogation signal provided.

Fob 102 and RFID reader 104 may then engage in mutual authentication (step 810). Where the mutual authentication is unsuccessful, an error message may be provided to the customer via the RFID optical and/or audible indicator (step 814) and the transaction may be aborted (step 816). Where the mutual authentication is successful (step 814), RFID reader 104 may provide the customer with an appropriate optical and/or audible message (e.g., "transaction processing" or "wait") (step 818). The fob protocol/sequence controller 208 may then retrieve from database 214 an encrypted fob account number and provide the encrypted account number to RFID reader 104 (step 820).

RFID reader 104 may then decrypt the account number and convert the account number into magnetic stripe (ISO/IEC 7813) format (step 822) and provide the unencrypted account number to the merchant system 130 (step 828). In particular, the account number may be provided to POS 110 device for transmission to the merchant network 112 for processing. Upon processing, POS device 110 may then send an optical and/or audible transaction status message to RFID reader 104 (step 830) for communication to the customer (step 832).

It should be noted that the transaction account associated with fob 102 may include a usage restriction, such as, for example, a per purchase spending limit, a time of day use, a day of week use, certain merchant use and/or the like, wherein an additional verification is required when using the fob outside of the restriction. The restrictions may be personally assigned by fob 102 user, or the account provider. For example, in one exemplary embodiment, the account may be established such that purchases above $X (i.e., the spending limit) must be verified by the customer. Such verification may be provided using a suitable personal identification number (PIN) which may be recognized by fob 102 or a payment authorization center (not shown) as being unique to fob 102 holder (e.g., customer) and the correlative fob 102 transaction account number. Where the requested purchase is above the established per purchase spending limit, the customer may be required to provide, for example, a PIN, biometric sample and/or similar secondary verification to complete the transaction. That is, for example, fob 102 may enter the unique PIN in a conventional keypad at merchant system 130 or RFID reader 104. The PIN may be provided to the authorization center for comparison with a correlative PIN stored on the issuer system. Alternatively, the PIN may be provided to fob 102 via RFID reader 104. Fob 102 may verify the PIN by comparing the PIN to a correlative PIN stored on, for example, secure memory 212.

Where a verification PIN is used as secondary verification the verification PIN may be checked for accuracy against a corroborating PIN which correlates to fob 102 transaction account number. The corroborating PIN may be stored locally (e.g., on fob 102), or may be stored on a database (1012) at the payment authorization center. The payment authorization center database may be any database 1012 maintained and operated by fob 102 transaction account provider.

The verification PIN may be provided to POS device 110 using a conventional merchant (e.g., POS) PIN key pad 118 in communication with POS device 110 as shown in FIG. 1, or a RFID keypad in communication with RFID reader 104. PIN keypad may be in communication with POS device 110 (or alternatively, RFID reader 104) using any conventional data link described above. Upon receiving the verification PIN, RFID reader 104 may seek to match the PIN to the corroborating PIN stored on RFID reader 104 at database 310 or 320. Alternatively, the verification PIN may be provided to a payment authorization center to determine whether the PIN matches the PIN stored on the payment authorization center database which correlates to fob 102 account. If a match is made, the purchase may no longer be restricted, and the transaction may be allowed to be completed.

Figure 9:
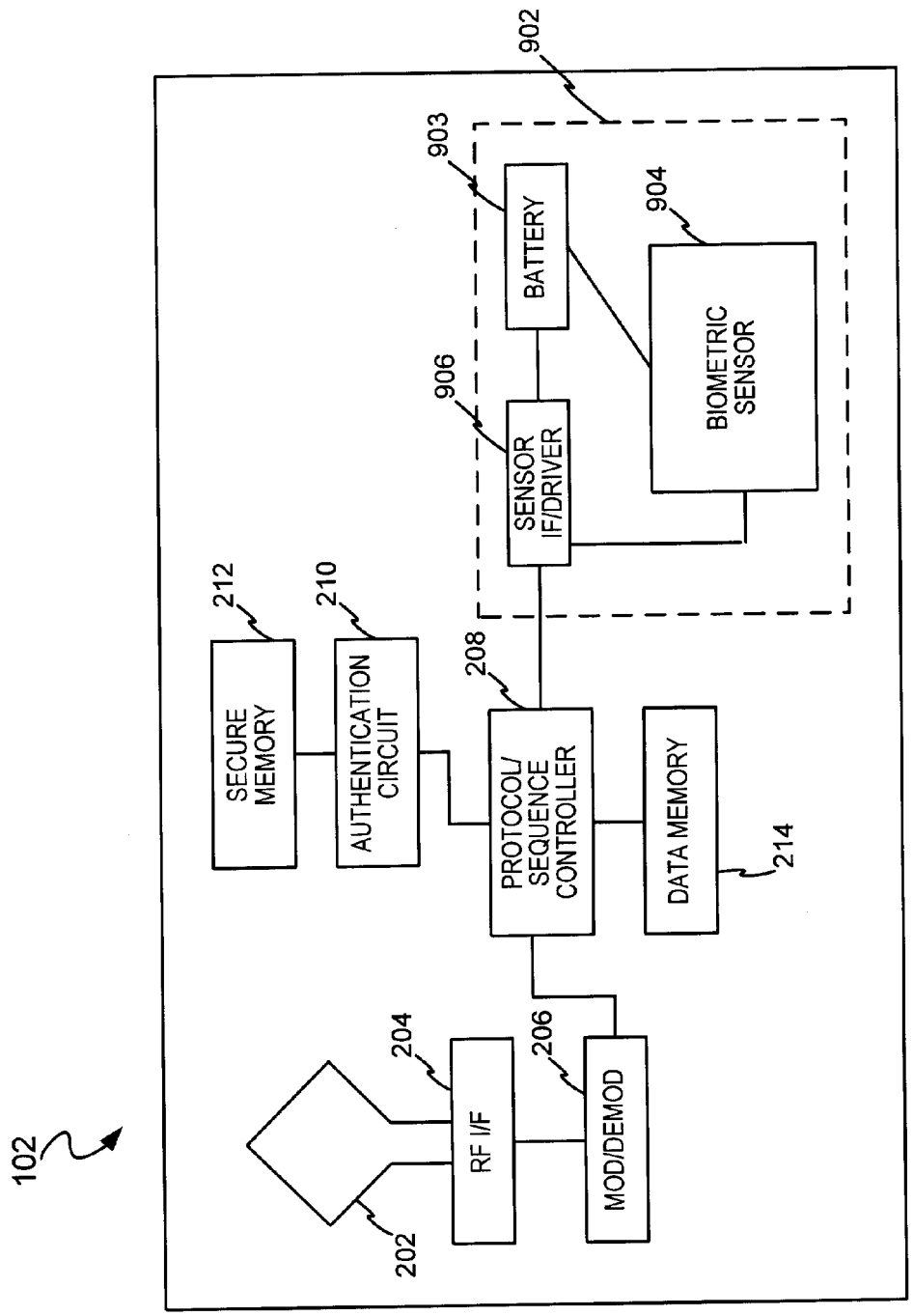
FIG. 9 is another schematic illustration of an exemplary fob in accordance with the present invention.

In an alternate embodiment, verification of purchases exceeding the established spending limit may involve biometrics circuitry included in fob 102. FIG. 9 is a schematic block diagram of an exemplary fob 102 wherein fob 102 includes a biometric security system 902. Biometric security system 902 may include a biometric sensor 904 for sensing the fingerprint of fob 102 user. The biometric sensor 902 may be in communication with a sensor interface/driver 906 for receiving the sensor fingerprint and activating the operation of fob 102. In communication with the biometric sensor 904 and sensor interface 906 may be a battery 903 for providing the necessary power for operation of the biometric security system components.

In one exemplary application of fob 102 including the biometric security system 902, the customer may place his finger on the biometric sensor to initiate the mutual authentication process between fob 102 and RFID reader 104, or to provide secondary verification of the user's identity. The sensor fingerprint may be digitized and compared against a digitized fingerprint stored in a database (e.g., security database 212) included on fob 102. Such comparison step may be controlled by protocol/sequence controller 208 and may be validated by authentication circuit 210. Where such verification is made, the mutual authentication between fob 102 and RFID reader 104 may begin, and the transaction may proceed accordingly. Alternatively, the comparison may be made with a digitized fingerprint stored on a database maintained by fob 102 transaction account provider system (not shown). The digitized fingerprint may be verified in much the same way as is described above with respect to the PIN.

In one exemplary application of fob 102 including the biometric security system 902, the system 902 may be used to authorize a purchase exceeding the established per purchase spending limit. In this case, where the customer's intended purchase exceeds the spending limit, the customer may be asked to provide assurance that the purchase is authorized. Accordingly, the customer may provide such verification by placing his finger over the biometric sensor 904. The biometric sensor 904 may then digitize the fingerprint and provide the digitized fingerprint for verification as described above. Once verified, fob 102 may provide a transaction authorized signal to RF transponder 202 (or alternatively to transponder 220) for forwarding to RFID reader 104. RFID reader 104 may then provide the transaction authorized signal to POS device 110 in similar manner as is done with convention PIN driven systems and POS device 110 may process the transaction under the merchant's business as usual standard.

In accordance with another exemplary embodiment of the invention, the fob user is provided limited access to a fob user data file maintained on an issuer system for managing the fob usage and fob user information. User may have access over the phone, online, or off line. The fob user may access the fob user data file to change, for example, demographic information (e.g., fob user address, phone number, email address, or the like), the funding source (e.g., credit account, charge account, rewards account, barter account, etc.) associated with the fob, view the transaction history, etc. In addition, the fob user may be permitted to load or reload the account or alter automatic reload parameters (e.g., amount to reload, period for reloading, etc.). Where more than one fob 102 is correlated to a transaction account, the user may be provided similar access to the data files corresponding to the additional fobs.

With reference to FIG. 1A, the fob user may connect fob 102 to a computer interface 134 via the USB interface 132. The fob user may then use the computer interface 134 to access the fob user data file via the network 136. In particular, the network 136 may be in communication with an issuer system and may be provided limited access to an issuer server for managing the fob. The issuer server may be in communication with an issuer system database which stores the information to be managed relative to the user fob user data file. The changes made to the fob user data file by the fob user may be made in real-time, after a brief delay, or after an extended delay. In one instance, changes may be stored in a batch changes file on the issuer database for later batch processing.

Figure 10:
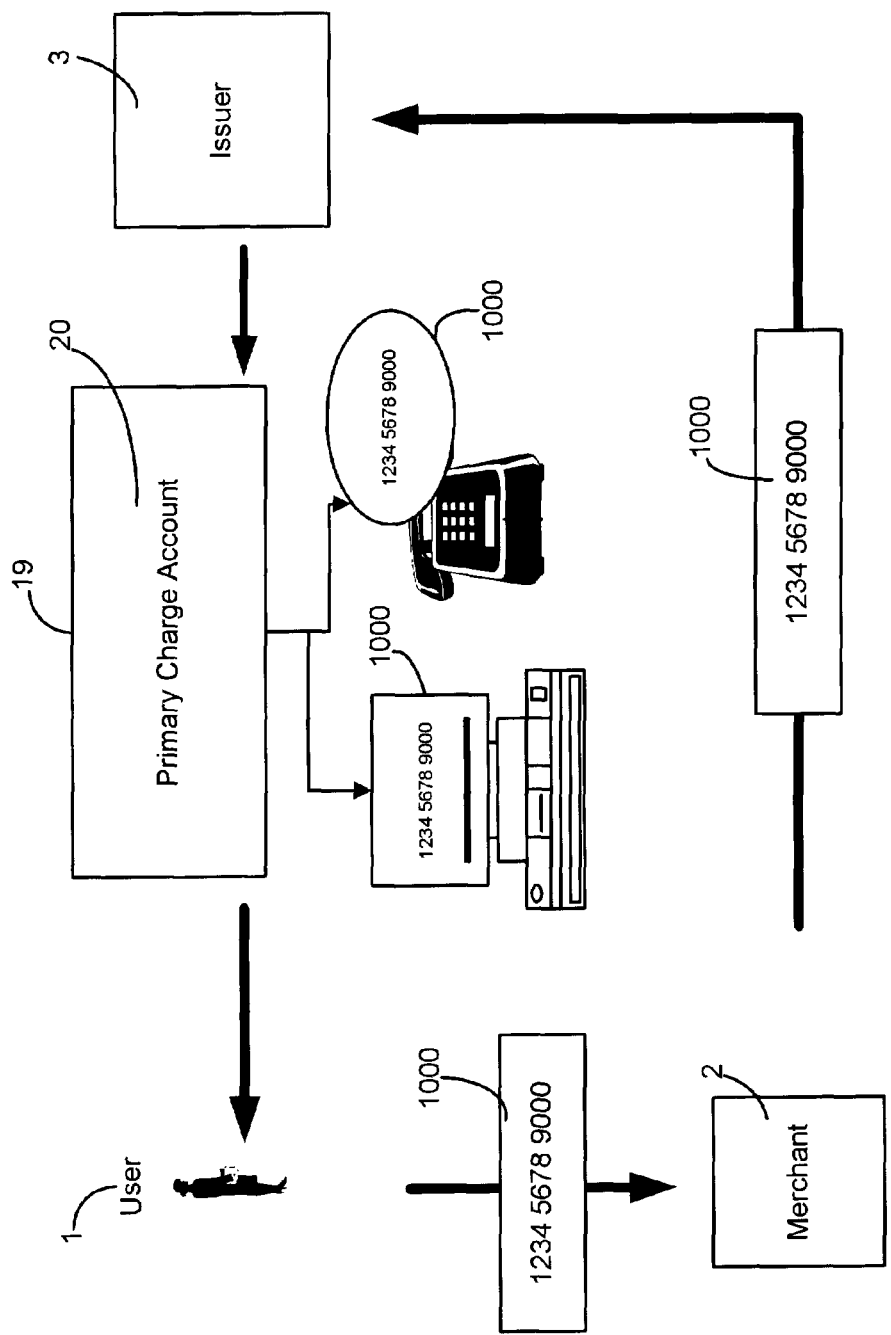
FIG. 10 is an overview of an exemplary system for facilitating a transaction.

As depicted in FIG. 10, the present invention generally relates to a revolving use account ("RUA"). The RUA 1000 may be configured as a limited use account associated with one or more primary charge accounts ("PCAs"). RUA 1000 may used by one or more primary or secondary users 1 to facilitate transactions with a merchant 2 and/or issuer 3. RUA 1000 may have associated therewith user 1, issuer 3, and/or merchant 2 defined conditions and/or parameters of use restrictions which limit use of RUA 1000.

The first party to the transaction (referred to herein as "user 1") may be any individual, business, software, hardware and/or other entity that uses RUA 1000 to facilitate any transaction. As described herein, user 1 may refer to one or more primary and/or secondary users. A primary user is a user who is authorized to use a PCA and/or an RUA. A secondary user is a user who is only authorized to use an RUA. In an exemplary embodiment, primary user 1 establishes a new and/or has an existing relationship and/or association with issuer 3. For example, in one embodiment, primary user 1 may be an American Express® card member. In another embodiment, primary user 1 may be a participant in a frequent flyer rewards program. In a further embodiment, primary user 1 may be a member of any suitable organization that provides transaction products and/or services. Another embodiment contemplates the accountholder gifting a RUA to a second party (i.e., secondary user 1). The term user 1 may also be referred to herein as "consumer," "card member," "participant," "cardholder," "customer" and/or the like.

The second party to the transaction (referred to herein as "merchant 2") is any individual, business, software, hardware, website, online vendor, off line vendor and/or other entity that receives account information from RUA 1000, whether and/or not in exchange for goods and/or services. For example, in one embodiment, merchant 2 may be an online bookstore such as Amazon.com®. In another embodiment, merchant 2 may be a local plumber. In yet another embodiment, merchant 2 may be a local hardware store. In some instances, user 1 and merchant 2 may be the same. In other situations, merchant 2 and issuer 3 are the same. Although referred to herein as a "merchant," this term contemplates situations where any second party receives account information from RUA 1000 from the first party: such as, for example, where user 1 submits RUA 1000 to another party to facilitate completing a transaction.

The issuer ("issuer 3") includes any provider of products and/or services that facilitates any type of transaction. As contemplated by an exemplary embodiment of the present invention, issuer 3 establishes and maintains account and/or transaction information for user 1. Issuer 3 may issue products to user 1 and may also provide both user 1 and merchant 2 with the processes to facilitate the transaction system of the present invention. Issuer 3 may include banks; credit unions; credit, debit and/or other transaction-related companies, telephone companies; and/or any other type of card and/or account issuing institutions, such as card-sponsoring companies, incentive and/or loyalty rewards companies, and/or third-party providers under contract with financial institutions. Unless otherwise specifically set forth herein, although referred to as "account provider," this term should be understood to mean any entity issuing any type of account to facilitate any transaction, exchange and/or service; and should not be limited to companies possessing and/or issuing physical cards. In an exemplary system, issuer 3 may be any transaction facilitating company such as a charge account provider like American Express®, VISA®, Mastercard®, Discover®, etc. In another embodiment, issuer 3 could be any membership organization and/or union. In some instances, issuer 3 and merchant 2 may be the same, for example, where the RUA 1000 is issued by the same entity that provides the product and/or service. A RUA 1000 phone card issued by a telephone company, where RUA 1000 phone card is associated with a primary telephone account is one example.

An exemplary RUA 1000 is any transaction device that contains one or more secondary accounts associated with a fob identifier, transaction number, and/or or account number that is designated by user 1 and/or issuer 3 as a primary charge account (i.e., PCA 20). Issuer 3 and/or user 1 may also associate one or more RUAs 1000 to be further associated with PCA 20. PCA 20 may then be used to fund each RUA 1000 based on pre-designated conditions (e.g., each RUA 1000 may have a credit line of $250).

In an exemplary embodiment, RUA 1000 is a purchasing number that acts as a secondary account and is associated with PCA 20. In an exemplary embodiment, PCA 20 account is not directly identified by RUA 1000. In certain embodiments, PCA 20 may have some identifying elements related to RUA 1000. The PCA is defined herein to include any type of transaction account that references any account, membership, affiliation and/or association. For example, the PCA may be any charge account, such as a main charge card, credit, debit card and/or other account, such as a bank and/or brokerage account, reward program account, flexible spending account, etc. When more than one user 1 account exists, PCA 20 may be linked to any account that has been designated by user 1 and/or issuer 3 as the primary account. Alternatively, there may be a hierarchy of accounts where RUA 1000 is associated with one and/or more PCAs 20 in a designated order. Additionally, and/or alternatively one or more RUAs 1000 may be associated with a PCA 20. As depicted in at least one embodiment described herein, RUA 1000 may be associated with two and/or more accounts. For example, RUA 1000 could be associated with a non-currency based account and also PCA 20.

While RUA 1000 may be described herein as a limited use account, RUA 1000 may be configured as any type of limited use account, ID, number, or the like. In an exemplary embodiment involving credit, debit and/or other banking cards, RUA 1000 has the same or similar industry standard format that is used for regular account numbers (e.g., sixteen digit numbers as described herein). In exemplary embodiments, the numbers are formatted such that one is unable to tell the difference between RUA 1000 and a regular account number.

In an exemplary embodiment, RUA 1000 is randomly and instantaneously generated by the issuer 3, usually upon a primary user's request, and can be distributed to user 1 by a variety of methods (online, in person, via telephone, wireless, email, regular mail, etc.) all of which should be secure and dependent upon verification of the user's identity. In an exemplary embodiment, although not required, RUA 1000 is immediately active (and usable) once it is associated with the primary user's designated PCA 20 and provided to user 1. This feature minimizes the possibility that merchant 2 will receive an account number that will be worthless because it was not properly activated by user 1, a third party, an issuer, and/or any other party. While the present invention may contemplate a previously allocated pool of numbers that needs to be activated, an exemplary embodiment of the present invention includes RUAs 1000 that are instantaneously and randomly generated, and are usable upon receipt by user 1 without the need for separate activation.

In another exemplary embodiment, RUA 1000 may have limited-use (and/or conditions-of-use) parameters associated with it by either primary user 1, merchant 2, and/or issuer 3 in order for the numbers to be restricted for particular uses.

Alternatively, primary user 1 is able to choose system default parameters of use. Parameters may include, for example: (i) use of RUA 1000 is good for a predetermined number of transactions (e.g., one, two, three, etc. transactions before the RUA is declined; (ii) accountholder-determined expiration dates (i.e., RUA 1000 will be generated with expiration dates that are associated but unrelated to the expiration date of the primary user's PCA 20 number, other than that it cannot exceed the expiration date of PCA 20 account and/or PCA account); (iii) limiting use of RUA 1000 to a specified dollar amount, dollar amount per transaction, total dollar amount for pro-designated number of transactions, maximum dollar amount per month, etc.; (iv) use of RUA 1000 for a specified merchant only; (v) restricting use to one or more specified secondary users and/or primary users (e.g., child, spouse, gift recipient, etc.); and/or (vi) any combination of these and/or similar features, for example, a number can be used at a specified merchant only for a pre-designated number of transactions and for a maximum dollar amount. In an exemplary online embodiment, user 1 may desire to require all online transactions (e.g., purchases) be performed using only RUAs, and/or alternatively, be performed only with specific merchants as defined. If the accountholder (and/or another individual) uses a PCA number for an online payment in violation of this condition, issuer 3 may decline the authorization.

These parameters not only provide increased security, allowing user 1 to tailor RUA 1000 to a particular use, but an ancillary benefit is the ability of an accountholder to select conditions to control spending for themselves and/or others who have registered eligibility or authority to use the card (e.g., spouse, children, etc.). These conditions may include: restrictions (user 1 may choose to restrict use on certain sites and/or can pre-approve spending at particular sites); date range (user 1 can select a period of time when transactions may occur); maximum budget amount (user 1 can pre-set spending limits within certain periods of time and/or in certain categories (e.g., groceries, books, clothing)); credit and balance availability (user 1 can check credit and/or demand deposit balance availability prior to transacting); non-currency based accounts, such as Reward Points as Currency (user 1 can use reward points (e.g., Membership Rewards™, Blue Loot™) as currency to pay for purchases); and Gift Products (user 1 can use PCA 20 via RUA 1000 to fund gift products to others for designated amounts).

Figure 11:
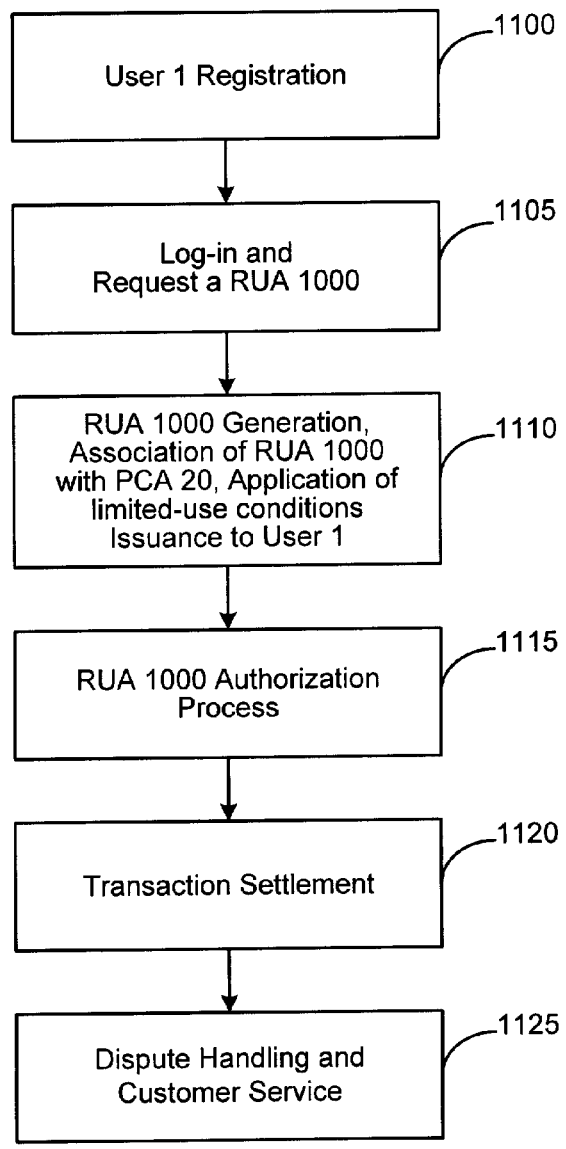
FIG. 11 is a flow diagram of exemplary processes of the present invention.

As shown in FIG. 11, an exemplary embodiment of the present invention includes steps for: (i) registering user 1 to use the account provider's 3 transaction services (step 1100); (ii) receiving from user 1a request for RUA 1000 (step 1105); (iii) generating RUA 1000, associating RUA 1000 with PCA 20, applying limited-use conditions, if desired, and issuing RUA 1000 to user 1 (step 1110); (iv) processing a merchant's 2 authorization request involving RUA 1000 to determine if use of the RUA is authorized (step 1115); (v) processing a settlement request, paying the merchant, and billing user 1 (step 1120); and (vi) handling disputes and other customer service issues from the merchant and/or cardholder relating to use of RUA 1000 (step 1125).

Figure 12:
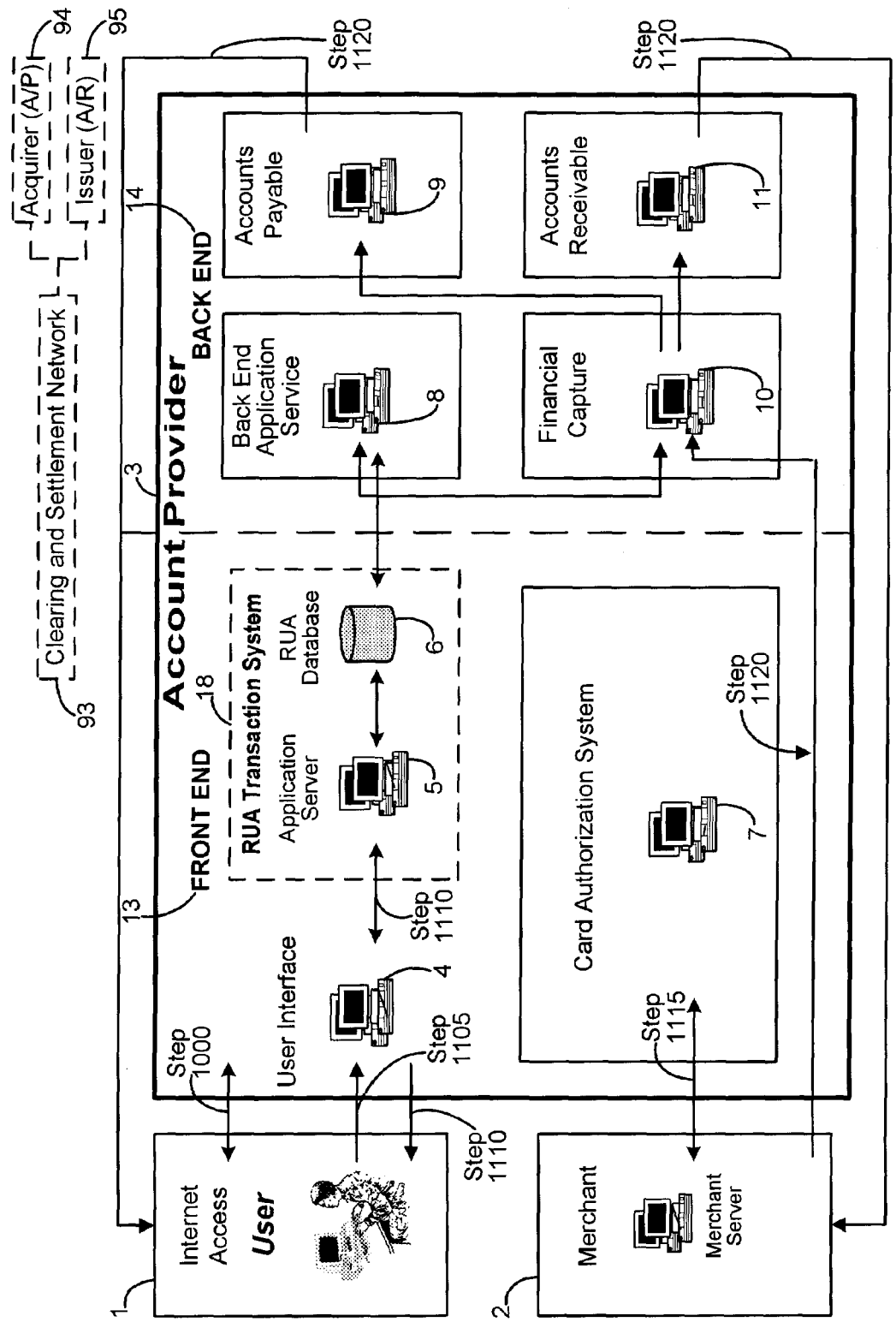
FIG. 12 is a block diagram of exemplary components of the present invention.

FIG. 12 depicts an overview of the components of an exemplary transaction system. In general, the account provider's computer system utilizes front end 13 and back end 14 processing systems. Front end 13 system includes, for example, a user interface system 4 (e.g., web server, IVR, etc.), an application server 5, a RUA database 6, and a card authorization system (CAS) 7. Application server 5 and RUA database 6 may, at times, be referred to collectively as the RUA transaction system (and/or service) 18. Referencing FIGS. 11 and 12, these front end 13 components facilitate (i) accountholder registration (step 1100), (ii) request for a RUA 1000 (step 1105), (ii) generation and issuance of RUA 1000 (step 1110), and (iv) the RUA authorization process (step 1115). Back end 14 system includes, for example, a financial capture system 10, a back end application service 8, an accounts payable system 9 and an accounts receivable system 11. Again referencing FIGS. 11 and 12, back end 14 components facilitate transaction settlement (step 1120). In an exemplary system, the dispute handling and customer service processes (step 1125) include, for example, in addition to the above mentioned systems, a system for identifying PCA 20 from RUA 1000, a letter generating system for sending dispute inquiries to users 1 and merchants 2, and a system that accepts incoming communication from merchants 2 and converts RUA 1000 received to PCA 20 for the purpose of facilitating the dispute handling process. More specifically, as shown in FIG. 12, issuer 3 user interface system 4 provides user 1 with access to the account provider's transaction services. It is through this interface that user 1 may register with the issuer 3, may request RUA 1000, and, in response thereto, will receive from issuer 3 RUA 1000 that is associated with his PCA 20. Front end 13 system also utilizes at least one application server 5 that processes incoming information, applies the appropriate business rules/condition sets as necessary, and generates appropriate outgoing responses. Application server 5 is configured to support interaction with, for example, user interface system 4 and RUA database 6. An exemplary RUA database 6 is a relational database comprising various tables for managing and translating a variety of information, such as user 1 profiles, charge card data, transaction data, merchant data, conditions/rules set profiles, etc. RUA database 6 may be configured in a similar way to the databases described herein.

Figure 13:
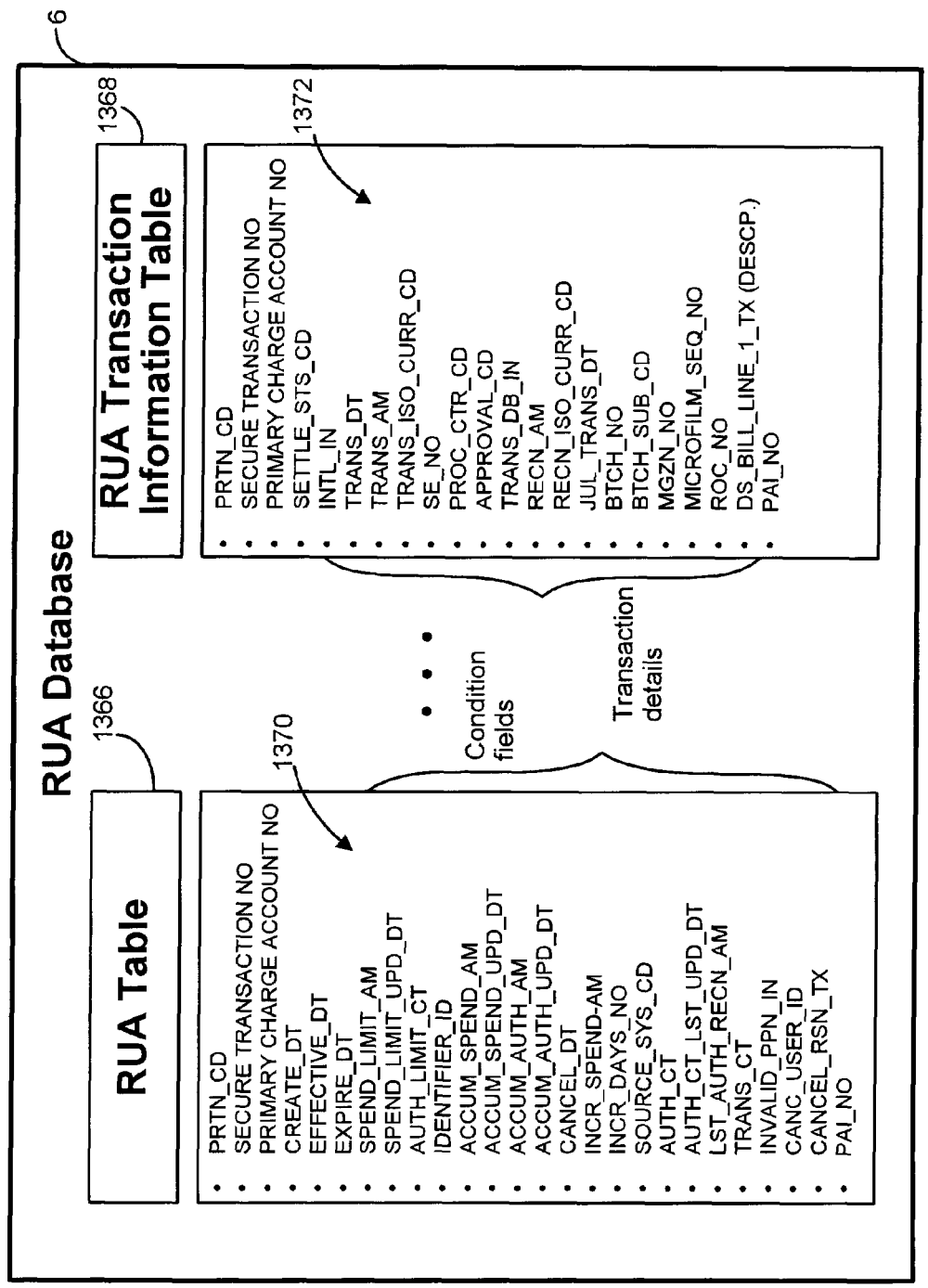
FIG. 13 is a block diagram of an example of some of the exemplary data structure of the RUA database of the present invention.

FIG. 13 illustrates two examples of exemplary tables within RUA database 6. RUA table 1366 may contain a variety of database fields 1370 relating to the user's RUA account. These fields may contain, in addition to general RUA 1000 and PCA 20 account information, the business rule/condition set profiles associated with use of RUA 1000. A RUA Transaction Information Table 1368 contains database fields 1372 for storing information relating to a particular transaction. As one skilled in the art can appreciate, the processing mechanisms and data structure methods can be structured in a variety of ways. In short, user interface system 4, application server 5, and RUA database 6 are suitably connected to facilitate the generation and issuance of RUA 1000 and are further associated with card authorization system (CAS) 7, in order to process from merchant 2 an authorization request involving RUA 1000.

When processing a merchant's request for settlement (i.e., to be paid for a transaction), financial capture (FINCAP) 10 system receives and captures the financial information (e.g., transaction amount, date, merchant identification (SE) number, RUA 1000, etc.). The back end application service 8 interfaces with RUA transaction system 18, as necessary, to determine if the number is a valid RUA 1000 (i.e., not a fraudulent number) and/or if PCA 20 associated with RUA 1000 is also valid. If RUA 1000 and/or PCA 20 is valid, AP system 9 pays the merchant 2. RUA database 6 is updated to reflect the transaction information. RUA transaction system 18 (and/or alternatively the back end application service 8) may substitute PCA 20 number for RUA 1000 and forward it to the AR system 11 for billing.

Figure 15:
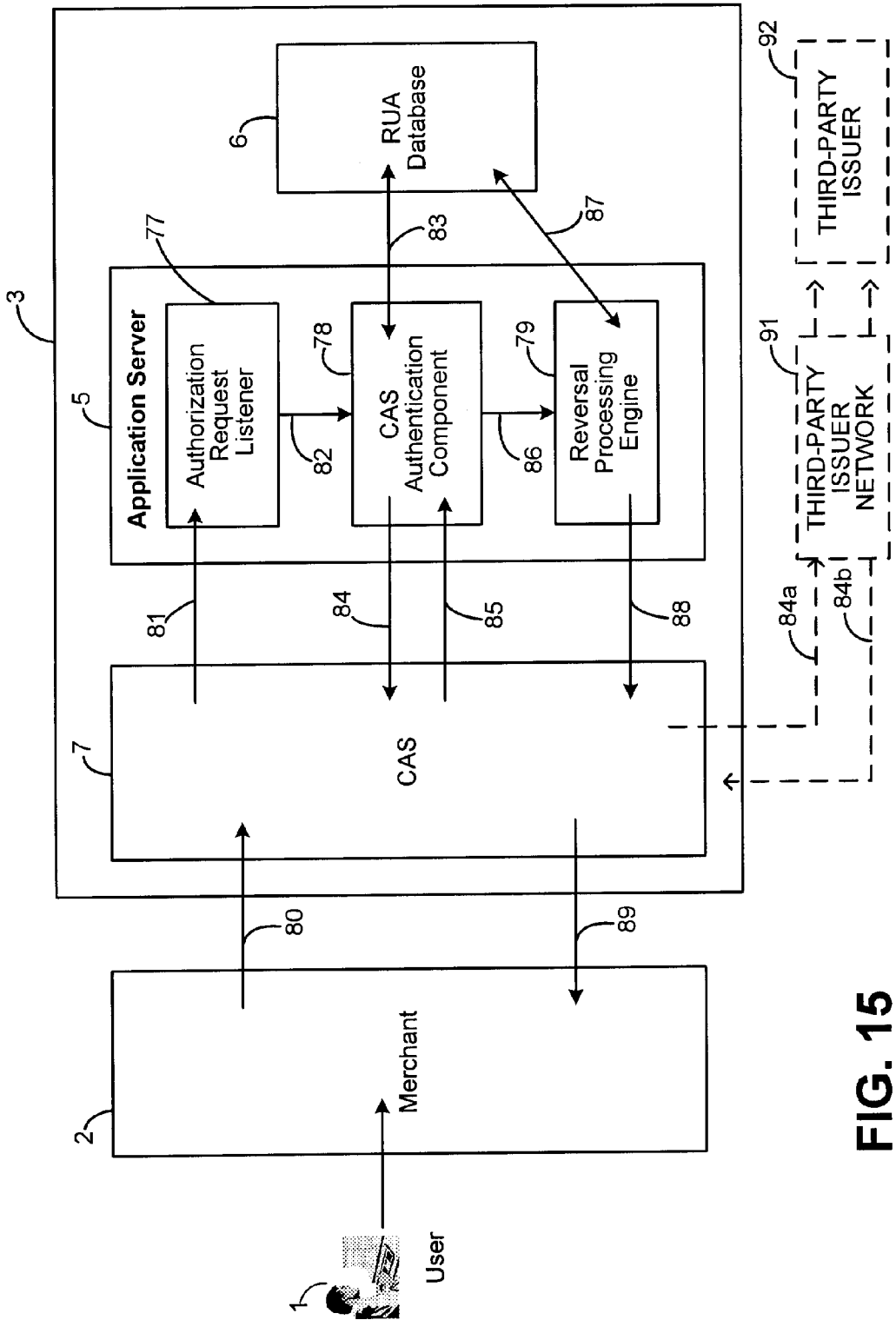
FIG. 15 is a flow diagram of an exemplary transaction authorization phase of the present invention.

Although the present system for facilitating transactions may exist within one account provider system, exemplary embodiments contemplate use with other third-party authorization and settlement systems and networks. FIGS. 12 and 15, for example, depict third-party authorization networks (FIGS. 15, 91 and 92) and settlement networks (FIGS. 12, 93-95) that may be integrated to form parts and/or processes of the present invention. Exemplary processes of the present invention are discussed in greater detail below.

Figure 16:
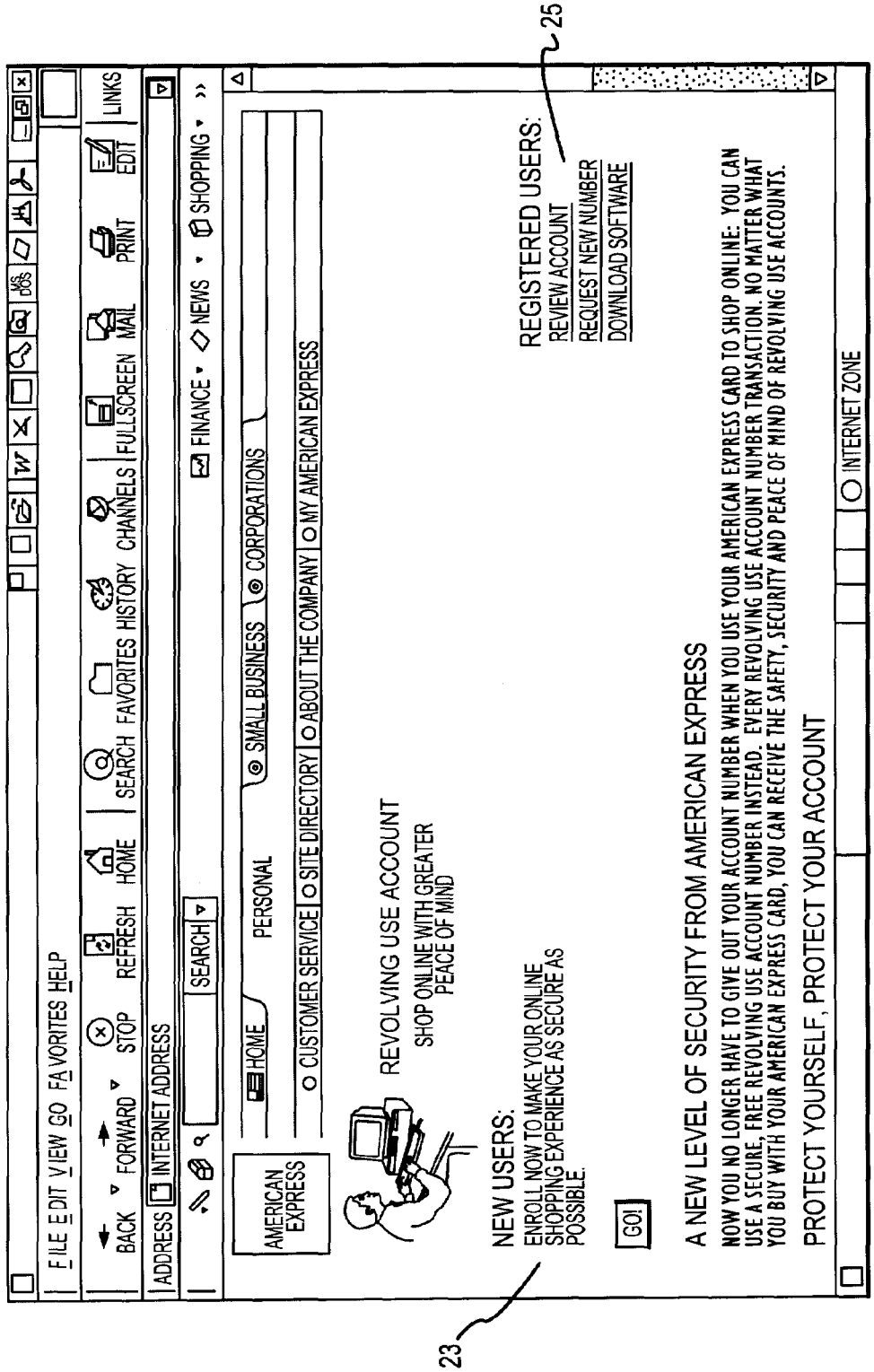
FIG. 16 is a web page screen shot of a issuer's exemplary splash page for a transaction system.
Figure 17:
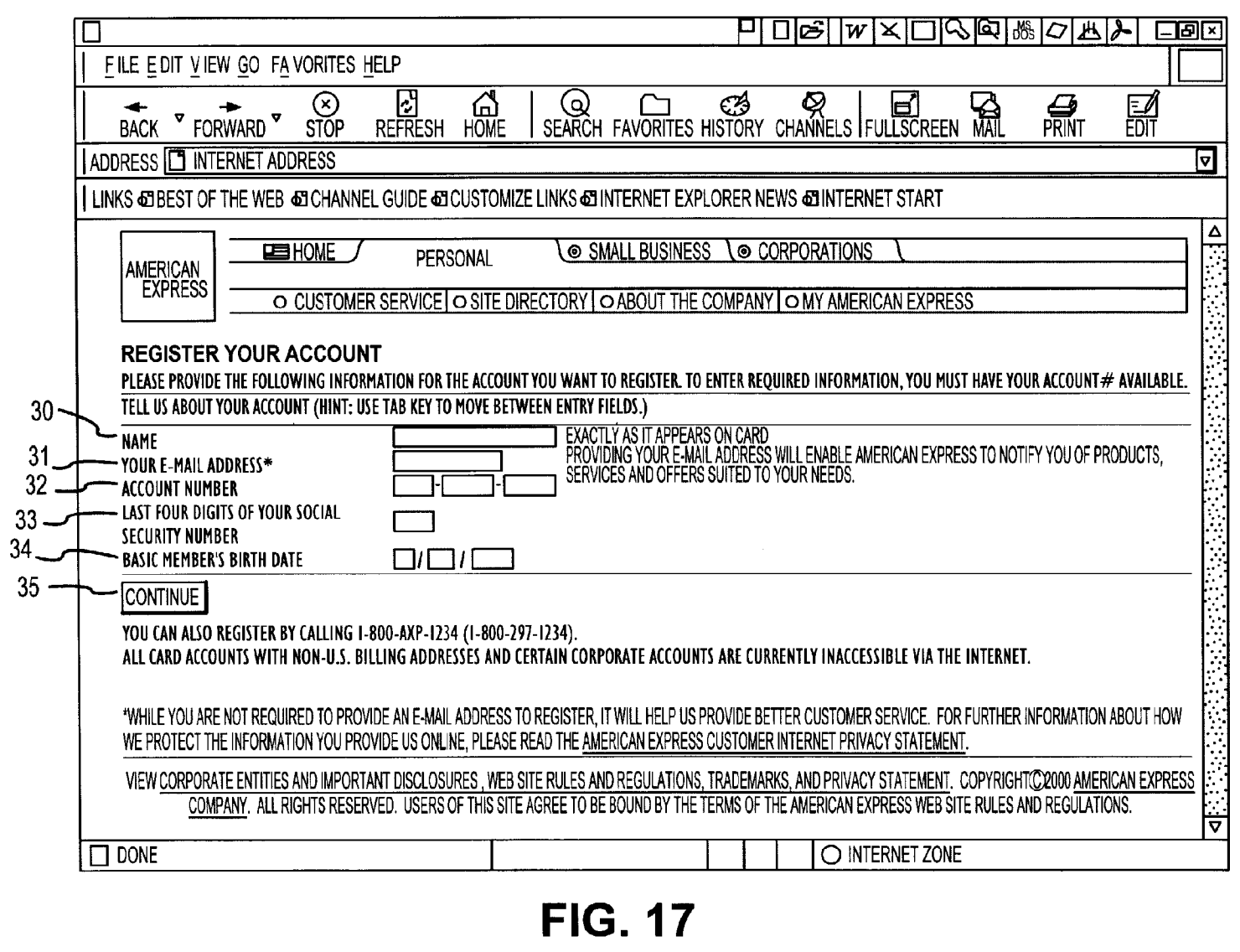

Two exemplary screen shots relating to an exemplary registration process are shown at FIGS. 16 and 17. FIG. 16 depicts a splash page for an American Express® Revolving Use Account program. The Revolving Use Account program is an exemplary embodiment of the present invention. Here, a new user 1 may enroll to use the program and/or an existing user may access a number of program features 25, e.g., review account, request a new RUA 1000 number and/or download software. User 1 generally enters this site by entering an appropriate account provider URL into her browser, by clicking on a link provided by a merchant's website, and/or alternatively, by an automatic pop-up feature that may appear upon recognizing particular URL and/or HTML codes.

To enroll (or register), user 1 is linked to a registration page (FIG. 17) and prompted for information. Information may include the accountholder's name 30, email address 31, account number 32 (e.g., PCA 20), last four digits of social security number 33, user's date of birth 34, etc. Any suitable authenticating information will suffice. By selecting "continue" 35, user 1 may be provided with a username and password, and/or the cardholder may be allowed to select her own username and password. The user interface system 4 processes this information and suitably interfaces with RUA transaction system 18 (FIG. 12) to register the cardholder. Registration may take many forms and may be accomplished in a variety of ways. For example, issuer 3 may choose to automatically enroll all new charge account applicants and return to the user a username and password with a physical transaction device. Although FIGS. 16 and 17 show an online registration process, it should be appreciated that this process may take place via any suitable user interface system.

In one embodiment, during the registration process, user 1 may choose to select and/or define various parameters, conditions, and programs to tailor the transaction system to the user's 1 particular needs. Additional embodiments allow user 1 to select and/or define parameters, conditions and/or programs at any point in the transaction process. In other words, user 1 has the flexibility to select parameters each time (e.g., during registration, log-in, upon RUA request, etc.) RUA 1000 is generated and/or may apply universal parameters to every RUA 1000 generated. With these selections, for example, user 1 may (i) designate a specific transaction device and/or account to function as the primary card account; (ii) associate the transaction system with other programs such as a non-currency based membership rewards program, an online digital wallet, an online shopping gateway (e.g., American Express's "ShopAMEX"), an online gift check program (e.g., E-Gift), exemplary buyer's programs, etc.; (iii) provide password protected access to family members; (iv) activate a feature allowing remote random generation of RUAs; (v) designate cell phone, email and/or pager numbers to utilize with the voice and/or automated response RUA generation feature; (vi) and other banking and transaction features that may be apparent to those skilled in the art.

Figure 18:
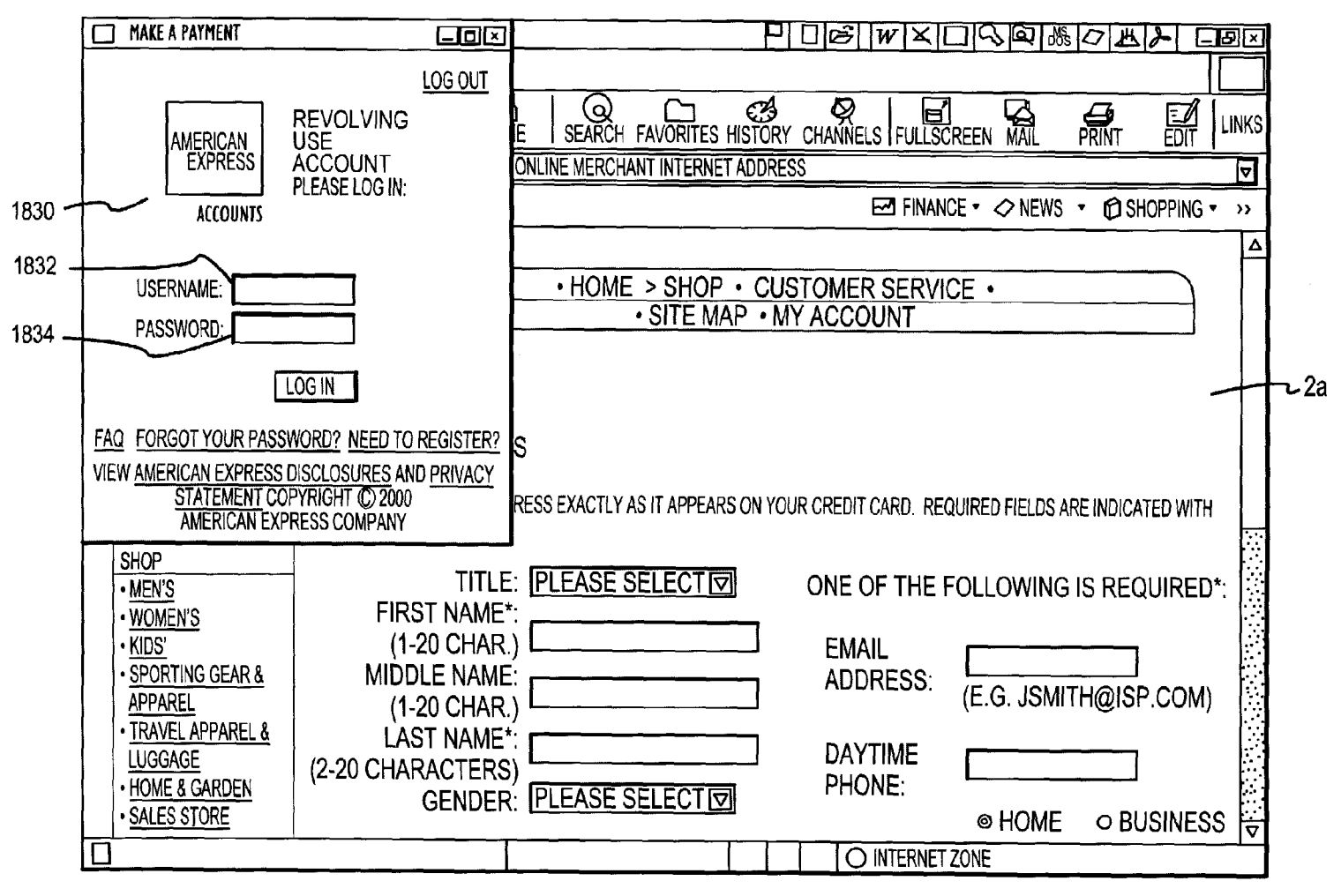
Figure 19:
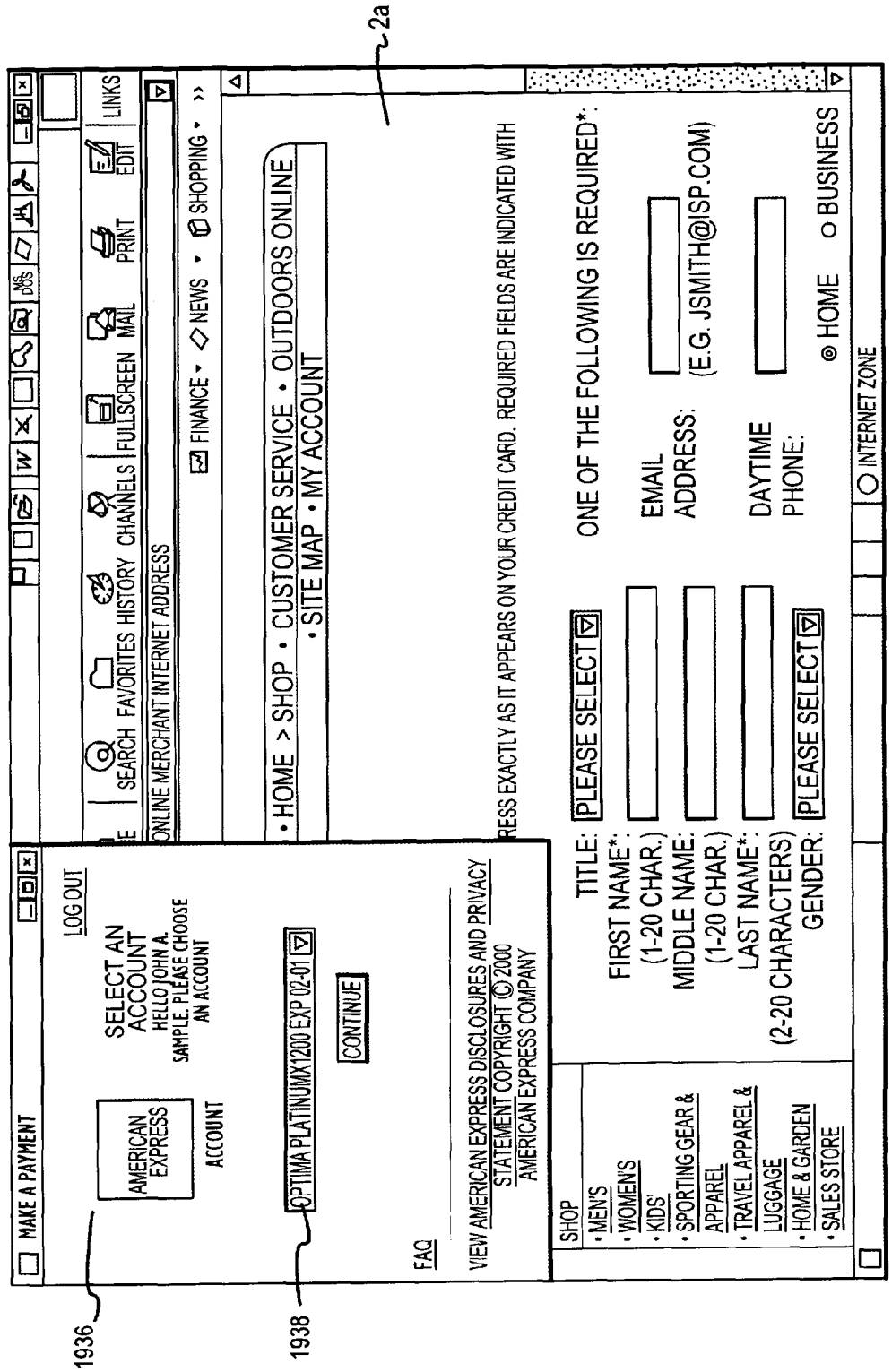
FIG. 19 is a web page screen shot of an issuer's exemplary online drop-down menu used to select a primary charge account in the foreground and an online merchant's payment web page in the background.

A registered user 1 generally accesses the account provider's transaction system by logging into the system via any suitable user interface system 4. FIG. 18 depicts an exemplary online log-in screen 1830, where user 1 is prompted for authenticating information such as a username 1832 and password 1834. Alternative systems contemplate authentication via any suitable user interface system. For example, an embodiment employing a portable data device such as an RFID-transponder fob facilitates authentication by waving the fob in front of a transponder reader. After waving the fob, the transaction information may be routed through the user interface system 4 (e.g., web server) to the application server 5, where, as shown in FIG. 18, the application server 5 retrieves information relating to the user's account from the RUA database 6. If user 1 has registered multiple transaction accounts, in one embodiment 1936, as depicted in FIG. 19, the program prompts user 1 to choose from a list of accounts from a pull-down menu 1938. User 1 then selects at least one account to be the primary account and/or to be included in a primary group of accounts (when it is desired for RUA 1000 to be associated with more than one account). In other embodiments, user interface system 4 (e.g., web server) will return additional options for user 1, such as prompting user 1 to choose from several condition fields such as those previously mentioned (e.g., restricting use to a particular merchant, amount, allowing use by other recipients, etc.).

Figure 20:
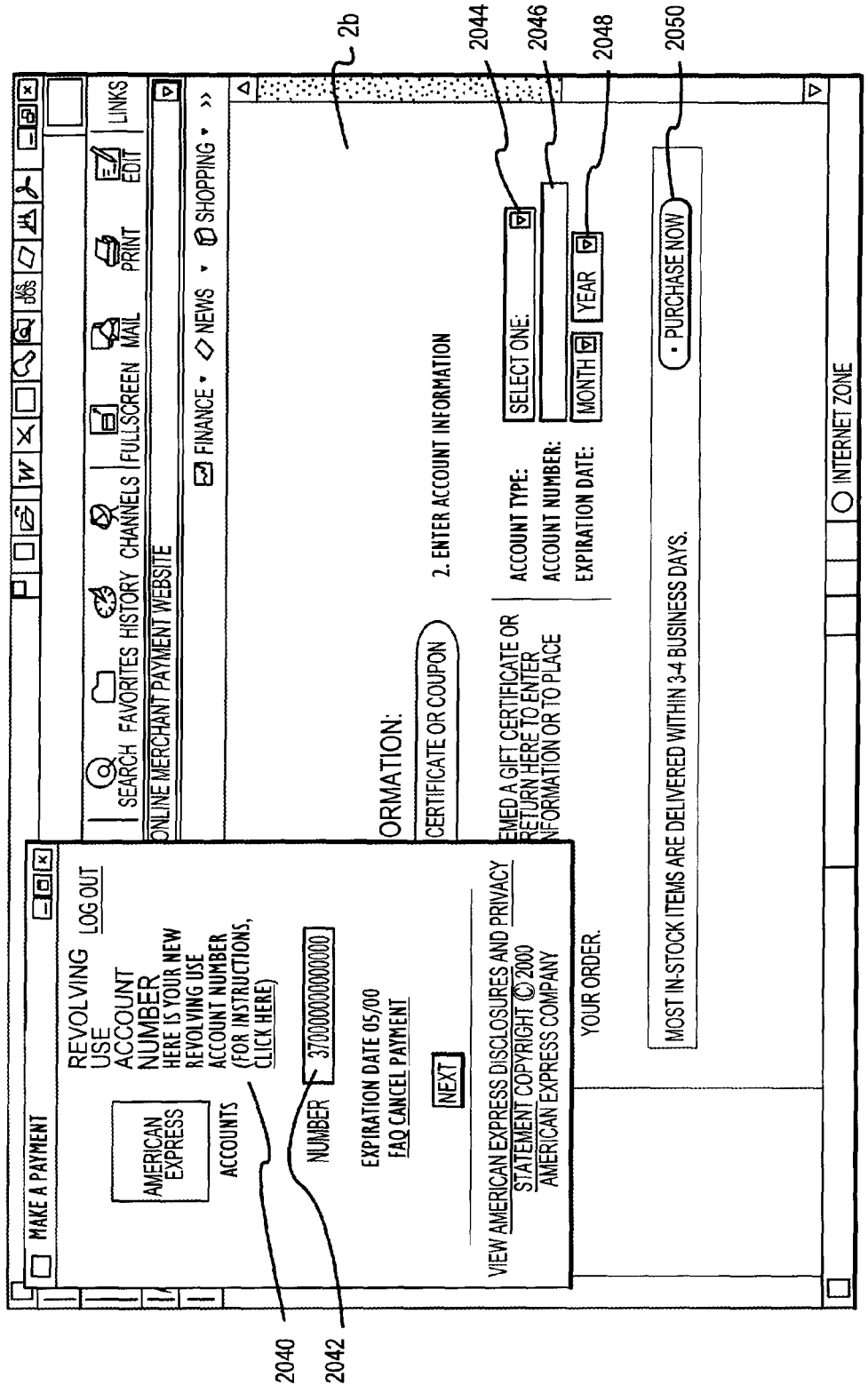
FIG. 20 is a web page screen shot, displaying in the foreground, an exemplary revolving use account returned to the user; and in the background, a merchant's payment web page.

An exemplary online transaction process begins with user 1 desiring to purchase products and/or services from a merchant's website. In this exemplary online system, user 1 selects products from a merchant's online website 2, is routed to and/or clicks to the merchant's payment page 2a (FIGS. 18, 19). User 1 is hyperlinked (manually and/or automatically) to a account provider's web site to log in 1830 (FIG. 18), which resides on and is managed by the account provider's user interface system 4 (e.g., web server), and, upon logging in, obtains RUA 1000 that may then be "cut and pasted," "dragged and dropped" (or alternatively, automatically filled by issuer 3 and/or downloaded from a digital wallet) into the payment fields 2044, 2046, 2048 (FIG. 20) on the payment web page 2b (FIG. 20). In alternative embodiments, the system includes one and/or more of the following: issuer 3 sends RUA 1000 directly to the merchant 2, RUA 1000 is encrypted and/or encoded, user 1 enters additional security numbers and/or other indicia and/or a biometric sample is required from the issuer 3. In an exemplary embodiment, RUA 1000, as will be discussed next, is generated by the account provider's application server 5 and RUA database 6.

After authenticating user 1 during the log-in process, and receiving a request for RUA 1000, the process begins for generating RUA 1000. User interface system 4 prompts the initiation of the number generation process in the RUA transaction system 18. In an exemplary random number generation process, RUA 1000 is generated (e.g., almost immediately) and provided to user 1 (almost contemporaneous with the user's request). As previously noted, this allows the number to be usable immediately upon receipt by user 1 without the need for separate activation (although separate activation features are contemplated by the present invention), while minimizing any increased risk of theft and/or fraud.

Figure 14:
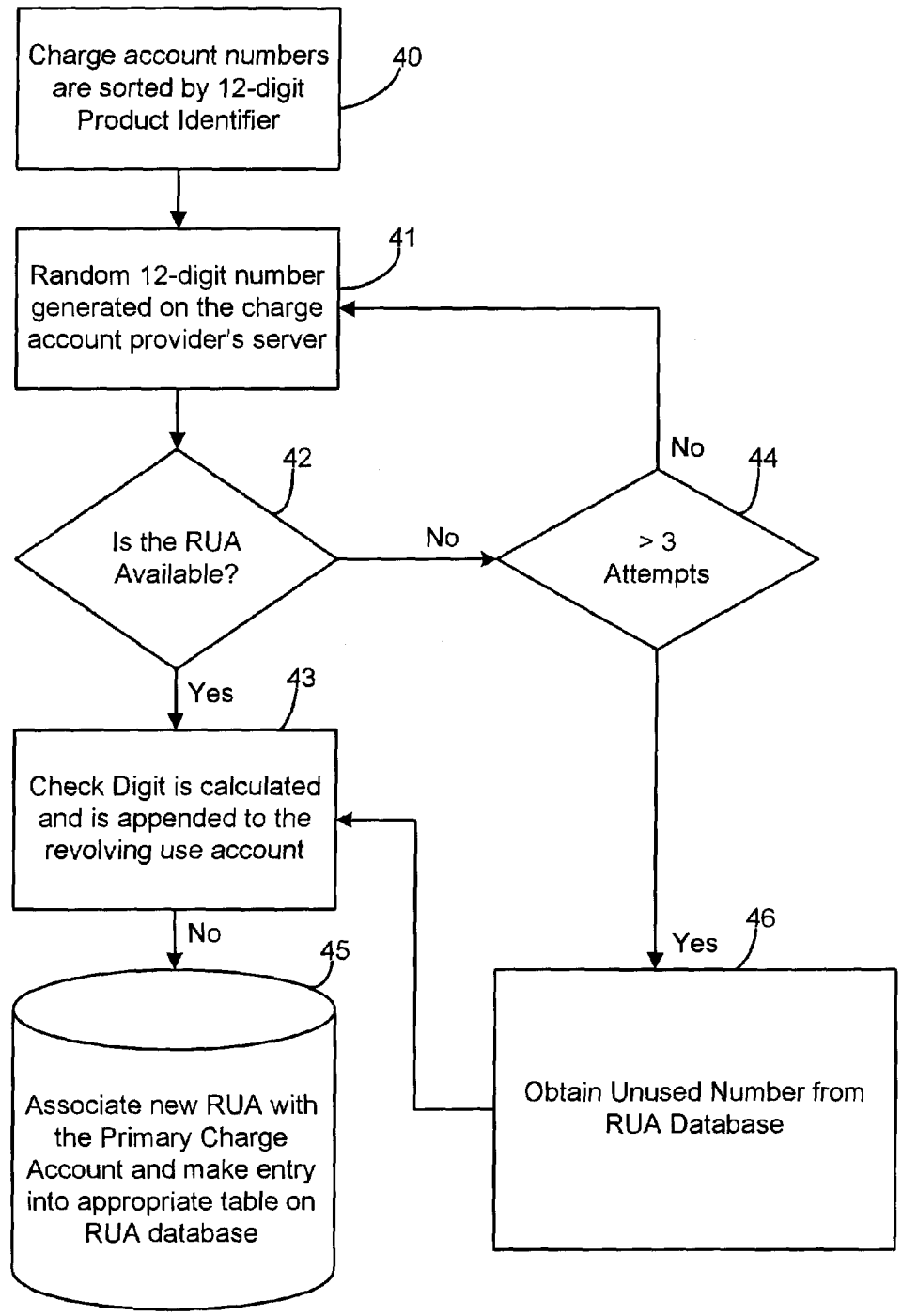
FIG. 14 is a flow chart of an exemplary revolving use account generation process of the present invention.

An exemplary random number generation process is depicted in FIG. 14. In this exemplary embodiment, each issuer 3 (FIG. 10) is generally identified by a range of numbers on the account, typically called the bank identification number (BIN). Each account possesses a product identifier (e.g., first 4 digits of BIN, etc.) that is not part of the random number generation process, but in order to initiate the process, this number must first be selected (step 40). Issuer 3 may set aside a set of product identification numbers relating to random use account numbers for specific use with the transaction system. Alternatively, however, some account providers may find it desirable to use a relationship to the same BIN number designation for both RUA numbers 1000 and PCAs 20 so that one cannot distinguish between the two types of numbers. As depicted in FIG. 14, a random twelve-digit number is generated by the account provider's application server 5 using an algorithmic process (step 41). The application server 5 verifies that the randomly generated number is available (i.e., it is not in use nor has it been used by user 1 within a certain period of time) (step 42). If the RUA number is free (i.e., not in use), a check digit and the selected product identification number are appended to the number (step 43). This newly created RUA 1000 is then associated with the user's PCA 20 and is provided to user 1 (step 45), whereupon RUA database 6 is updated to reflect that this particular RUA 1000 is in use and associated with PCA 20 account. If, during step 42, it is determined that the number is in use, the number generation process is repeated up to a preset number of times (e.g., 3) (step 44). After attempting and failing to generate a non-used random number for a preset number of times, a non-used random number is physically selected from RUA database 6 (step 46).

After RUA 1000 is generated, conditions of use parameters are applied, and are associated with PCA 20 and/or RUA 1000, RUA 1000 is then distributed (i.e., issued) to user 1 for use in facilitating a transaction. Communication of RUA 1000 may occur via a number of user interface systems 4. For example, FIG. 20 depicts an exemplary online interface where RUA 1000 is returned to user 1. This embodiment shows how the account provider window 140 overlays a merchant's online payment page 2b. User 1 selects the appropriate charge account (e.g., American Express®) from the credit type filed 144. User 1 is then able to "cut and paste" and/or "drag and drop" RUA 1000 (present in the RUA field 2042) into the PIN field 2046 on the webpage 2b. Finally, user 1 chooses the appropriate expiration date 148 and completes the transaction by selecting the "purchase now" button 150. Although this embodiment describes linking to a account provider's web site to receive RUA 1000, an additional embodiment configures user interface 4 (e.g., web server) and RUA transaction system 18 to seamlessly interact with the merchant's website to eliminate the need to separately link to the issuer 3. In this instance, the generation and issuance of RUA 1000 would use merchant 2 as a gateway to issuer 3. Any number of interface systems 4 can be used to facilitate the processes described above (FIG. 11 steps 1100, 1105, 1110).

For example, as just described, distribution of RUA 1000 may occur via a "server to desktop" arrangement where a connection is established between the account provider's web-server 4 and the user's 1 desktop computer, using SSL 3.0. With this exemplary system, the number is generated by the application server 5 (according to an algorithmic processing feature) utilizing a random number generation process such as that previously described and delivered to the web server 4. The number is then displayed on the user's 1 desktop. While pre-registration is not required, in an exemplary embodiment, user 1 will have previously registered at the account provider's 3 online web site providing all required personal information, primary charge account numbers, and establishing a user ID and password (if not already established). The user ID and password are then used for verification of user's 1 identity when logging into the account provider's web server 4.

Distribution of RUAs 1000 may also occur via a "server to IVR" arrangement, where user 1 calls issuer 3 in order to obtain RUA 1000. In this exemplary embodiment, a voice response menu enables user 1 to choose the transaction option, and allows user 1 to enter a main account number. Once identity is verified, a link to the application server 5 is established, prompting generation and delivery of RUA 1000 over the phone. In this embodiment, user 1 provides authenticating information by providing date of birth (DOB), a biometric, etc. Once this verification number is matched to customer's records, RUA 1000 is distributed. Of course, this process would also work with a live operator arrangement.

Additional distribution embodiments include a number of different delivery vehicles and/or portable data devices, such as use of wireless devices, smart chip encoded devices, personal digital assistants (PDAs), pagers, interactive IVs, etc. For example, a "server to wireless device" is used where a wireless phone with Internet browser is able to access the account provider's transaction site via the account provider's online service web site. RUA 1000 can be delivered via text and/or voice. Additionally, with the use of encryption keys, the wireless device can be used as payment vehicles (e.g., RUA 1000 is delivered from user 1 to merchant 2 and/or other customer with Blue Tooth and/or other beaming technology). Again, verification of identity can be accomplished by a variety of means, including user ID and password, DOB, PIN number, SIM cards in phones, etc.

Another exemplary embodiment of the transaction system, utilizing one and/or more of the distribution arrangements above, includes situations where a Point-of-Sale terminal (POS) is not present (e.g., submitting RUA 1000 to merchant 2 such as, for example, a plumber at home). In this exemplary embodiment, user 1 may not have cash and/or may not want to provide her PCA 20 number to the vendor due to concerns about unauthorized re-use. As such, user 1 calls issuer 3 seeking to obtain RUA 1000 with either pre-defined conditions of use and/or user determined conditions of use. A voice recognition system asks for PCA 20 number, the amount she wants to authorize, a merchant ID (e.g., SE number), and/or any other conditions of use. The voice recognition system communicates with the application server 5 and, alternatively CAS 7, to generate RUA 1000. RUA 1000 is then transmitted to user 1 who in turn provides to the merchant 2. Additionally, merchant 2 can also receive, if desired, an immediate call from the voice response unit to provide an approval code. One skilled in the art will appreciate that this system can be used in association with landline phones, cellular phones, pagers, handheld computers and/or any other PDA devices.

Another exemplary embodiment of the present invention utilizes a RFID transponder ("fob") system and/or similar portable data device to generate and/or distribute RUAs 1000 to one or more secondary users 1, account providers and/or merchant 2. The fob may facilitate the generation of RUAs 1000 for use with one or more additional form factors. In one embodiment, the fob generates one or more RUA 1000 from a self-contained processing chip. In another embodiment, the fob interfaces with the account provider's user interface system 4 to cause issuer 3 to generate one or more RUAs 1000. In another embodiment, the fob supports interaction with a merchant's transaction processing system.

After one or more RUAs 1000 have been generated, the fob sends each RUA 1000 to a different RF form factor device for use by one or more secondary users. As used herein, an RF form factor device includes any transaction device described herein that is configured with an RF enabled apparatus, an RFID protocol and/or any other RF-enabling device, protocol or system.

In an online embodiment, RUA 1000 may be generated and used for an online transaction. For example, User 1 suitably links to an online shopping site, orders a product and/or service and/or fills a shopping cart and goes to the payment page. Fob user 1 clicks the RUA payments button on the browser and/or the icon on the display (or the activator automatically launches the RUA button) and a pop-up window appears, asking user 1 to wave the fob in front of the transponder reader. Alternatively, the transponder reader may be configured to automatically detect the presence of a fob. In another embodiment, any other security data and/or functionality may be included. Upon entering this information, RUA 1000 will be generated by the account provider's RUA transaction system 18 (FIG. 12), or, in another embodiment (discussed below) will be generated directly from the fob chip; and a pop-up screen containing RUA 1000 number will be displayed on the computer. User 1 then "drags and drops" and/or "cuts and pastes" the randomly generated RUA 1000 and other transaction information (e.g., card type, expiration date) into the online order form and completes the transaction. In an alternative embodiment, RUA 1000 and other transaction information are automatically filled into the web shopping page by the account provider's web server.

Another embodiment contemplates the use of RUAs 1000 with a transponder system comprising a first means for generating and/or storing a signal that includes an encoded RUA 1000 and a second means for reading and/or receiving the signal. In an exemplary embodiment, user 1 waves a fob in front of the merchant's 2 receiving unit. RUA 1000 information can be sent/received by a number of known methods (e.g. optical, magnetic, infrared, radio frequency, etc). Merchant 2 reader captures RUA 1000 and forwards RUA 1000 (with the associated transaction information) to the account provider's CAS 7 as previously described. The fobs may be set up in a number of ways. Each fob may hold one RUA 1000 with certain predefined parameters and/or each transponder device may have several RUAs 1000.

Referencing FIG. 15, after RUA 1000 is provided to the merchant 2, merchant 2 submits an authorization request to the issuer 3, as it would with any other account transaction. This request is routed to a card authorization system (CAS) 7 for authorization (step 80). The CAS 7 recognizes the transaction as involving RUA 1000 and forwards the transaction information to the Authorization Request Listener 77 program on the application server 5 (step 81). The Authorization Request Listener 77 passes the transaction information to a CAS Authentication Component 78 (step 82). The CAS Authentication Component 78 determines if use of RUA 1000 has satisfied the previously defined conditions of use parameters. To determine this, the CAS Authentication component 78 looks to RUA database 6 for the conditions-of-use rules and the primary charge account number (PCA 20) that are associated with the particular RUA 1000 (step 83). If the use of RUA 1000 complies with the rules of use, CAS Authentication component 78 returns an authorization message and the associated PCA 20 to CAS 7 (step 84). CAS 7 then performs an authorization request for the PCA 20, as is typically completed with any physical charge account, to ensure that the primary charge account conditions (e.g., credit limit, expiration date, etc.) have been met.

If CAS 7 authorizes use of PCA 20, the transaction involving RUA 1000 is approved and an approval code will be generated. However, PCA 20 must first be replaced with RUA 1000 and RUA database 6 must be updated to reflect this transaction data. This is accomplished by CAS 7 returning to CAS Authentication component 78 an approval message with the transaction data (step 85) and CAS Authentication component 78 forwarding to a reversal processing engine 79 (step 86). The reversal processing engine 79 interfaces with RUA database 6 to re-substitute RUA 1000 for PCA 20 and also to update RUA database 6 to reflect the transaction information (step 87). For example, if the conditions of use parameters associated with RUA 1000 authorized two transactions, this step 87 updates the accountholder account in RUA database 6 to reflect that only one transaction remains. The reversal engine 79 substitutes PCA 20 with RUA 1000 and forwards to CAS 7 (step 88). CAS 7 then provides the results to merchant 2 (step 89). If CAS Authentication Component 78 does not authorize use under RUA 1000 conditions and/or if CAS 7 does not authorize use under PCA 20 conditions, the transaction will not be approved. When the use conditions of both the primary charge account and the revolving use accounts are satisfied, the transaction is approved. In this exemplary embodiment, however, RUA 1000 is not deactivated to prevent settlement. To the contrary, settlement may proceed (as discussed next) even when an authorization was declined.

Additionally, use of other third-party networks and systems are contemplated by the present system. One exemplary system allows issuer 3 to associate RUAs to third-party accounts, offering the same fraud reduction benefits to external card issuers. Here, in this exemplary system for authorizing RUAs, merchant 2 submits an authorization request to issuer 3. CAS 7, recognizing RUA 1000 forwards the request to application server 5. The conditions of use are checked and the authorization request is modified to substitute RUA 1000 with the associated primary charge account (PCA 20). In some cases, a merchant identifier may be included in the authorization request. Therefore, a translation may occur to substitute issuer 3 merchant ID with the corresponding third-party account issuer merchant ID. The request is then returned back to CAS 7 for a normal authorization. CAS 7 then recognizes the account as originating from another issuer (third-party issuer 92), forwards the authorization request to a third-party issuer's network for processing (step 84*a*). The network 91 routes the request to the appropriate third-party issuer 92 for an authorization determination. The third-party issuer 92 processes the authorization request and returns the result to CAS 7 for forwarding back to application server 5 (step 84*b*). Application server 5 saves the authorization result (approval and/or denial) and substitutes PCA 20 with RUA 1000 and returns to CAS 7 for forwarding to the merchant 2.

The authorization and settlement processes may occur as separate steps and/or as a single step. In one embodiment, referred to herein as an electronic data capture (EDC) system, merchant 2 sends an authorization request and if the authorization request is approved, a receipt of charges is created and submitted for the merchant 2. Separate sequences of file transmissions and/or messages are therefore not required. Various embodiments, hybrids, and modifications of these processes should be apparent to one skilled in this art.

Prior art systems typically deactivate a temporary RUA during the authorization process if limited-use conditions are not met. As previously explained, because of the uncertainty and variability of the authorization processing, this often results in RUAs being unintentionally deactivated, thereby bringing the transaction processing to a sudden halt. An exemplary embodiment of the present invention overcomes this problem by not "deactivating" the RUA when predetermined conditions are not met. But instead, allowing the transaction to proceed through settlement, albeit without a valid approval code, where the merchant bears the risk that the amount will later be charged back by issuer 3 if the transaction is disputed by user 1.

An exemplary settlement process of this invention involves the back end systems shown in FIG. 12. Specifically, referencing FIGS. 10 and 12, the back end process utilizes a financial capture system (FINCAP) 10 to capture the settlement information (e.g., receipt of charges "ROC" and summary of charges "SOC") from the merchant 2, a back end application service 8 to ensure that proper account information is processed, an accounts payable system 9 to pay the merchant 2, and an accounts receivable system 11 to process the account statement that is provided to user 1. An exemplary embodiment of the settlement process involves a settlement request being made by merchant 2 for a transaction involving RUA 1000. All settlement requests are forwarded to the account provider's back end system 14 for processing where the request is initially sent to FINCAP 10. FINCAP 10 captures the ROC and SOC data and identifies, via an account identifier (or by any other suitable means), the transaction as involving RUA 1000. In another embodiment, the account identifier (or BIN number) does not differentiate between RUA 1000 and a regular account number. In that instance, it will be necessary for FINCAP 10 to call the back end application service 8 (which interfaces with the RUA database 6) to identify RUA 1000 from other accounts. After RUA 1000 is distinguished from the ordinary accounts, FINCAP 10 verifies that the number is valid (i.e., exists in the RUA database 6). If RUA 1000 is a valid number, FINCAP 10 creates a payment (accounts payable) file including the transaction data and sends a payment message to the AP system 9 instructing merchant 2 to be paid. In paying the merchant 2, issuer 3 references only RUA 1000 and does not release PCA 20 and/or any other regular charge account numbers associated with RUA 1000.

The back end system 14 processes user 1 RUA information as follows. After capturing the transaction information (ROC and SOC) from the merchant 2, FINCAP 10 creates a accountholder account (accounts receivable) file and sends a message to the back end application service 8 to process the information for accountholder billing. Recognizing that the transaction involves RUA 1000, the back end application service 8 replaces RUA 1000 with PCA 20, updates the accountholder RUA information in RUA database 6 to reflect the appropriate transaction settlement information, and processes the transaction as with any other transaction. The back end application service 8 sends the transaction details to the AR system 11, where the AR system 11 sends the proper statement to user 1, typically referencing only PCA 20 number. In another embodiment, the AR system 11 may process the statement where the transactions are further categorized and itemized by both PCA 20 number and RUA 1000.

As previously noted, it may often be the case with prior art systems, that the RUA is inadvertently deactivated during the authorization phase and completion of the transaction is not possible (e.g., multiple payment purchases). The present transaction system overcomes this problem by ensuring that valid RUA numbers will be processed. If the conditions-of-use parameters are not met, user 1 is, under an exemplary embodiment of the present system, able to dispute the transaction and have the transaction charged back to merchant 2 during the dispute handling process (discussed next). During this dispute handling phase, issuer 3 will retrieve information from RUA database 6 to determine if the disputed information was "authorized" (i.e., has an associated approval code). If the transaction was not "authorized" because the conditions of use parameters were not satisfied, the amount will be charged back to merchant 2 according to predefined business rules.

Another embodiment provides for checking the approval codes and other conditions during settlement. Here, transaction information (approval code, SE number, and/or other information) may be checked during settlement. For example, the back end application service 8 (or the application server 5) may compare transaction information to a business rule and/or conditions set associated with user 1 RUA number. If conditions of use have not been met and/or if a valid approval code is missing, the service 8 and/or server 5 may cause a charge back to be issued to the merchant to offset the previous merchant payment. In other words, in this alternative embodiment, where an RUA 1000 transaction is processed through settlement, the following events may occur in sequence. First, a payment file is established once it is determined that RUA 1000 is a valid number. Second, the merchant is paid. Third, the system applies the business rules and/or conditions for the particular account associated with RUA 1000. Fourth, if it is determined that merchant 2 should not have been paid in the first instance because the transaction conditions were not met and/or an approval code was not present, the system will execute a charge back to the merchant 2. This settlement processing may be transparent to user 1 since, before the AR system releases an accountholder billing statement, the merchant is paid and then charged-back resulting in no outstanding balance to user 1.

As shown in FIG. 12, the present invention contemplates the interaction of clearing and settlement systems other than those of the issuer 3. This exemplary system allows a issuer 3 to clear and settle RUA transactions where RUA 1000 is associated to a third-party account, meaning merchant 2 is paid and the charge is billed to user 1. As such, an exemplary embodiment of the present invention is configured to support interaction with third-party networks and systems. Here, the back end application service 8, upon receiving RUA 1000, recognizes that the associated PCA 20 originated with another account issuer 92. The back end service 8 separates the transaction into two transactions (a clearing transaction and a settlement transaction). A substitution occurs in the clearing transaction where RUA 1000 is replaced by the associated PCA 20. Also, a translation may occur to substitute issuer 3 merchant ID with the corresponding third-party card issuer ID. The transactions are then forwarded to a third-party clearing and settlement network 93. The third-party clearing and settlement network 93 handles the routing, as appropriate, to a merchant acquirer's accounts payable system 91 and an issuer's accounts receivable system 92. As noted above, the accounts payable system ensures that all correspondence with merchant 2 references RUA 1000.

The dispute handling process of the present invention involves situations where user 1 and/or merchant 2 a disputes charge that is associated with a transaction involving RUA 1000. Generally, user 1 disputes a charge by contacting the charge issuer 3 via phone, mail, and/or Internet. As previously noted, an exemplary AR system 11 typically bills user 1 with reference to only PCA 20 number. The computer systems of the present invention allow the account provider's customer service representatives to lookup information based on, inter alia, RUA 1000 and/or PCA 20 number. FIG. 21 depicts an exemplary look-up screen 2175 for reviewing the primary charge account 20 and the transactions associated with RUAs 1000.

With respect to an accountholder initiated dispute, the representative initiates a dispute through a dispute handling system (DHS) to obtain the case avoidance and/or case set rules for accountholder disputed transactions. One of the case avoidance and/or case set rules provides for a look up from RUA database 6 to verify that the transaction was processed with an approval code. The rule set may provide for, inter alia, an automatic charge back of the transaction amount to the merchant if an RUA 1000 transaction is submitted without an approval code. The DHS and/or the representative initiates user 1 and/or merchant 2 contact (via phone, mail, Internet). Disputes involving RUAs 1000 may be automatically routed to predefined RUA queues based on industry type (i.e., airline, car rental, etc.). Contact letters may be automatically filled with information retrieved from RUA database 6. The adjustment file accesses the application server 5 (or back end application service 8) to substitute PCA 20 number with RUA 1000. A letter file is then generated and an electronic transmission system routes electronic contacts to and from various merchant interfaces.

In an exemplary system for handling disputes from merchant 2, merchant 2 contacts issuer 3 via normal channels. The account provider's representative generally accesses a customer service application that is used to service merchants. This customer service application identifies the account by RUA 1000 in dispute. A case is set-up with RUA 1000 and is managed via adjustment management systems. The adjustment management system and a letter generating system access RUA transaction system 18 for the account number swap, where the PCA 20 number is replaced with RUA 1000 for financial adjustments intended for user 1. The remaining inquiry is processed as with existing dispute handling systems.

Although the previously described embodiments generally relate to a user's 1 request for RUA 1000, merchant 2 may also find it desirable to request RUAs from issuer 3 in order to limit exposure to account fraud. In traditional transaction processes, upon completing a transaction, merchant 2 stores transaction information (including the customer's account number) in a merchant database. This database of information is subject to account fraud in that a thief could hack into the merchant's computers to steal its customer's account numbers. To limit exposure, merchant 2 may desire to replace those customer account numbers with RUAs 1000 that are associated with the user's primary charge account (e.g., PCA 20) (i.e., the merchant may not want its database filled with actual customer account numbers). In this situation, only issuer 3 maintains the actual account number and merchant 2 retains only the RUA 1000. In an exemplary process, the merchant receives a regular account number from user 1 to facilitate a transaction. Merchant 2 submits the number to issuer 3 for authorization, requesting that issuer 3 instead of returning the regular account number, return RUA 1000 (and approval code) that is associated with the regular account number. In response, the account provider generates RUA 1000, associates the number to the regular account number (which is associated with the primary account (e.g., PCA 20)), checks to see if authorization is appropriate and returns the authorization record (only referencing RUA 1000) to the merchant 2. Merchant 2 processes the transaction through the normal settlement channels, referencing RUA 1000 instead of the regular account number. When retaining transaction records, merchant 2 replaces the primary account number with RUA 1000 and maintains RUA 1000 in its database.

In another embodiment, merchant 2 accepts only RUAs 1000—not regular account numbers—from users to complete transactions. For the same reasons stated above, merchant 2 may desire to limit receipt of regular account numbers to limit exposure to account fraud. In one exemplary embodiment, merchant 2 computer system differentiates between RUAs and regular account numbers and will not allow customers to use regular account numbers to facilitate a transaction (i.e., will refuse the transaction). As previously described, however, RUA 1000 and the regular account number may be transparent to merchant 2 making it difficult for merchant 2 to differentiate between RUA 1000 and the regular account number. In this situation, in an exemplary embodiment, RUA 1000 will be identified during the authorization process by the issuer 3, where if RUA 1000 does not meet certain conditions defined by the merchant 2, the transaction will not be authorized. For example, the merchant could require that all customer transactions be completed with RUA 1000 that has limited-use conditions restricting use to the amount of the transaction and/or restricting use to the particular merchant. During the authorization process, RUA 1000 is compared with the merchant-defined conditions where if the conditions are not satisfied, the authorization request will be denied. After completion of the transaction, and upon satisfying merchant 2 conditions, the RUAs 1000 have little to no value and would be of minimal value to a potential thief.

In one embodiment, RUA database 6 is used to facilitate the merging of a newly acquired accountholder base with an established accountholder base. For example, when a bank and/or other institution sells an accountholder base to issuer 3, issuer 3 creates new physical accounts for the acquired accountholders and does not issue new accounts. RUA database 6 is updated to associate the acquired accountholder account numbers to the newly created accounts. This allows the accountholders' existing accounts to still be used and processed appropriately. The account provider (BIN) routing is modified for the acquired accounts so authorization requests and settlements are sent to issuer 3 instead of to the bank and/or other institution. CAS 7 and FINCAP 10 recognize these acquired accounts as RUA 1000 accounts and translate the numbers appropriately. The end result is that charges made by the acquired accountholders end up on a statement generated by the issuer 3.

In another exemplary embodiment of the transaction system, issuer 3 may provide a line of credit to a customer and/or to merchant 2 and/or group of merchants who can private label for use by their customers. This allows merchant 2 to provide a branded line of credit with minimal and/or no changes to the authorization and settlement process. In one embodiment, merchant 2 approves a line of credit and/or asks issuer 3 to approve a line of credit for the customer. By the phrase "line of credit," merchant 2 may allow user 1 to overdraw on a credit limit, extend a credit limit, make an emergency ATM withdraw, and/or provide user 1 with any other type of line of credit.

The account provider would then issue RUA 1000 to the customer via the merchant 2. This RUA 1000 is generally used with the merchants 2 who are issuing the line of credit. When the customer wants to make a purchase using the merchant's line of credit, the merchant forwards a standard credit request to issuer 3 with RUA 1000 used as the account number in the transaction protocol. Issuer 3 verifies that the line of credit is authorized and was submitted by merchant 2 issuing the line of credit associated with this RUA 1000. The account provider transaction system (via RUA transaction system 18) is capable of denying usage of this line of credit at another non-participating site. Issuer 3 may provide a private label and/or co-branded web, site to apply for the line of credit. The account provider's back end system 14 then bills the customer and pays the merchant. Merchant 2 may keep the electronic line of credit privately at their site, and/or provide it to the customer. The authorization system would not authorize usage at other sites.

Figure 22:
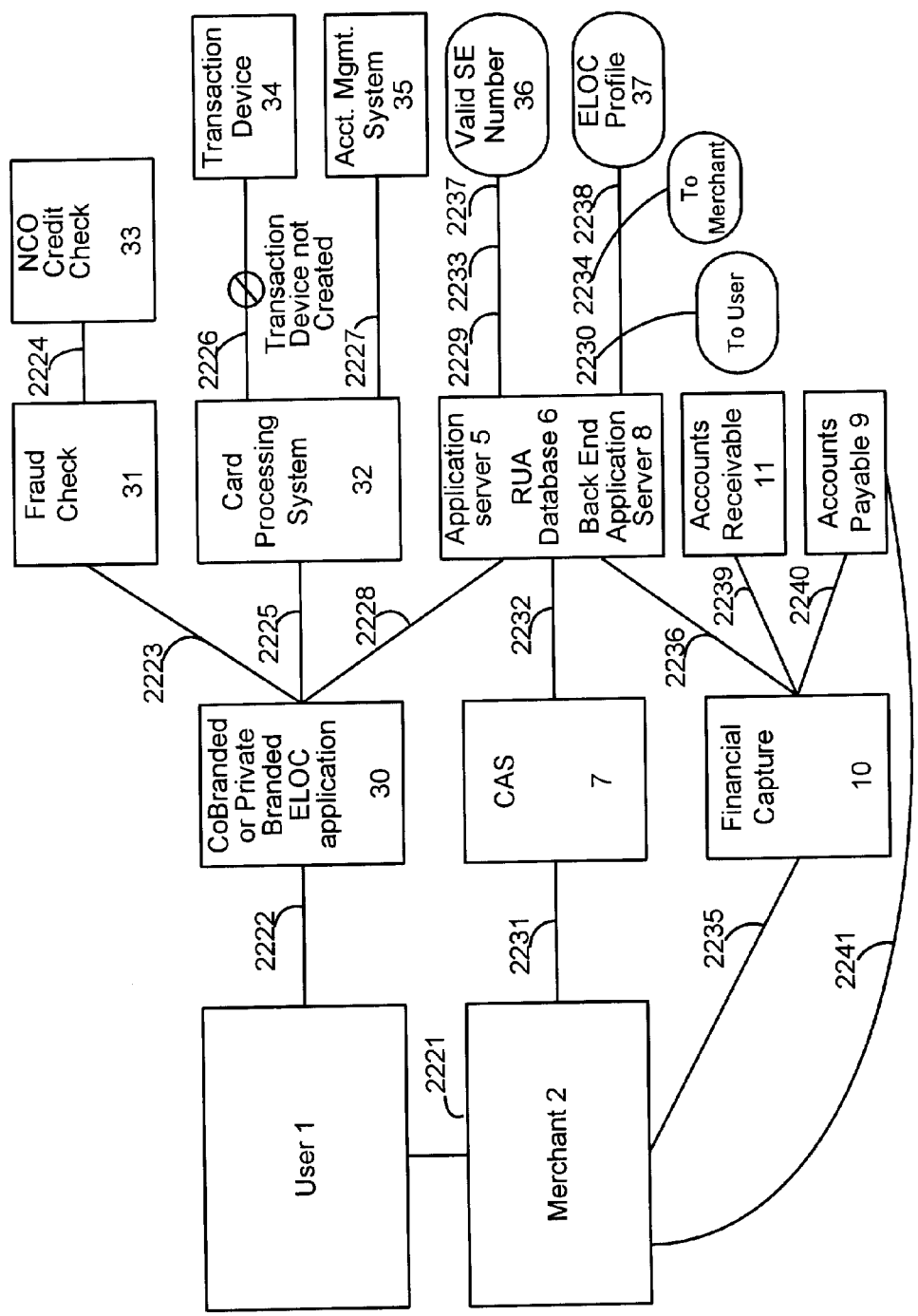
FIG. 22 is a flow diagram depicting an exemplary embodiment of the present invention involving an electronic line of credit system.

FIG. 22 depicts an exemplary transaction process for use in providing lines of credit to merchants 2. User 1 and/or customer (who may and/or may not be an existing account holder of the participating issuer 3 applies for an electronic line of credit (ELOC) with merchant 2 (step 2221), merchant 2 redirects user 1 to the account provider's 3 website to fill out the ELOC application 30 (step 2222). A fraud check 31 is performed (step 2223) and a credit inquiry is typically performed by any credit bureau company 33 (step 2224). If an account processing system 32 determines that credit is acceptable, an account is set up (step 2225). A physical transaction device 34 is not generated as with typical processes and may need to be purged depending on the particular system set-up (step 2226). The account is sent to the account management system 35

(step 2227) and then forwarded to RUA database 6 and the application server 5 (step 2228). User 1 account is then related to a valid merchant identification number such as the SE number 36 (step 2229). An account is then set-up with an ELOC profile 37 and at this point the limited use PIN ELOC number is passed back to user 1 (step 2230). Merchant 2 submits the ELOC payment request to CAS 7 (step 2231), and CAS 7 routes the ELOC to the RUA system (step 2232), where the RUA system verifies that the SE number is approved for this particular ELOC (step 2233). The RUA system translates the ELOC RUA to the related account in the account management system and returns the ELOC RUA to merchant (step 2234). The merchant is then required to submit the authorization code with the receipt of charges (ROC) and summary of charges (SOC). The merchant submits the ROC and/or SOC to the account provider's FINCAP 10 (step 2235), whereupon FINCAP forwards the ELOC to the RUA system (step 2236). The RUA system verifies that (i) this SE number is valid for the particular ELOC account (step 2237) and (ii) the particular transaction was authorized for the specific ELOC account (step 2238). The RUA system then flips the account number, returns it to FINCAP 10, whereupon, the number is forwarded to the account provider's accounts receivable system 11 (step 2239). FINCAP forwards the ELOC RUA and associated information to the Accounts Payable system 9 (step 2240) and pays merchant 2 (step 2241).

Another exemplary embodiment allows a user to fund an online digital wallet with the RUA. In this embodiment, after generation and association with the primary charge account, the revolving use account is provided to the user to use within a designated digital wallet, which may reside locally at the user's computer and/or may be stored in an online password protected account.

In yet another alternative embodiment, the revolving use account system may be used to facilitate programs involving non-currency tender, such as the American Express® Membership Rewards as Currency™ system that is detailed in U.S. Provisional Application No. 60/200,492, filed Apr. 28, 2000, and U.S. Provisional Application No. 60/201,114, filed May 2, 2000, which are hereby incorporated by reference. One embodiment of this system, depicted in FIG. 23, allows user 1 to create RUA 1000 to be used to spend membership rewards points. In general, a membership and/or incentive rewards program is a loyalty program that rewards cardholders for using their charge card to make purchases. Cardholders accumulate points by using a participating charge card and/or by purchasing products at a participating merchant. These points may then be converted to a monetary value and redeemed to purchase merchandise.

Figure 23:
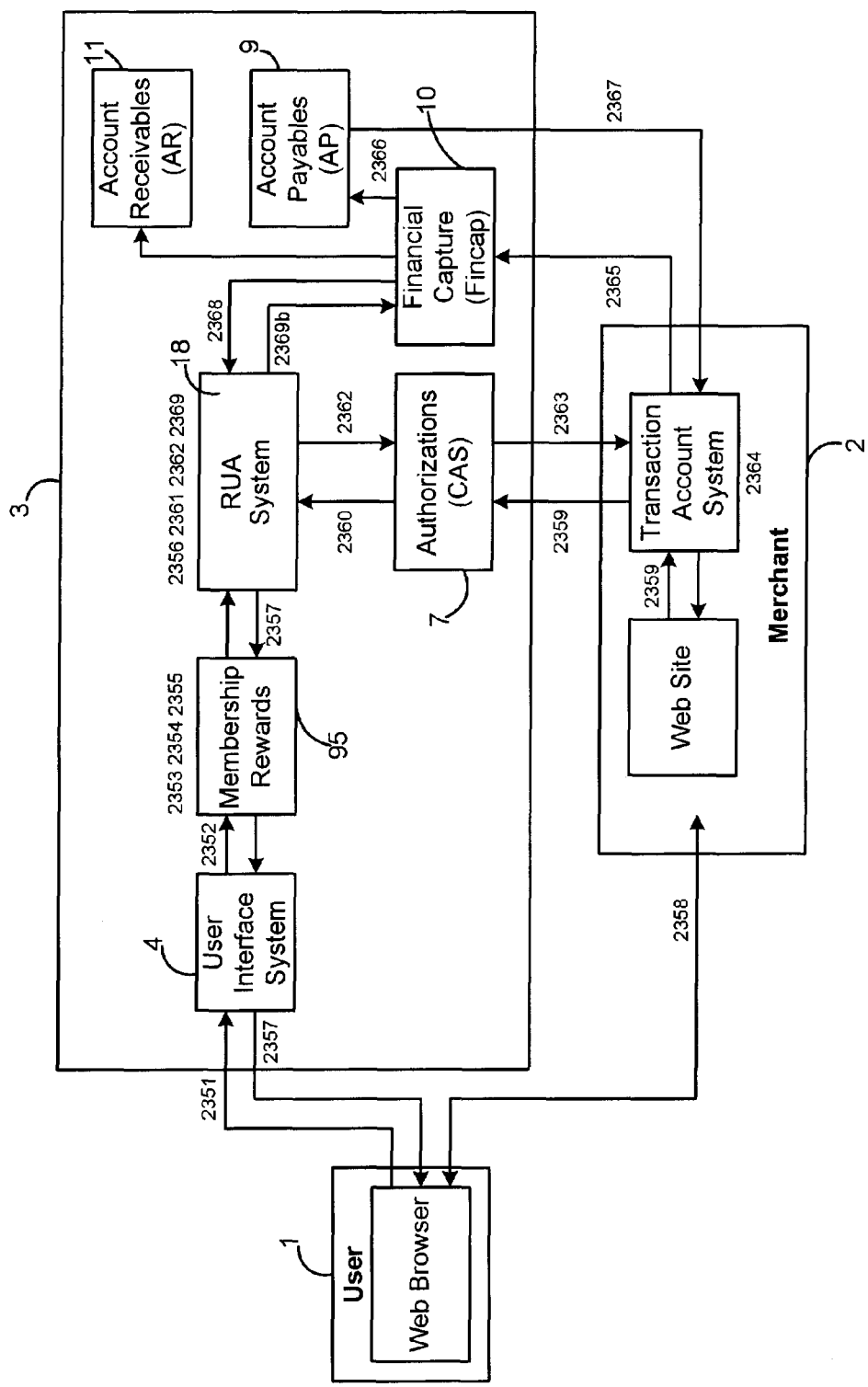
FIG. 23 is a flow diagram depicting one embodiment of an exemplary transaction system of the present invention used to facilitate a non-currency based membership rewards program.

As depicted in FIG. 23, user 1 accesses and logs onto the account provider's services via a user interface system 4 (e.g., an Internet connection) (step 2351). User 1 proceeds (clicks on hyperlink) to the membership rewards (MR) system 95, where she indicates that she would like to use her membership reward points that are available in her MR account (step 2352). MR system 95 reports to user 1 how much the available MR points are worth (step 2353). User 1 indicates how many of the MR points (converted to monetary value) should be loaded info an account that can be used for purchases (step 2354). In an exemplary embodiment, RUA 1000 can be associated with a MR account that is funded with these MR points. Use of this MR account may be limited by user 1 and/or issuer 3, and/or could be further limited by the MR system rules of use that may have been predefined by participating merchants (step 2355). Once the MR system 95 has approved the request and allocated the requested MR points, RUA system 18 associates RUA 1000 and establishes an MR-RUA profile (2356). The MR-RUA profile contains the options that will be applied and the amount that will be available to the resulting RUA 1000. RUA system 18 returns RUA 1000 (and other account information) to the MR system 95 to provide to user 1 for use in completing subsequent transactions (e.g., online purchases) (step 2357).

When desiring to purchase products using the MR point-funded RUA 1000, user 1 proceeds to a merchant site (e.g., online website), selects goods and is requested by the merchant to provide payment information (e.g., via an online payment web page). User 1 chooses the appropriate issuer 3 as the form of payment (e.g., American Express®, Visa®, etc.) and enters RUA 1000 (and other needed information) into the appropriate payment fields (step 2358). The merchant 2 processes RUA 1000 authorization as discussed above (step 2359), where the account provider CAS 7 recognizes the transaction as involving RUA 1000, and forwards the request to the RUA system 18 containing, inter alia, an application server (FIG. 12, number 5) and a RUA database (FIG. 12, number 6). It should be appreciated that profile information may be stored in an MR database, RUA database 6 and/or any other suitable database (step 2360). RUA system 18 recognizes the account as an MR account, and verifies that optional conditions, if any, are met. If the conditions are not met, an error is returned to CAS 7 and then to the merchant (step 2361). If the conditions are met, the balance available on the MR-RUA profile is reduced by the purchase amount, a record of the purchase is recorded in the MR-RUA profile, and an approval code is returned to the authorization system (step 2362) and then to the merchant (step 2363). Although additional CAS 7 processing is contemplated by this embodiment, application of additional rules and validations—which would typically be applied—are not required for this type of account. The approved purchase is finalized by the merchant with RUA 1000 transaction being submitted through the merchant's existing POS network for settlement (step 2364). RUA 1000 transaction is received by the account provider's financial capture system (FINCAP) 10 (step 2365). The FINCAP 10 forwards the RUA transaction to the appropriate AP system 9 (step 2366). The AP system 9 then pays the merchant according to the appropriate settlement terms and conditions (step 2367). FINCAP 10, having identified the transaction as involving RUA 1000, sends the transaction information to RUA system 18 (via a back end application service 8) to identify the actual account number (i.e. PCA 20) (step 2368). RUA system 18 recognizes that RUA 1000 is associated with a MR account, searches for the MR-RUA profile and passes a credit request to the appropriate user 1 MR account to reduce the available MR points (step 2369), and (ii) the transaction record is used to build a credit against the actual charge account (e.g., PCA 20) that will offset the charged RUA 1000 transaction (step 2369*b*). In the first instance (step 2369), RUA system 18 passes a request to the MR system 95 to deduct the appropriate number of MR points. In the second instance (step 2369*b*), both the original transaction and the credit are passed back to FINCAP 10 with the actual charge account number (e.g., PCA 20 number). The FINCAP 10 then forwards the charge and credit transactions to the appropriate AR system 11 for normal billing processing.

As shown, the embodiment depicted in FIG. 23 allows user 1 to spend the MR points in at least two ways. First, the membership reward points can be deducted at the time of the transaction processing, and/or second, the transaction can be reflected on the user's bill along with an associated credit that reflects the payment with reward points. It should also be appreciated that user 1 may choose to use MR points on a transaction by transaction basis and may be able to combine variations of currency (e.g., credit, debit cards etc.) and non-currency tender (MR points), as desired, to effectuate a transaction. Additionally, both currency and non-currency tender may be integrated into a RUA gift, where a first party gifts to a second party a revolving use account that has some currency and/or non-currency value.

Another embodiment provides for the generation of one and/or more RUAs that are subordinate to and associated with a main RUA that, as described above, is associated with the user's PCA 20 account. As noted above, these subordinate numbers may also be digitally stored in devices such as wireless telephones, PDAs, handheld computers, and the like. Providing multiple layers of revolving use accounts provides user 1 with greater flexibility. For example, a cardholder on vacation could structure the main RUA 1000 to be valid for the duration of the vacation. User 1 is then able to generate subordinate revolving use accounts (or tertiary numbers) with varying conditions to take into account various activities that may occur during the vacation. User 1 could structure the main revolving use account to have a maximum credit limit of $3,000 (this assumes that the associated primary charge card credit limit is equal to and/or greater than $3,000) that is good for the duration of the vacation. A subordinate revolving use account may then be provided to the spouse with a $1,000 limit and additional revolving use accounts, restricted to $500 limits, could be provided to the children. Each subordinate account would be valid only for the duration of the vacation and would only be valid for the maximum dollar amount specified. As another example, RUA 1000 may be valid for a specific merchant and/or a specific subset of merchants. That is, a user may only be allowed to use RUA 1000 for a transaction at Macy's or for a transaction at any grocery store.

Similarly, another embodiment provides for the generation of one and/or more special purpose RUAs. As used herein, "special purpose" may refer to one discreet purpose, a number of related purposes, and/or multiple purposes. As noted above, these special purpose RUAs may also be digitally stored in devices such as wireless telephones, PDAs, handheld computers, and the like. Providing one or more special purpose RUAs provides user 1 with greater flexibility. For example, a special purpose RUA may be used for a child who wants to borrow, for example, a fob 102, for an event. The special purpose RUA may be associated with a credit line of PCA 20, such as, for example $500. Once the child exceeds the credit line, the RUA may be configured to no longer function and/or provide authorization and/or access to PCA 20.

Another example of a special purpose RUA is a RUA that may be configured to facilitate one or more responses. For example, a special purpose RUA may be configured to be associated with an emergency response. That is, if the special purpose RUA is entered into a website, POS, ATM and/or other similar hardware, the special purpose RUA may automatically trigger an emergency response, such as, for example, notification of the police or fire department. As another example, the special purpose RUA may be configured with a notification response. For example, the special purpose RUA may be configured to automatically send notification to a parent and/or an employer and/or other person any time the special purpose RUA is used.

In another embodiment in accordance with the present invention, the RUA may be configured to be refilled by one or more PCAs 20. For example, if the value stored in RUA 1000 drops below a pre-set level (e.g., $100), RUA 1000 may be configured to automatically be refilled by PCA 20. That is, PCA 20 may be configured to transfer a value corresponding to an RUA preset condition to RUA 1000. For example, PCA 20 may be configured to transfer $400 to RUA 1000 if RUA 1000 drops below $100. This use may be used in, for example, an amusement park where a family gets a primary account worth of $150 in rides. Each member of the family may then be issued his/her own fob 102 with its own RUA 1000 that is associated with the primary account. Each RUA 1000 may, for example have a $30 limit on it. Thus, each member of the family can go and use his/her RUA 1000 until he/she runs out of money. Each RUA 1000 may be further be configured to be refilled by the primary account, if needed. For example, once $5 or less are remaining on each RUA 1000, the primary account may refill the RUA 1000 based upon a percentage of what is left in the primary account. That is, if the primary account only has $50 remaining in it, and four RUAs 1000 are associated with the primary account, each RUA 1000 may be refilled by 25% of the primary account value ($12.50).

In another exemplary embodiment of the present invention, one or more PCAs 20 and RUAs 1000 may be configured to be associated with a primary association identifier (PAI) account that has is also designated by user 1 and/or issuer 3. That is, both RUA 1000 and PCA 20 may be associated with a PAI. The PAI may be configured to function as a "middle-man" account between one or more RUAs 1000 and one or more PCAs 20. For example, an American Express credit card account may be designated by user 1 and/or issuer 3 as PCA 20. Issuer 3 and/or user 1 may then associate a PAI with the American Express credit card number. The PAI may have all the same privileges as PCA 20 and/or it may have only issuer 3 and/or user 1 designated privileges. By the term "privileges," PAI may be configured with certain credit lines, account access, PINs, secondary identifiers, settlement processing, issuer support, membership rewards benefits, loyalty benefits and the like. The PAI may be configured to update one or more RUAs 1000 associated with it based on the designated conditions of the RUAs. For example, with reference to FIG. 11, generating RUA 1000, associating RUA 1000 with PCA 20, applying limited-use conditions, if desired, and issuing RUA 1000 to user 1 (step 1110) may further include a sub-step of generating a PAI and associating both PCA 20 and RUA 1000 with the PAI.

The PAI may also be involved with the association step (step 45) illustrated in FIG. 14. For example, a newly created RUA 1000 may be associated with a PAI that is associated with the user's PCA 20 and is provided to user 1 (step 45), whereupon RUA database 6 is updated to reflect that this particular RUA 1000 is in use and associated with the PAI.

The PAI may also be involved in the reversal processing engine 79, illustrated in FIG. 15. That is, reversal processing engine 79 may interface with RUA database 6 to re-substitute RUA 1000 for the PAI and also to update RUA database 6 to reflect the transaction information (step 87). For example, if the conditions of use parameters associated with RUA 1000 authorized two transactions, this step 87 updates the accountholder account in RUA database 6 to reflect that only one transaction remains. The reversal engine 79 substitutes PAI with RUA 1000 and forwards to CAS 7 (step 88). CAS 7 then provides the results to merchant 2 (step 89). If CAS Authentication Component 78 does not authorize use under RUA 1000 conditions and/or if CAS 7 does not authorize use under PAI conditions, the transaction will not be approved. When the use conditions of both the primary association identifier and the revolving use accounts are satisfied, the transaction is approved. In this exemplary embodiment, however, RUA 1000 is not deactivated to prevent settlement. To the contrary, settlement may proceed (as discussed earlier) even when an authorization was declined.

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. For example, the steps recited in any of the method or process claims may be executed in any order and are not limited to the order presented. Further, the present invention may be practiced using one or more servers, as necessary. Thus, the preceding detailed description is presented for purposes of illustration only and not of limitation, and the scope of the invention is defined by the preceding description, and with respect to the attached claims.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variations thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

What is claimed is:

1. A method comprising:
   associating, by a computer based system for facilitating a transaction, a primary account with a primary association identifier;
   associating, by the computer based system, multiple revolving use accounts with the primary association identifier and with corresponding individual revolving use account identifiers, the multiple revolving use accounts being limited use accounts associated with the primary account;
   receiving, by the computer-based system, a plurality of reset requests from the multiple revolving use accounts for a plurality of reset values, wherein each of the plurality of reset values is based on a percentage of a total value stored in the primary account;
   transferring, by the computer based system, each of the plurality of reset values from the primary account to a corresponding multiple revolving use account of the multiple revolving use accounts in response to determining that a value stored in each of the multiple revolving use accounts has dropped below a pre-set level, wherein the reset value resets the value greater than the pre-set level;
   receiving, by the computer based system, user-defined conditions for the multiple revolving use accounts, wherein the user-defined conditions place limits on use of the multiple revolving use accounts;
   receiving, by the computer based system, merchant-defined conditions for the multiple revolving use accounts, wherein the merchant-defined conditions place limits on use of the multiple revolving use accounts at a merchant;
   initiating, by the computer based system, the transaction using at least one of the multiple revolving use accounts;
   receiving, by the computer based system, an authorization request from the merchant, the authorization request including at least one of the individual revolving use account identifiers;
   determining, by the computer based system, whether the transaction satisfies the user-defined conditions and the merchant-defined conditions;
   authorizing, by the computer based system, the transaction if the user-defined conditions and the merchant-defined conditions are satisfied;
   denying, by the computer based system, the transaction if the user-defined conditions or the merchant-defined conditions are not satisfied; and
   notifying a third party in response to one of the multiple revolving use accounts being used.

2. The method of claim 1, further including issuing the multiple revolving use accounts to a first party to facilitate the transaction with a second party.

3. The method of claim 2, wherein the issuing the multiple revolving use accounts to the first party to facilitate the transaction with the second party further comprises configuring the multiple revolving use accounts to be immediately usable for facilitating the transaction.

4. The method of claim 1, further comprising the storing at least one of the user-defined conditions and the merchant-defined conditions in one or more account database fields associated with at least one of the multiple revolving use accounts and an account of the merchant.

5. The method of claim 1, wherein at least one of the user-defined conditions and the merchant-defined conditions include at least one of: a revolving use account credit limit, limiting use of the multiple revolving use accounts based on account balance availability, a revolving use account expiration date, a predetermined number of transactions before the multiple revolving use accounts are declined, limiting use of the multiple revolving use accounts to a specified dollar amount per transaction, limiting use of the multiple revolving use accounts to a total dollar amount for pre-designated number of transactions, whether the multiple revolving use accounts can be used to earn loyalty points, whether the multiple revolving use accounts can be used to redeem loyalty points, limiting use of the multiple revolving use accounts to a maximum dollar amount per month, use of the multiple revolving use accounts for a specified merchant only, restricting use of the multiple revolving use accounts to a specified group of users, and specifying that all online transactions be performed using only the multiple revolving use accounts.

6. The method of claim 1, wherein the third party includes at least one of the police, the fire department, a parent, and an employer.

7. The method of claim 1, wherein the associating the multiple revolving use accounts with the primary association identifier further includes associating two or more primary charge accounts with the primary association identifier.

8. The method of claim 1, further comprising identifying the primary account as a non-currency-based account.

9. The method of claim 1, further comprising refilling the pre-set value of the revolving use account using the primary account.

10. A method comprising:
    receiving, by a computer-based account provider, transaction information from a second party for authorization;
    recognizing, by the computer-based account provider, that the transaction information comprises one of a plurality of revolving use accounts, the plurality of revolving use accounts being limited use accounts associated with a primary account;

determining, by the computer-based account provider, that a value stored in the one of the plurality of revolving use accounts has dropped below a pre-set level;

receiving, by the computer-based account provider, a plurality of reset requests from the plurality of revolving use accounts for a plurality of reset values, wherein each of the plurality of reset values is based on a percentage of a total value stored in the primary account;

transferring, by the computer-based account provider, each of the plurality of reset values from the primary account to a corresponding revolving use account of the plurality of revolving use accounts in response to the determining that the value stored in the one of the plurality of revolving use accounts has dropped below the pre-set level, wherein the reset value resets the value greater than the pre-set level;

receiving, by the computer-based account provider, user-defined conditions for the plurality of revolving use accounts, wherein the user-defined conditions place limits on use of the plurality of revolving use accounts;

receiving, by the computer-based account provider, merchant-defined conditions for the plurality of revolving use accounts, wherein the merchant-defined conditions place limits on use of the plurality of revolving use accounts at a merchant;

determining, by the computer-based account provider, whether the transaction information satisfies the user-defined conditions and the merchant-defined conditions;

authorizing, by the computer-based account provider, the transaction if the user-defined conditions and the merchant-defined conditions are satisfied;

denying, by the computer-based account provider, the transaction if the user-defined conditions or the merchant-defined conditions are not satisfied; and notifying a third party in response to one of the multiple revolving use accounts being used.

11. The method of claim 10, wherein the determining whether the transaction information satisfies the user-defined conditions and the merchant-defined conditions further comprises determining whether at least one of the following conditions are satisfied: a revolving use account credit limit, a revolving use account balance availability, a revolving use account expiration date, a predetermined number of transactions before the revolving use account is declined, whether the use of the plurality of revolving use accounts meets a specified dollar amount per transaction, whether the use of the plurality of revolving use accounts meets to a total dollar amount for pre-designated number of transactions, whether the plurality of revolving use accounts can be used to earn loyalty points, whether the plurality of revolving use accounts can be used to redeem loyalty points, whether the use of the plurality of revolving use accounts is limited to a maximum dollar amount per month, whether the use of the plurality of revolving use accounts is reserved for a specified merchant only, whether the use of the plurality of revolving use accounts is restricted to a specified group of users, and whether all online transactions need to be performed using only the plurality of revolving use accounts.

12. A method comprising:
associating, by a computer-based account provider, a primary association identifier with a primary account;
associating, by the computer-based account provider, multiple revolving use accounts with the primary association identifier and with corresponding individual revolving use account identifiers, the multiple revolving use accounts being limited use accounts associated with the primary account and being configured to facilitate a transaction;

receiving, by the computer-based account provider, a plurality of reset requests from the multiple revolving use accounts for a plurality of reset values, wherein each of the plurality of reset values is based on a percentage of a total value stored in the primary account;

transferring, by the computer-based account provider, each of the plurality of reset values from the primary account to a corresponding multiple revolving use account of the multiple revolving use accounts in response to determining that a value stored in each of the multiple revolving use accounts has dropped below a pre-set level, wherein the reset value resets the value greater than the pre-set level;

receiving, by the computer-based account provider, user-defined conditions for the multiple revolving use accounts, wherein the user-defined conditions place limits on the use of the multiple revolving use accounts;

issuing, by the computer-based account provider, the multiple revolving use accounts to a first party to facilitate a transaction with a merchant, wherein the multiple revolving use accounts are configured to be immediately usable for facilitating the transaction;

receiving, by the computer-based account provider, merchant-defined conditions for the multiple revolving use accounts, wherein the merchant-defined conditions place limits on use of the multiple revolving use accounts at the merchant;

initiating, by the computer-based account provider, the transaction using at least one of the multiple revolving use accounts;

receiving, by the computer-based account provider, an authorization request from the merchant, the authorization request including at least one of the individual revolving use account identifiers;

determining, by the computer-based account provider, whether the transaction satisfies the user-defined conditions and the merchant-defined conditions;

receiving, by the computer-based account provider, transaction settlement information from the merchant;

identifying, by the computer-based account provider, the transaction settlement information as a transaction involving an account of a revolving use type;

capturing, by the computer-based account provider, the transaction settlement information in a financial capture system;

causing, by the computer-based account provider, the second party to be paid if the user-defined conditions and the merchant defined conditions are satisfied; and notifying, by the computer-based account provider, a third party in response to one of the multiple revolving use accounts being used.

13. The method of claim 12, further comprising:
replacing, by the computer-based account provider, the primary association identifier with a primary account number;
processing, by the computer-based account provider, the transaction settlement information in an accounts receivable system; and
generating, by the computer-based account provider, a billing statement that includes the primary account number.

14. A system comprising:
a user interface system configured to allow a first party to interact with a host computer's transaction services;

a number generating and processing mechanism, including at least one application server and at least one database, configured for receiving input from the user interface system to generate a plurality of revolving use accounts and to associate therewith a designated primary association identifier and associate therewith a plurality of corresponding revolving use account identifiers, the plurality of revolving use accounts being limited use accounts associated with the primary account;

a settlement processing mechanism including at least a financial capture system configured for capturing transaction information relating to use of revolving use accounts, an accounts receivable system for billing the first party and an accounts payable system for paying a second party;

a receiving mechanism for receiving:

user-defined conditions for the plurality of revolving use accounts, wherein the user-defined conditions place limits on use of the plurality of revolving use accounts, merchant-defined conditions for the plurality of revolving use accounts, wherein the merchant-defined conditions place limits on use of the plurality of revolving use accounts at a merchant, and a plurality of reset requests from the plurality of revolving use accounts for a plurality of reset values, wherein each of the plurality of reset values is based on a percentage of a total value stored in the primary account, an authorization request including at least one of the plurality of corresponding revolving use account identifiers;

a transferring mechanism for transferring each of the plurality of reset values from the primary account to a corresponding revolving use account of the plurality of revolving use accounts in response to determining that a value stored in each of the plurality of revolving use accounts has dropped below a pre-set level, wherein the reset value resets the value greater than the pre-set level;

an authorization mechanism for authorizing the transaction if the user-defined conditions and the merchant-defined conditions are satisfied and denying the transaction if the user-defined conditions or the merchant-defined conditions are not satisfied; and a notification mechanism for notifying a third party in response to one of the multiple revolving use accounts being used.

15. A computer program product comprising a non-transitory, tangible computer usable medium having control logic stored therein for causing a computer to execute the following operations:

associating, by the computer, a primary account with a primary association identifier;

associating, by the computer, multiple revolving use accounts with the primary association identifier and with corresponding individual revolving use account identifiers, the multiple revolving use accounts being limited use accounts associated with the primary account and being configured to facilitate a transaction;

receiving, by the computer, a plurality of reset requests from the multiple revolving use accounts for a plurality of reset values, wherein each of the plurality of reset values is based on a percentage of a total value stored in the primary account;

transferring, by the computer, each of the plurality of reset values from the primary account to a corresponding multiple revolving use account of the multiple revolving use accounts in response to determining that a value stored in each of the multiple revolving use accounts has dropped below a pre-set level, wherein the reset value resets the value greater than the pre-set level;

receiving, by the computer, user-defined conditions for the multiple revolving use accounts, wherein the user-defined conditions place limits on use of the multiple revolving use accounts;

receiving, by the computer, merchant-defined conditions for the multiple revolving use accounts, wherein the merchant-defined conditions place limits on use of the multiple revolving use accounts at a merchant;

receiving, by the computer, a transaction initiated using at least one of the multiple revolving use accounts;

receiving, by the computer, an authorization request from the merchant, the authorization request including at least one of the individual revolving use account identifiers;

determining, by the computer, whether the transaction satisfies the user-defined conditions and the merchant-defined conditions;

authorizing, by the computer, the transaction if the user-defined conditions and the merchant-defined conditions are satisfied;

denying, by the computer, the transaction if the user-defined conditions or the merchant-defined conditions are not satisfied; and notifying, by the computer, a third party in response to one of the multiple revolving use accounts being used.

16. The method of claim 1, wherein each of the multiple revolving use accounts is individually loaded onto a radio frequency transaction device.

17. The method of claim 16, wherein the value stored in each of the multiple revolving use accounts is stored on the radio frequency transaction device, and wherein the pre-set value is loaded onto the radio frequency transaction device.

* * * * *